(12) United States Patent
Kadali et al.

(10) Patent No.: US 10,668,408 B2
(45) Date of Patent: Jun. 2, 2020

(54) MEASUREMENT AND CONTROL OF BITUMEN-CONTAINING PROCESS STREAMS

(71) Applicant: Suncor Energy Inc., Calgary (CA)

(72) Inventors: Ramesh Kadali, Fort McMurray (CA); Enbo Feng, Fort McMurray (CA)

(73) Assignee: Suncor Energy Inc, Calgary (CA)

( * ) Notice: Subject to any disclaimer, the term of this patent is extended or adjusted under 35 U.S.C. 154(b) by 376 days.

(21) Appl. No.: 14/093,318

(22) Filed: Nov. 29, 2013

(65) Prior Publication Data
US 2014/0197316 A1     Jul. 17, 2014

Related U.S. Application Data

(60) Provisional application No. 61/732,143, filed on Nov. 30, 2012.

(51) Int. Cl.
| | | |
|---|---|---|
| *B01D 17/02* | (2006.01) | |
| *G01N 21/27* | (2006.01) | |
| *G01N 21/3577* | (2014.01) | |
| *G01N 21/85* | (2006.01) | |

(52) U.S. Cl.
CPC ....... *B01D 17/0214* (2013.01); *G01N 21/274* (2013.01); *G01N 21/3577* (2013.01); *G01N 21/85* (2013.01)

(58) Field of Classification Search
CPC .......................... G01N 21/359; G01N 21/3563
See application file for complete search history.

(56) References Cited

U.S. PATENT DOCUMENTS

| | | | |
|---|---|---|---|
| 2,332,724 A | | 10/1943 | Johnson |
| 3,496,094 A | | 2/1970 | Smith |
| 3,802,831 A | | 4/1974 | Woodward |
| 3,817,697 A | | 6/1974 | Parobek |
| 4,337,396 A | * | 6/1982 | Lauer ............... G01N 21/3563 250/255 |
| 4,433,239 A | * | 2/1984 | Thompson ............... G01V 8/02 250/255 |

(Continued)

FOREIGN PATENT DOCUMENTS

| | | |
|---|---|---|
| CA | 2385311 A1 | 11/2003 |
| CA | 2394272 C | 3/2005 |

(Continued)

OTHER PUBLICATIONS

Selected Manuscripts from the 7th UNITAR International Conference on Heavy Crude and Tar Sands held in Beijing, China from Oct. 27, 1998 to Oct. 30, 1998.

(Continued)

*Primary Examiner* — Christine S. Kim
(74) *Attorney, Agent, or Firm* — McCarthy Tétrault LLP

(57) ABSTRACT

A method and apparatus for analyzing a bitumen-containing process stream and controlling a process. The method including directing a beam of infrared light at the bitumen-containing process stream, capturing light corresponding to the infrared light after interaction with the bitumen-containing process stream, and analyzing the captured light to obtain a spectrum. A composition estimate can be generated based on the spectrum and a calibrated model. A controller is operative to adjust a setpoint of the process in response to the composition estimate.

58 Claims, 39 Drawing Sheets

(56) References Cited

U.S. PATENT DOCUMENTS

| | | | |
|---|---|---|---|
| 4,668,121 A | | 5/1987 | Bosich |
| 5,145,785 A | | 9/1992 | Maggard et al. |
| 5,161,409 A | | 9/1992 | Hughes et al. |
| 5,349,189 A | | 9/1994 | Maggard |
| 5,470,482 A | * | 11/1995 | Holt .................. B01D 15/1828 |
| | | | 210/662 |
| 6,087,662 A | | 7/2000 | Wilt et al. |
| 6,552,221 B1 | | 4/2003 | Hallinan et al. |
| 6,768,115 B2 | * | 7/2004 | Mikula ............. G01N 21/3563 |
| | | | 250/339.11 |
| 7,067,811 B2 | | 6/2006 | Long et al. |
| 7,886,821 B2 | | 2/2011 | DiFoggio |
| 8,017,910 B2 | | 9/2011 | Sharpe |
| 8,068,226 B2 | | 11/2011 | Csutak |
| 8,222,605 B2 | | 7/2012 | da Silva et al. |
| 2003/0205507 A1 | * | 11/2003 | Mikula .................. C10G 1/047 |
| | | | 208/391 |
| 2004/0084623 A1 | * | 5/2004 | Long .................... G01N 21/359 |
| | | | 250/339.12 |
| 2007/0221376 A1 | | 9/2007 | Solomon et al. |
| 2011/0036308 A1 | | 2/2011 | Betzer-Zilevitch |
| 2012/0000642 A1 | | 1/2012 | Betzer Tsilevich |
| 2013/0327683 A1 | * | 12/2013 | Rivard .................. C10G 1/008 |
| | | | 208/390 |

FOREIGN PATENT DOCUMENTS

| | | |
|---|---|---|
| CA | 2580088 A1 | 3/2006 |
| CA | 2138213 C | 7/2007 |
| CA | 2280895 C | 7/2007 |
| CA | 2235073 C | 9/2007 |
| CA | 2597000 A1 | 2/2008 |
| CA | 2618462 A1 | 7/2008 |
| CA | 2675800 A1 | 2/2010 |
| CA | 2503610 C | 8/2011 |
| WO | WO 2000/039561 A1 | 7/2000 |
| WO | WO 2003/087788 A1 | 10/2003 |
| WO | WO 2011/143072 A2 | 11/2011 |

OTHER PUBLICATIONS

Friesen, W. I., Qualitative Analysis of Oil Sand Slurries Using On-Line NIR Spectroscopy, Applied Spectroscopy, vol. 50, No. 12, pp. 1535-1540 (1996).

Long, Y. et al., Analysis of Solvent-Diluted Bitumen from Oil Sands Froth Treatment Using NIR Spectroscopy, The Canadian Journal of Chemical Engineering, vol. 82, pp. 776-781 (Aug. 2004).

Rivard, B. et al., Bitumen Content Estimation of Athabasca Oil Sand from Broad Band Infrared Reflectance Spectra, The Canadian Journal of Chemical Engineering, vol. 88 , pp. 830-838 (Oct. 2010).

Short, M., The Use of Absorption Spectroscopy for Refined Petroleum Product Discrimination, SPIE vol. 1480: Sensors and Sensor Integration, pp. 72-79 (1991).

Parisotto G. et al., Tota Acid Number Determination in Residues of Crude Oil Distillation Using ATR-FTIP and Variable Selection by Chemometric Methods, Energy & Fuels, vol. 24, pp. 5474-5478 (2010).

Luzinova, Y. et al., In Situ Trace Analysis of Oil in Water with Mid-Infrared Fiberoptic Chemical Sensors, Analytical Chemistry, vol. 84, pp. 1274-1280 (2012).

Puskas, J. E. et al., Real-time Monitoring of Polymerization Processes Using a Mid-IR Fiberoptic Probe, KGK Kautschuk Gummi Kunststoffe, vol. 53, pp. 587-591 (Oct. 2000).

Sastry, M. I. S. et al., Determination of Physicochemical Properties and Carbon-Type Analysis of Base Oils Using Mid-IR Spectroscopy and Partial Least-Squares Regression Analysis, Energy & Fuels, vol. 12, pp. 304-311 (1998).

Hongfu, Y. et al., Determination of Multi-Properties of Residual Oils Using Mid-Infrared Attenuated Total Reflection Spectroscopy, Fuel, vol. 85, No. 12-13, pp. 1720-1728 (Sep. 2006).

Canadian Office Action dated Jun. 1, 2015 for Canadian Patent Application No. 2,834,980.

\* cited by examiner

MEASUREMENT AND CONTROL OF BITUMEN-CONTAINING PROCESS STREAMS

FIELD OF THE INVENTION

This invention relates to processing bitumen-containing process streams.

BACKGROUND

The Alberta oil sands are considered to be one of the world's largest remaining oil reserves. The oil sands are typically composed of about 70 to about 90 percent by weight mineral solids, including sand and clay, about 1 to about 10 percent by weight water, and a bitumen or oil film, that comprises from trace amounts up to as much as 21 percent by weight. Typically ores containing a lower percentage by weight of bitumen contain a higher percentage by weight of fine mineral solids ("fines") such as clay and silt.

Unlike conventional oil deposits, the bitumen is extremely viscous and difficult to separate from the water and mineral mixture in which it is found. Generally speaking, the process of separating bitumen from oil sands extracted through surface mining comprises five broad stages: 1) initially, the oil sand is excavated from its location and passed through a comminutor to comminute the chunks of ore into smaller pieces; 2) the comminuted ore is then typically combined with a process fluid, such as hot process water, to aid in liberating the oil (the combined oil sand and process fluid is typically referred to as an "oil sand slurry", and other agents, such as flotation aids can be added to the slurry); 3) the oil sand slurry is passed through a "conditioning" phase in which the slurry is allowed to mix and dwell for a period to create froth in the mixture; 4) once the slurry has been conditioned, it is typically passed through a series of separators for separating the bitumen froth and the tailings from the oil sand slurry as part of an extraction process; and 5) after the maximum practical amount of bitumen has been separated, the remaining tailings material is typically routed into a tailings pond for separation of the sand and fines from the water, and the resulting bitumen product directed to downstream upgrading and refining operations.

Generally speaking, the process of separating bitumen from oil sands in situ, i.e., within the underground formation, is through Steam-Assisted Gravity Drainage (SAGD), although other processes can be used. SAGD generally involves: 1) injecting steam into an injection well underground, such that the viscosity of bitumen within the formation lowers to a point where the bitumen can flow; 2) extracting a bitumen-containing wellhead product stream through a production well to the surface; 3) processing the bitumen-containing wellhead product stream to recycle water and extract any mineral component; and 4) directing the resulting bitumen product to downstream upgrading operations, and subsequent refining operations depending upon the hydrocarbon product to be produced.

The process of generating bitumen froth from oil sand slurry and then separating the froth typically has inefficiencies, in part caused by a variance in a composition of the oil sand slurry. The process of extracting and processing a bitumen-containing wellhead product stream from an in-situ well head can have inefficiencies related to a variance in a composition of the product stream. It would be advantageous to provide for methods of obtaining composition estimates of the oil sand slurry or bitumen-containing wellhead product stream and resulting product fluids to improve the bitumen recovery performance of the extraction process.

SUMMARY

In an embodiment a method is provided for controlling a process by directing a beam of infrared light toward an opaque bitumen-containing process stream as it passes between stages in the process; capturing light corresponding to the beam of infrared light after interaction with the bitumen-containing process stream; analyzing the captured light to obtain a spectrum; determining a composition estimate from the bitumen-containing process stream by evaluating the spectrum with reference to a calibrated model; and, based on the composition estimate, automatically adjusting a control setpoint of at least one upstream process component and/or downstream process component.

In an embodiment, an apparatus is provided for controlling a process comprising: an online infrared spectrometer situated proximate a bitumen-containing process stream and configured to: direct a beam of infrared light toward the bitumen-containing process stream, capture light corresponding to the beam of infrared light after interaction with the bitumen-containing process stream, analyze the captured light to obtain a spectrum; determine a composition estimate from the bitumen-containing process stream by evaluating the spectrum with reference to a calibrated model; and, a controller operative to: automatically adjust a control setpoint of at least one upstream process component and/or downstream process component based on the composition estimate.

It would be advantageous to provide for methods and apparatus for obtaining a composition estimate of the oil sand slurry or bitumen-containing wellhead product stream and resulting product fluids to improve the bitumen recovery performance of the extraction process.

BRIEF DESCRIPTION OF THE DRAWINGS

FIG. 2 is a process flow diagram illustrating an embodiment of the extraction facility of FIG. 1a.

FIG. 3 is a process flow diagram illustrating an embodiment of the extraction facility of FIG. 1a.

FIG. 20b shows close up views of an end of one of the probes of FIG. 20a.

DETAILED DESCRIPTION

Figure 1A:
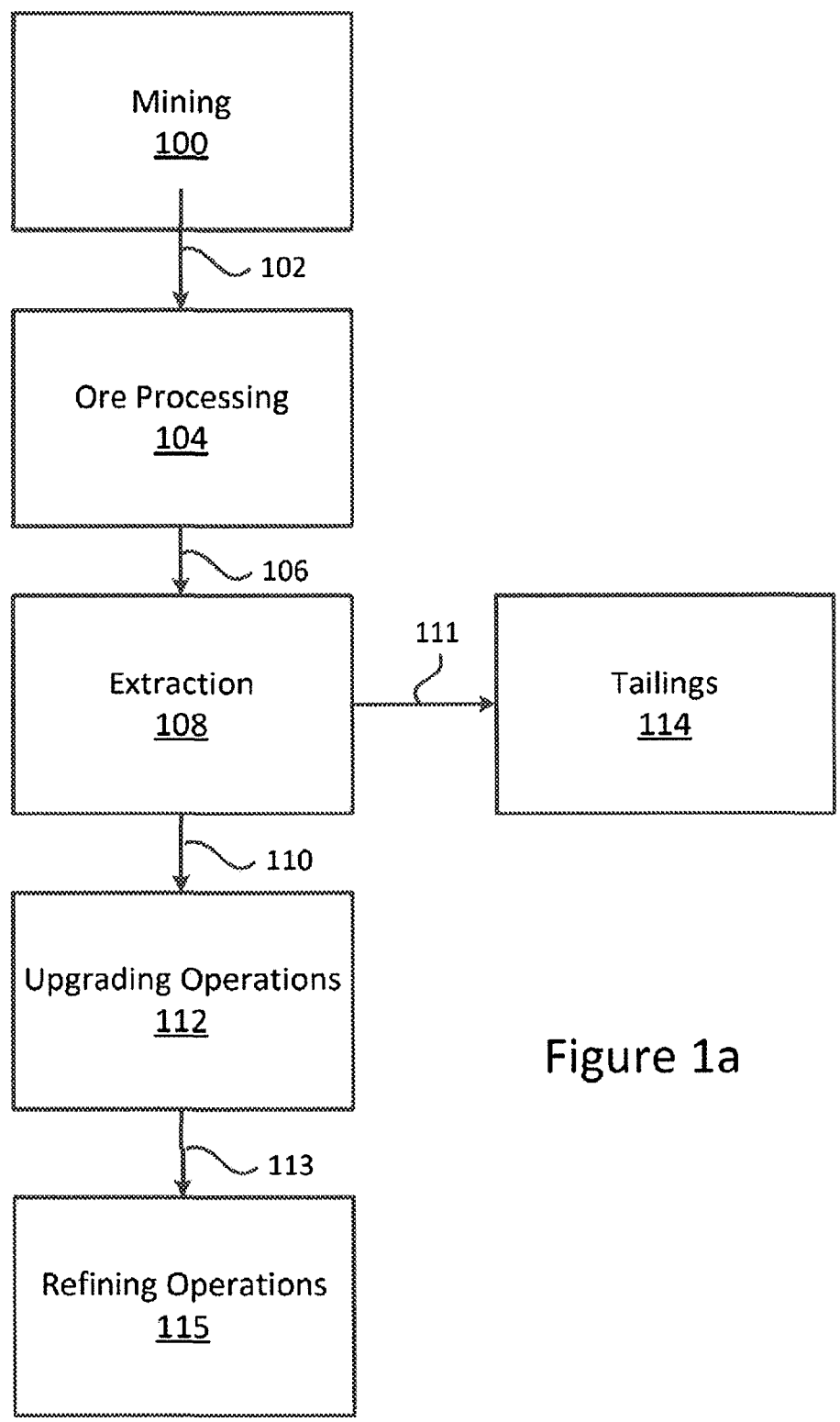
FIGS. 1a and 1b are process flow diagrams illustrating example embodiments of an oil sands mining processing operation and an in situ operation, respectively.

Extracting useful hydrocarbon products from bitumen-containing ores is often achieved by combining the ore with a process fluid, such as hot process water or steam, to produce a bitumen-containing process stream. The hydrocarbon products can then be separated from the process fluid, and mineral or clay components if any, in an extraction operation that produces a diluted bitumen ("dilbit") product stream for delivery either straight to market, e.g. as may be the case for dilbit produced by in-situ operations, or else delivered to downstream upgrading operations to produce an oil sands crude oil that may be processed by heavy oil refining operations.

Current operations for processing a bitumen-containing process stream have relied upon off-line laboratory testing to measure the composition of samples collected at different points along the process line. Conventionally two techniques are used for collecting samples: auto-samplers that accumulate a series of individual samples over a time period producing an averaged sample for that period; and instant samplers that collect a single instantaneous sample once per time period. A typical time period would be standard work shift time, 8 or 12 hours, for instance.

The bitumen-containing process stream tends to vary in composition much faster than the processing time required to collect a sample, transport it to the laboratory, conduct analysis, and report the analysis to take remedial action. Accordingly, various processes in the operations have been structured to ensure minimum standards for output process stream characteristics having regard to normal process stream composition fluctuations.

It is advantageous to provide an online system able to determine a composition estimate of a bitumen-containing process stream in real time, or near real-time, to provide current actionable information about one or more current characteristics of the process stream. Providing current actionable information allows a controller to make adjustments to the process while the current characteristics are still present. It has been demonstrated that if a responsive action is taken based on current information, rather than information that is several hours dated (e.g., 12 or more hours), that the efficiency of the operation is measurably improved. Example improvements include the use of less process water, lower environmental emissions, higher throughput, and less down-time maintenance.

An apparatus and method is provided for online analysis of a bitumen-containing process stream, such as an oil sand slurry, a bitumen-containing wellhead product stream, or a diluted bitumen product (i.e. "dilbit"). A beam of infrared light is directed toward the bitumen-containing process stream and light is captured after interaction with the bitumen-containing process stream. The captured light is analyzed to obtain a spectrum. The spectrum is processed to obtain a composition estimate of the bitumen-containing process stream. The composition estimate is sent to a controller to take remedial action, if necessary under the current process conditions. In some implementations, the infrared light can include light having wavelengths of about 800 nm to about 2500 nm.

In some implementations, the beam of infrared light interacts with at least a portion of the bitumen-containing process stream by reflection. In other implementations, the beam of infrared light interacts by transflection.

In some implementations, for lighter mostly transparent bitumen-containing process streams containing predominantly water, naphtha, or kerosene and only minor amounts of bitumen, the captured light can be captured after transmission through at least a portion of the lighter bitumen-containing process stream.

In this application, the term "bitumen-containing process stream" is used as a general term that includes the various resultant process streams derived from an oil sand water slurry or a bitumen-containing in-situ product stream during mechanical and chemical processing operations to extract a diluted bitumen product stream to be conveyed for further processing such as upgrading operations. Bitumen-containing process streams are typically opaque and may contain a variety of components including a water component, a bitumen component, a mineral component, and a diluent component. Additionally, the bitumen component may comprise a variety of hydrocarbons.

The term "product stream" is conventionally used to describe a process stream that comprises a lighter or heavier hydro carbon containing final product from a particular processing operation.

These process streams can include, for instance in a surface mining operation, an oil sand slurry comprised of mined oil sand ore and process fluid (such as water), a bitumen froth or bitumen froth stream; a diluted bitumen product stream; or, a tailings stream. In some embodiments, the term can also encompass a recycled process fluid stream, such as a diluent recycled from oil sand slurry processing operations that may contain a trace fraction of bitumen, and is being recycled for input into an extraction operation.

These process streams can include, for instance in an in-situ process operation, a bitumen-containing wellhead product stream; a processed bitumen-containing wellhead product stream; a diluted processed bitumen-containing wellhead product stream, an in-situ product stream, a bitumen froth or bitumen froth stream; a diluted bitumen product stream; or, a tailings stream.

These process streams can include, for instance upgrading products such as naphtha and gasoil obtained by thermally cracking the bitumen containing hydrocarbon feed stock.

Mining Operation

Referring to FIG. 1a, a simplified process flow diagram illustrating oil sand mining operations is provided. The operations are broken down into individual stages for explanatory purposes, though in individual cases implementations of one stage can be preferentially performed in a preceding or following stage.

The first stage of the operation of FIG. 1a is mining stage 100 in which oil sand ore is excavated from a mine site. The excavated ore is conveyed 102 to ore processing 104. Current techniques for mining 100 and conveyance 102 of mined oil sand ore employ excavator shovels to mine the ore and deposit the mined ore in trucks, although other techniques can be used. In truck and shovel operations, the trucks then convey 102 the mined ore to a crusher or comminutor to reduce the mined ore into a comminuted ore as an initial operation of the ore processing 104.

The second stage of the operation of FIG. 1a is ore processing 104 which includes operations to convert the mined ore into a pumpable oil sand slurry comprised of oil sand ore and process fluid. The oil sand slurry is conveyed by hydrotransportation 106 to extraction 108. Conveniently, the hydrotransportation 106 can aid in "conditioning" the slurry.

Conventionally, the process fluid comprises process water that can be heated to a process temperature, and optionally the addition of one or more additives such as a diluent. Furthermore, the slurry can be further diluted with process water, or additional additives at later stages in the operations including in extraction 108.

The third stage of the operation of FIG. 1a is extraction 108 which includes operations to convert the oil sand slurry into a diluted bitumen product stream 110 and a tailings stream 111. Extraction 108 can further produce one or more recycled process fluid streams such as recycled process water or recycled diluent which can be re-used for extraction 108 or directed to other operations such as processing 104.

The fourth and fifth stages of the operation in FIG. 1a represent upgrading operations 112 which produces a sweet synthetic crude stream 113 that may be sold on the market, or directed to refining operations 115, for subsequent downstream processing to produce various hydrocarbon products as can be required, as illustrated in FIG. 1a.

The sixth stage of the operation of FIG. 1a is tailings 114, which acts to dispose of the tailings stream 111, for example, in tailings settling ponds, though a variety of techniques can be employed depending upon the composition of the tailings stream 111.

As will be appreciated, FIG. 1a is greatly simplified and some of the operations can actually involve the production of multiple output streams that are not represented in the Figure for clarity.

In-Situ Operations

Figure 1B:
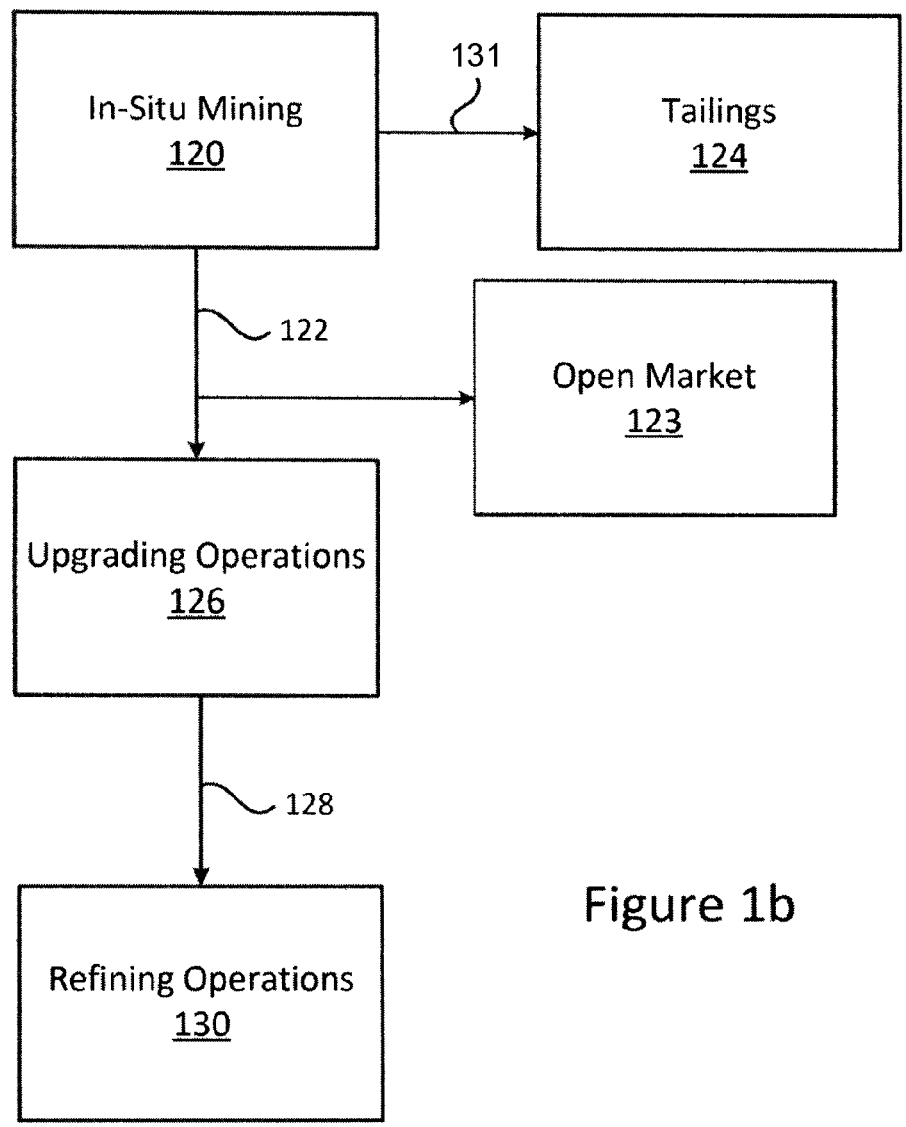

Referring to FIG. 1b, a simplified process flow diagram illustrating in-situ oil sand operations is provided. The operations are broken down into individual stages for explanatory purposes, though in individual cases implementations of one stage can be preferentially performed in a preceding or following stage.

The first stage of the operation of FIG. 1b is in-situ stage 120, which conventionally involves the injection of a high-temperature process fluid, such as steam, that liberates bitumen present in underground formations. Additional additives can be added to the steam to aid the process. The resulting bitumen-containing wellhead product stream typically comprises steam, bitumen, a mineral component, and possibly additives. The bitumen-containing wellhead product stream is typically processed at in-situ stage 120, to recover some of the process fluid and to add a diluent to assist in conveyance, to produce an in-situ diluted bitumen product stream 122 that can be directed to upgrading operations 126, or sold directly on the open market 123.

Upgrading operations 126 upgrades the in-situ diluted bitumen product stream 122 to produce a sweet synthetic crude 128 that may be sold on the open market, or directed to refining operations 130 to produce various hydrocarbon products as can be required, as illustrated in FIG. 1b.

In some instances the processing of the bitumen-containing wellhead product stream into a diluted bitumen product may be partially performed at in-situ stage 120 and completed at downstream processing operations, such as upgrading operations 126 or extraction 108, or may be completely performed at the downstream processing operations, such as upgrading operations 126 or extraction 108 to produce the diluted bitumen product. It will be appreciated that the location of the processing of the bitumen-containing wellhead product stream may vary, for example due to proximity between a particular wellhead and the upgrading operations 126, a capacity of existing equipment at the upgrading operations 126 and a cost-benefit analysis evaluating whether providing additional processing proximate to the wellhead would make practical and economic sense.

As indicated, the in-situ diluted bitumen product stream 122 may also be sold directly on the open market 123 as a diluted bitumen product ("dilbit"). The diluted bitumen product stream 110 produced from mining operations is typically not marketable due to the high variance in product composition, and typically higher water content than the in-situ diluted bitumen product stream 122.

The fourth stage of the operation of FIG. 1b is tailings 124, which operates to dispose of the tailings stream 131, e.g., in tailings settling ponds, though a variety of techniques can be employed depending upon the composition of the tailings stream 131.

As will be appreciated, FIG. 1b is greatly simplified and some of the operations can actually involve the production of multiple output streams, which are not represented in the Figure for clarity.

Figure 2:
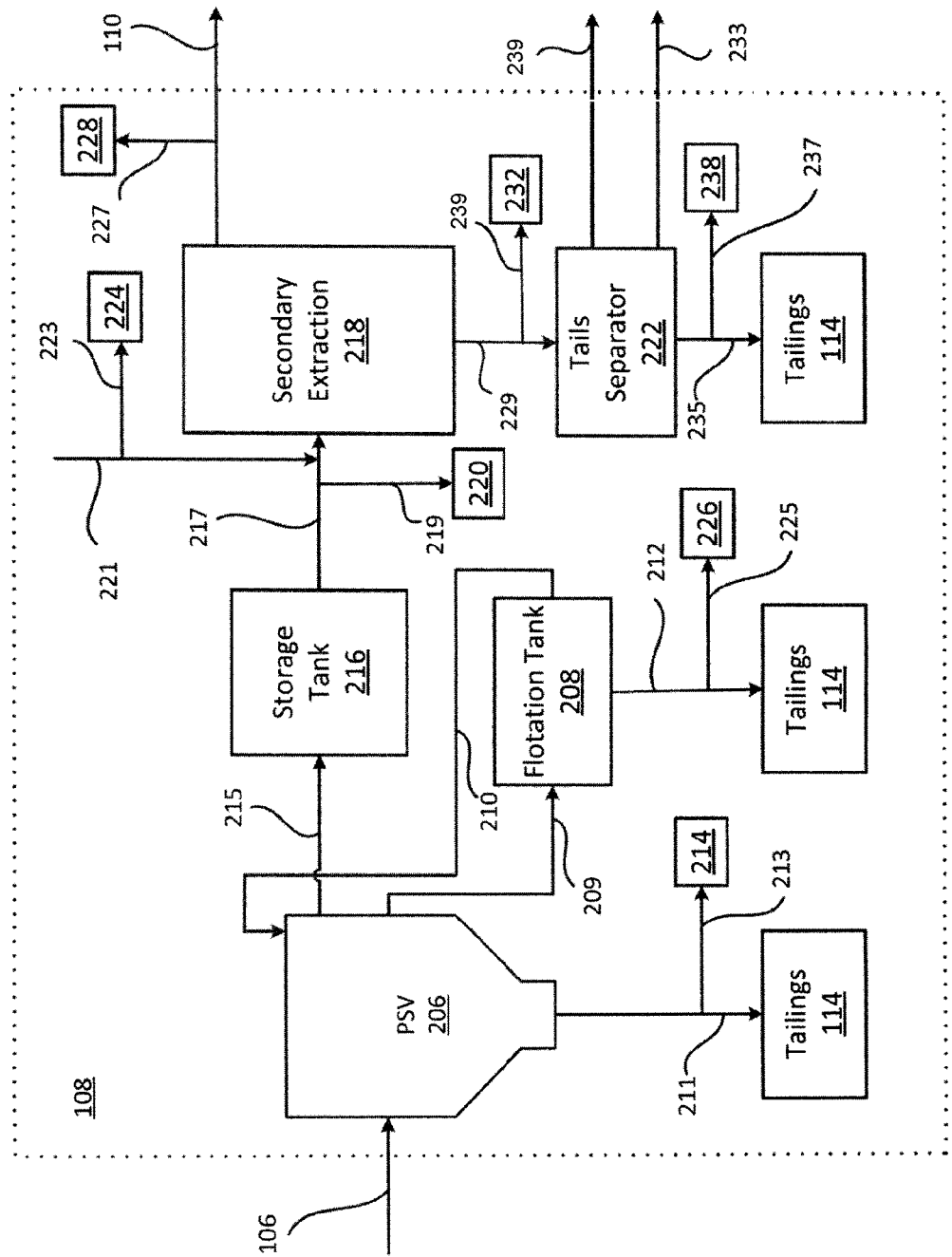

Referring to FIG. 2, a simplified process diagram of a process line of extraction 108 is provided. The simplified process diagram excludes many additional operations involved in extraction, and focuses on high level groups of operations that produce a product stream of interest. As will be appreciated, a working facility can include multiple copies of elements contained in the Figure, as well as additional recycling and processing operations not shown in the Figure. In FIG. 2, an oil sand slurry 106 is received for primary extraction by a Primary Separation Vessel (PSV) 206. The PSV 206 operates to separate the oil sand slurry into three layers, a bitumen froth layer that includes bitumen froth and some process fluid that floats to the top of the cell 206, a middlings layer that includes some froth, a mineral component and process fluid; and, a lower tailings layer that predominantly includes a heavier mineral component and some process fluid.

The bitumen froth layer is separated from the top of the PSV 206 as a bitumen froth stream 215 for further extraction processing. The middlings layer is typically separated through middlings output stream 209 for processing, such as in flotation tank 208, to separate a bitumen rich middlings component from a tailings component. As illustrated, the flotation tank 208 separates the bitumen rich middlings component for re-input to the PSV 206 for further processing through middlings return stream 210, and the tailings component is output through middlings tailings stream 212 for processing or disposal in tailings operation 114. A tailings stream 211 is extracted from the tailings layer of the PSV 206 that is also be directed to tailings operation 114.

Samples of the tailings streams 211, 212 can be diverted through diversion lines 213 or 225 and collected in collectors 214, 226 either by auto-samplers over a period of time, such as an operational shift, or by instantaneous sampling once per time period, for subsequent conveyance to a laboratory, as discussed above. The composition of the collected samples can be analysed in the laboratory to obtain information about the composition of the tailings streams 211, 212 during the collection period. As will be appreciated, auto-samplers collect samples that are effectively each an average of the composition of the tailings streams 211, 212 over the collection period, whereas instant samplers collect an instantaneous sample of a composition of the tailings stream 211, 212 at the time of collection.

The use of an auto-sampler versus an instant sampler may be dictated by practical requirements, physical limitations of the equipment at the measurement point, or by government regulation. Typically both types of samplers are used at different locations about the processing operations, leading to further variance in composition measurement.

The composition of the samples can be used to adjust operation of the PSV 206, for instance to increase the draw-down of the tailings layer provided the sample collected in collector 214 maintains the bitumen content of the sample collected in collector 21 below a PSV tailings threshold level. Similarly, the middlings operation can be monitored to ensure the middlings tailings stream 212 is likewise maintaining the bitumen content below a middlings tailings threshold level.

A limitation of current practice is the delay between collecting the samples, and the time by which a responsive operational action can be taken. Accordingly, current operations default to use excess process inputs such as water and diluent to ensure minimum threshold levels are not violated.

In the implementation shown, the bitumen froth stream 215 is directed towards a storage tank 216, which acts as a buffer for collecting and holding the output bitumen froth stream 215 for input to secondary extraction processes. In an industrial application, a plurality of PSVs 206 can feed one or more storage tanks 216. The storage tank 216 feeds the secondary extraction operations, which can vary between facilities, but which generally operates to separate fine mineral component and process fluids from the bitumen in the bitumen froth.

In the example of FIG. 2, the storage tank 216 feeds a bitumen froth stream 217 to secondary extraction 218, which comprises a multiple unit separation plant that can include liquid-solid separators, filters and cyclones both in series and in parallel as can be required to separate components of the bitumen froth stream 217. The components of secondary extraction 218 separate the bitumen froth into a diluted bitumen product stream 110 and a tails stream 229. For the purposes of this application, which relates to analysing process inputs and outputs, secondary extraction 218 is indicated as a single process block, however a person of skill in the art will appreciate that multiple industrial processes can be applied to the input(s) in order to produce the diluted bitumen product stream 110 and tails 229.

A portion of the bitumen froth stream 217 can be diverted through diversion line 219 to collector 220 for collection for off-line analysis of the collected bitumen froth sample. One or more additives can be added through additive stream 221. Where additive stream 221 is a result of a preceding industrial process, such as a recycled diluent stream, a portion of the additive stream 221 can be diverted through diversion line 223 to collector 224 for collection for off-line analysis of the collected additive sample. A portion of the diluted bitumen product stream 110 can be diverted through diversion line 227 to collector 228 for collection for off-line analysis of the collected product sample.

A portion of the tails stream 229 can be diverted through diversion line 231 to collector 232 for collection for off-line analysis of the collected tails sample. The tails stream 229 can be further separated by tails separator 222 into a tailings stream 235 for disposal in tailings 114, and a recycled component such as a recycled process fluid stream 239 and a recycled diluent stream 233. A portion of the tailings stream 235 can be diverted through diversion line 237 to collector 238 for collection for off-line analysis of the collected tailings sample.

Figure 3:
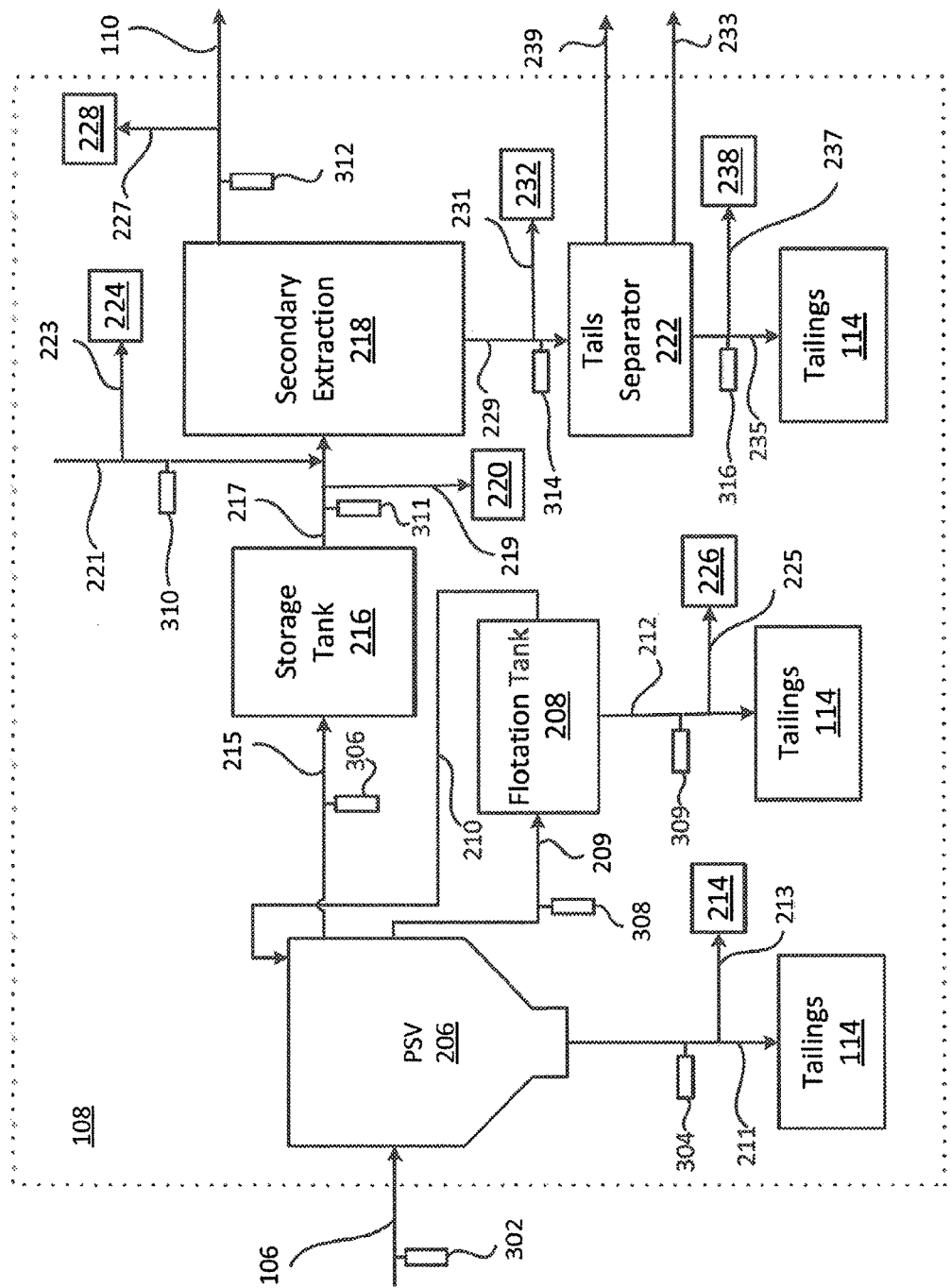

FIG. 3 illustrates a simplified process flow diagram of an implementation of an extraction process line 108. In an implementation, an online infrared measurement apparatus and one or more controllers can be used to optimise bitumen production, diluent recovery, and water recovery during the extraction process.

As illustrated in FIG. 3, an online measurement apparatus is provided for analyzing the bitumen-containing process streams, at various locations in the process line to obtain and forward real-time, or near real-time, sample estimates of composition and other physical properties, such as particle size distribution, of the bitumen-containing process stream at each location. The online measurement apparatus is operable to direct a beam of infrared light toward the sample of the bitumen-containing process stream and capture light from the sample corresponding to the infrared light that was directed towards that sample. The captured light is analyzed to obtain a spectrum which may be evaluated based on one or more models to generate an estimate of the composition of the bitumen-containing process stream. The composition estimate is forwarded to a controller operative to adjust one or more control setpoints of an upstream process component and/or a downstream process component. The beam of infrared light can include near infrared, including infrared light with a wavelength between about 800 nm-2500 nm.

In some implementations, the online measurement apparatus is a reflectance infrared spectrometer that directs infrared light towards the sample, captures reflected light, and processes the captured light to obtain a spectrum.

In some implementations, the online measurement apparatus includes a probe-type spectrometer inserted into the process stream. The probe can comprise a reflectance infrared probe spectrometer, a transflectance infrared probe spectrometer or a transmission infrared probe spectrometer, that directs infrared light towards a sample passing the probe. The probe can capture reflected light, transflected light, or transmitted light, as the case may be, and process the captured light to obtain a reflectance, transflectance, or transmission spectrum of the captured light.

In an implementation, a processor of the online measurement apparatus processes the spectrum by evaluating the spectrum based on one or more models to obtain a composition estimate of the sample of the bitumen-containing slurry. The online apparatus allows for accurate and real-time, or near real-time, estimates of a composition of each sample of the bitumen-containing process stream. In an implementation, the online measurement apparatus can be employed to optimise operation of the PSV 206 using advanced process control.

The spectrum can be processed by applying chemometrics to evaluate the spectrum captured from the process stream and to compare features of the captured spectrum to at least one multivariate model. The model is calibrated off-line by collecting a plurality of process stream samples, and capturing spectra of each of the samples along with corresponding reference laboratory results. Multivariate calibration techniques, such as partial-least squares regression (PLS regression), principal component analysis (PCA), neural networks (NNs), or other known means, can be used to construct a mathematical model that relates the spectrum to the content of a particular component of the sample. The captured spectrum can be then be evaluated with reference to the model to obtain an estimate of the content of that component.

A separate model can be calibrated for each component of interest, and a set of models is used to evaluate more than one component of a bitumen-containing process stream. A separate set of models can be calibrated for each of different locations of interest in the process line.

In some implementations, the online measurement apparatus includes an infrared permeable window, such as a sapphire optical window, through a wall of a conduit containing a bitumen-containing stream. For example, the conduit can be a pipe conveying the bitumen-containing stream and the sample is defined by an area of the infrared permeable window providing viewing access to the bitumen-containing stream contained within, and travelling through, the pipe. In another example, the conduit can be a vessel containing the bitumen-containing stream at a stage in the process line, where the bitumen-containing stream is being treated and/or transformed within the vessel before being transferred to another stage in the process line.

In an implementation, the online measurement apparatus can include an outlet of a diversion line diverting a portion of a bitumen-containing stream being conveyed past the measurement location. The outlet providing a reduced volume and velocity of the portion to allow estimation of the composition of samples corresponding to a portion of the bitumen-containing stream proximate to the measurement location at the time the sample was output from the outlet. Conveniently, the outlet can also supply a collection vessel situated to collect samples for off-line laboratory analysis. The dual composition estimate and composition laboratory measurement, estimated by the measurement apparatus as the diverted portion exits the outlet, and subsequently measured using laboratory analysis on the collected sample, permits validation, or possible re-calibration, of the model used to provide the composition estimates from the spectra captured by the measurement apparatus Referring to FIG. 3, an online oil sand slurry composition measurement apparatus 302 can be situated proximate to an oil sand slurry stream 106 to provide composition estimates of samples of the oil sand slurry stream 106 as it enters extraction 108. The online oil sand slurry composition measurement apparatus 302 can provide the composition estimates by directing infrared light at a sample of the oil sand slurry stream 106, and a captured spectrum from the light reflected from the oil sand slurry stream 106. The captured spectrum can be evaluated using one or more models to obtain composition estimates of the sample. The composition estimates can be forwarded to a controller operative to adjust at least one control setpoint of process components affected by the estimated composition. By way of example, the online apparatus 302 can provide an estimate of the bitumen content, process fluid content and mineral component content of the samples of the oil sand slurry stream 106. As explained above, a separate calibrated model can be used to estimate the content of each estimated component.

In an implementation, a density or specific gravity of each sample of the oil sand slurry stream 106 can be calculated from the bitumen content, the process fluid content and/or the mineral component content. The calculated density can be used to determine whether automated remedial action should be taken at downstream components. For example, the controller can be operative to receive the calculated density and to add additional process fluid when the calculated density exceeds a high threshold value and to reduce addition of process fluid when the calculated density is below a low threshold value.

In an implementation, the composition estimate can be processed in real-time, or near real-time, allowing for automated remedial action to be taken in a downstream location proximate the arrival of a portion of the bitumen-containing slurry corresponding to the sample at the downstream location. For example, where the calculated density of the sample of the oil sand slurry stream 106 exceeds the high threshold value, additional process fluid, such as process water, can be added to the PSV 206 as the corresponding portion of the bitumen-containing slurry is introduced to the PSV 206, to lower a resulting density of a combination of the bitumen-containing slurry and the additional process water towards a target level.

Referring again to FIG. 3, in an implementation the flotation tank 208 can be instrumented to include an online flotation tank input measurement apparatus 308 situated to obtain samples of a composition of the middlings leaving the PSV 206 through middlings output stream 209, and a tailings measurement apparatus 309 to obtain samples of a composition of the flotation tank tailings component output through middlings tailings stream 212. In some implementations, an online return measurement apparatus can also be provided to obtain samples of a composition of the bitumen-rich middlings component being returned to the PSV 206 through middlings return stream 210.

In an implementation, one or more controllers of the process line can be operative to control inputs and outputs from the PSV 206 to maintain target layer compositions and boundary layer locations, and to optimise throughput through the PSV 206. For example, a pump speed of a tailings pump extracting the tailings output stream 211 from the PSV 206 can optimally be increased to outlet additional material from the tailings layer in the PSV 206, provided a bitumen, or hydrocarbon, content/concentration level of the tailings output stream 211 is maintained below a tailings hydrocarbon threshold level. In this fashion, throughput of the PSV 206 can be optimised without affecting a quality of the tailings output stream 211.

In general, increasing the pump speed increases the throughput of the PSV, but may increase the hydrocarbon losses through the tailings output stream 211. In optimal operation, the lower tailings layer of the PSV 206 has a hydrocarbon content below a threshold level, and the middlings layer of the PSV 206 has a hydrocarbon content above the threshold level. Operating the PSV 206 with the middlings layer below the threshold level is sub-optimal as the PSV 206 may be able to accommodate additional throughput by increasing the pump speed. Operating the PSV 206 with the tailings layer above the threshold level is sub-optimal as either the pump speed must be decreased, reducing throughput, or higher hydrocarbon losses through tailings output stream 211 will be realised. Prior art methods rely upon off-line laboratory analysis which provides a delayed analysis of the bitumen-containing stream. Accordingly, the prior art PSV 206 is typically set to ensure the hydrocarbon content in the tailings output stream 211 stays below the threshold value under expected composition ranges under standard operating conditions. This results in suboptimal operation of the PSV 206, typically handling a lower throughput than would otherwise be the case.

Depending upon conditions in the PSV 206, hot process water can be added as an input to the PSV 206 to supplement the oil sand slurry stream 106. Hot process water aids in bitumen separation and improves hydrocarbon recovery by increasing the hydrocarbon content in the froth layer of the PSV 206. Too much hot process water, however, consumes more water and energy than necessary, and can reduce the PSV 206 throughput below its maximum.

Online bitumen froth stream measurement apparatus 306 can sample the bitumen froth stream 215 to provide an estimate of the hydrocarbon content to a controller. The controller can minimise the addition of hot process water into the PSV 206, provided the hydrocarbon content estimate determined by the bitumen froth stream measurement apparatus is maintained above a threshold hydrocarbon content level.

In an implementation, an online material balance can be calculated by comparing the hydrocarbon content of the bitumen-containing process streams entering and leaving the PSV 206 over a period of time. The material balance may be calculated by the measurement apparatus, or may be calculated by a controller receiving composition estimates of the bitumen-containing process streams.

The material balance calculation will indicate if the hydrocarbon content of the PSV 206 is increasing, for instance if more hydrocarbon is entering than leaving the PSV 206. The controller may adjust an amount of hot process water added to the PSV 206 responsive to the material balance calculation. The material balance calculation may act as a leading indicator and provide advance notice of changing conditions in the PSV 206 before a direct estimation of an output bitumen-containing process stream would indicate a change.

For instance, where the material balance calculation indicates the hydrocarbon content of the PSV 206 is increasing, an additional amount of hot process water may be added to the PSV 206 to improve hydrocarbon recovery.

In an implementation, a change in the hydrocarbon content of the PSV 206 can be estimated by online analysis of the oil sand slurry process stream 106 entering the PSV 206, and the bitumen froth stream 215 and the tailings streams 211, 212 leaving the PSV 206. The calculated material balance may be used to estimate an overall hydrocarbon bitumen content within the PSV 206.

In an implementation, a change in the hydrocarbon content of a lower portion of the PSV 206 can be estimated by online analysis of the oil sand slurry process stream 106 entering the PSV 206; and the middlings output stream 209 and the tailings streams 211, 212 leaving the PSV 206. The calculated material balance may be used to estimate an overall hydrocarbon bitumen content within the lower portion of the PSV 206.

The controller can add an additional amount of hot process water to the PSV 206 when it is determined that the overall hydrocarbon content is rising, or exceeds a threshold level. The decision to add hot process water based upon the calculated material balance can override a determination to only add hot process water to maintain the hydrocarbon content of the bitumen froth stream 215 above the threshold hydrocarbon content level. Accordingly, the process can be optimised to minimise the addition of hot process water to an amount sufficient to process the bitumen entering the PSV 206.

Online measurement apparatus 304 can sample the tailings output stream 211 to provide a real-time, or near real-time, estimate of a tailings hydrocarbon content. A controller can increase the pump speed of the pump operating on the tailings output stream 211, provided the tailings hydrocarbon content is maintained below the tailings hydrocarbon content threshold level. In some implementations, the controller can further be operative to take input from the oil sand slurry composition measurement apparatus 302 to adjust an operational setpoint based upon a current composition of the oil sand slurry stream input into the PSV 206. For example, in response to a rapidly changing hydrocarbon content of the oil sand slurry stream, the controller can slow the pump speed to allow time for conditions in the PSV 206 to stabilise. Similarly, in conditions where upstream ore processing operations are idling, make-up water can be added to the oil sand slurry stream 106 to replace the oil sand that is not being supplied to the oil sand slurry stream 106. Upon determining the increase in water content of the oil sand slurry stream 106, the controller can speed up the pump speed to dispose of the additional make-up water.

In an implementation, the controller can use a condition of online middlings measurement apparatus 308 to adjust the operational setpoint. For example, the controller can increase the pump speed until a middlings hydrocarbon content estimate is determined by the middlings measurement apparatus 308 reaches a minimum threshold level. Accordingly, in the implementation the controller can adjust the pump speed to ensure the middlings layer contains an optimum hydrocarbon content. Accordingly, the controller can react to current conditions in the PSV 206 to maximise throughput, while keeping a composition of tailings streams 211, 212 within operational limits.

In an implementation, the oil sand slurry stream 106 can be throttled to reduce inflow into the PSV 206 to allow more time for the tailings layer to be processed in the PSV 206, based upon current composition estimates. In an implementation, the composition estimates can be processed in near real-time, allowing for remedial action to be taken in response to the estimate, maintaining the PSV 206 within target operational conditions.

Referring to FIG. 3, online tailings measurement apparatus 304, 309, 316 can be situated proximate to a tailings stream 211, 212, 235 to provide composition estimates of samples of the tailings stream 211, 212, 235 before arriving at tailings 114. In an implementation, the tailings measurement apparatus 304, 309, 316 can sample the tailings stream 211, 212, 235 proximate diversion line 213, 225, 237. In an implementation, the tailings measurement apparatus 304, 309, 316 can sample the contents of the diversion line 231, 225, 237 in place of the tailings stream 211, 212, 235.

In general, it is advantageous to sample the tailings stream 211, 212, 235 at a location proximate the diversion to collector 214, 226, 238 to allow for cross-comparison of measurement samples taken by measurement apparatus 304, 309, 316 with a collected sample collected by collector 214, 226, 238. The cross-comparison can allow, for instance, for a calibration of the measurement apparatus 214, 226, 316 by comparing an average of the measurement samples taken over the collection period with results of laboratory analysis conducted on the collected sample.

A composition of the tailings stream 211, 212, 235 has various considerations, including both regulatory requirements and operational requirements to maximise hydrocarbon recovery from the oil sand slurry. Accordingly, the tailings measurement apparatus 304, 309, 316 can provide an estimate of a hydrocarbon content, a process fluid content and/or a mineral component content of the samples of the tailings stream 211, 212, 235.

The estimate can be used to determine whether remedial action should be taken before delivering the tailings stream 211, 212, 235 to tailings 114. For instance, if the hydrocarbon content or the process fluid content of the samples is above a target threshold, a controller can re-direct a corresponding portion of the tailings stream 211, 212, 235 to a holding pond to allow for re-processing before directing to tailings 114. Accordingly, a composition of the tailings stream 211, 212, 235 delivered to tailings 114 can be more tightly controlled to avoid inadvertent loss of recoverable diluted bitumen product, or inadvertently exceeding a controlled component limit within the tailings stream 211, 212, 235.

Referring to FIG. 3, an online bitumen froth stream measurement apparatus 306 can be situated proximate to bitumen froth stream 215 supplying storage tank 216 to provide composition estimates of samples of the bitumen froth stream 215 before arriving at secondary extraction 218. In an implementation, the bitumen froth stream measurement apparatus 306 can provide estimates of a hydrocarbon content, a process fluid content and a mineral component content to confirm a composition of the bitumen froth stream 215 supplied by the PSV 206 remains within target limits.

Referring to FIG. 3, in an implementation an online bitumen froth stream measurement apparatus 311 can be situated proximate to bitumen froth stream 217 to provide composition estimates of samples of the bitumen froth stream 217, and a recycled process fluid measurement apparatus 310 can be situated proximate to recycled process fluid stream 221 to provide composition estimates of samples of the recycled process fluid stream 221. In an implementation, the bitumen froth stream measurement apparatus 311 and the recycled process fluid measurement apparatus 310 can provide estimates of an additive component content of the recycled process fluid stream 221. In an implementation, the additive component can comprise a diluent. In an implementation, a controller can be provided to adjust an input of the recycled process fluid stream 221 into the bitumen froth stream 217 based upon a content of diluent determined by the bitumen froth stream measurement apparatus 311 and a content of diluent estimated by the recycled process fluid measurement apparatus 310 to obtain a target diluent content of the bitumen froth stream input into secondary extraction 218.

Referring to FIG. 3, an online diluted bitumen product measurement apparatus 312 can be situated proximate to the diluted bitumen product stream 110 to provide composition estimates of samples of the diluted bitumen product stream 110. In an implementation, the diluted bitumen product measurement apparatus 312 can provide estimates of a composition of samples of the diluted bitumen product stream 110 including a hydrocarbon content, a water content, a mineral component content, a chloride content, and/or a diluent content. The estimate can be used to determine whether remedial action should be taken before delivering the diluted bitumen product stream 110 to downstream upgrading operations 112, 126 and refining operations 115, 130. For instance, if the mineral component content or the diluent content of the samples is above a target threshold, a controller can re-direct a corresponding portion of the diluted bitumen product stream 110 for re-processing in extraction 108 or diluted bitumen from multiple oilsands and in-situ operations can be blended in a time varying ratio to keep the compositions within pre-defined limits. Accordingly, a composition of the diluted bitumen product stream 110 delivered to upgrading operations 112, 126 and refining operations 115, 130 can be more tightly controlled to avoid inefficiencies in downstream processing or damage to incompatible downstream components.

Referring to FIG. 3, an online tails measurement apparatus 314 can be situated proximate to the tails stream 229 to provide composition estimates of samples of the tails stream 229. In an implementation, the tails measurement apparatus 314 can provide estimates of a composition of samples of the tails stream 229 including at least a diluent content. The estimate can be used to assist in downstream processing of the tails stream 229 in tails separator 222 to recycle diluent and/or a process fluid such as water.

In an implementation, online tailings measurement sensor 316 can provide an estimate of a diluent content of the tails stream 229 to a controller. In response to the estimate, the controller can adjust the operation of the tails separator 222 to reduce the diluent contained in the tails stream 229. For instance, the controller can act to increase the steam added in diluent recovery units within tails separator 222 when the diluent content exceeds a diluent threshold level. Similarly, when the diluent content is below a minimum threshold, the controller can reduce the steam added to the diluent recovery units.

Accordingly, in an implementation composition estimates obtained by online infrared measurement apparatus can be used as inputs to one or more operational controllers to operate components of extraction 108 at optimal levels to reduce bitumen (hydrocarbon) losses through tailings streams 211, 212, 229, minimise the input of diluent through recycled process fluid stream 221, and use a lower level of hot process water, but still achieve sufficient bitumen separation.

In an implementation, extraction 108 can operate to maximise a hydrocarbon content of the diluted bitumen product stream 110, while minimising water content and mineral content. Composition estimates of the diluted bitumen product stream 110 can be sent to downstream upgrading operations 112 to assist with downstream processing.

In an implementation, extraction 108 can operate to minimise bitumen content and diluent content of the tailings product streams 211, 212, 235, while maximising water content. Online composition estimates of the diluted tailings product streams 211, 212, 235 can be sent to tailings 114 to assist with downstream processing, to maintain regulatory compliance.

In an implementation, extraction 108 can operate to minimise bitumen content and water content of the recycled diluent stream 233, while maximising diluent content. Online composition estimates of the recycled diluent stream 233 can be provided to assist with downstream processing.

In an implementation, extraction 108 can operate to minimise bitumen content and diluent content of the recycled process fluid stream 239, while maximising water content. Online composition estimates of the recycled process water stream 239 can be provided to assist with downstream processing.

Figure 4:
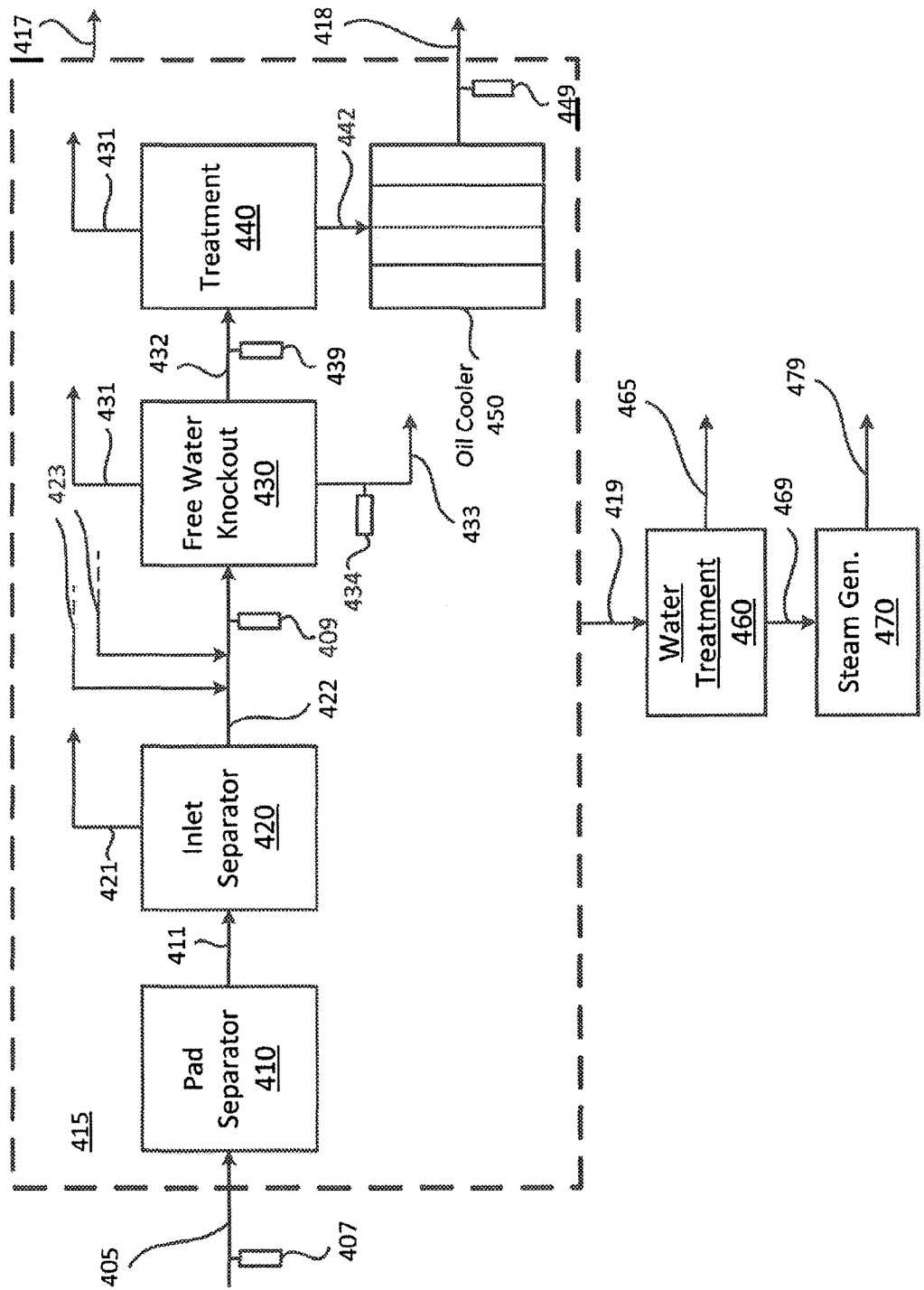
FIG. 4 is a process flow diagram illustrating an embodiment of the in-situ facility of FIG. 1b.

Referring to FIG. 4, in an implementation a simplified process diagram of a portion of an in-situ mining operation 120 is illustrated. A wellhead product stream 405 is directed to a pad separator 410. The pad separator output 411 is directed towards oil treatment and removal 415. Oil treatment and removal 415 produces a gas product stream 417, a diluted bitumen product stream 418 and a water product stream 419. The water product stream 419 is directed to water treatment 460 which produces a disposal water stream 465 for disposal, for instance in tailings 114, and a recycled water stream 469. The recycled water stream 469 is directed towards steam generation 470 which generates a steam product stream 479 for injection to a well.

In FIG. 4, relevant components of oil treatment and removal are illustrated, though additional processing operations are omitted for clarity. The pad separator output 411 can be directed to an inlet separator 420 at oil treatment 415. The inlet separator 420 produces a separated gas stream 421, and a separated liquids stream 422. The separated gas stream 421 can undergo further processing to produce a produced gas output 417, as well as a recycled liquid component 423. The recycled liquid component 423 is typically added back to the separated liquids stream 422 for further processing.

The separated liquids stream 422 is input to a free water knock out 430. The free water knock out 430 produces a produced gas output 431, a bitumen-rich process stream 432, and a water-rich process stream 433. The bitumen-rich process stream 432 can undergo further processing including treatment 440, which produces a produced gas output 431 and a hot diluted bitumen product stream 442. The hot diluted bitumen product 442 is typically passed through an oil cooler 450, before being produced as the diluted bitumen product stream 418.

Infrared light can be used to obtain an online composition estimate and other physical properties of one or more of the above in-situ process streams to assist in determining process stream compositions, and for use in optimising in-situ operations 120. In an implementation, the process stream can comprise a bitumen-containing wellhead product stream 405 or a processed bitumen-containing wellhead product stream, and the composition estimate can be sampled prior to the addition of diluent. In an implementation, the online composition estimate can be sampled from the diluted processed bitumen-containing wellhead product stream after the addition of diluent. In an implementation, the process stream can comprise a water stream 419, 465, 469 recovered from the well head products, and the online composition estimate can be sampled from the recycled water stream prior to either re-introduction to the process or disposal in a tailings pond.

Referring to FIG. 4, an online well head measurement sensor 407 provides a composition estimate of the wellhead product stream 405, and in particular a bitumen content, and a water content.

An online separated liquids measurement sensor 409, located after recycled liquid components 432 have been added to the separated liquids stream 422. The separated liquids measurement sensor 409 provides a composition estimate of the separated liquids stream 422. An online bitumen-rich measurement sensor 439 provides a composition estimate of the bitumen-rich process stream 432, and an online water-rich measurement sensor 434 provides a composition estimate of the water-rich process stream 433. These online measurement sensors 409, 434, 439 provide current estimates of a bitumen content, a water content, and a diluent content of each of their respective process streams 422, 433, 432.

An online diluted bitumen product measurement sensor 449 provides a composition estimate of the diluted bitumen product stream 418, including a bitumen content, a water content, and a diluent content.

In an implementation, online composition estimates from the well head measurement sensor 407 can be used to provide feedback to the geologists studying the formation in which the well is situated to optimise steam delivery to the well.

In an implementation, online composition estimates from the separated liquids measurement sensor 409, bitumen-rich measurement sensor 439, and water-rich measurement sensor 434 can be provided as inputs to a controller that has operational control over the free water knockout 430. In an implementation, the controller can be operative to adjust an interface level within the free water knock out based upon the water content in the bitumen-rich process stream 432 and the bitumen content in the water-rich process stream 433 leaving the free water knockout 430.

In an implementation, the diluted bitumen product measurement sensor 449 can be included as a further "over-ride" input to the controller. Where there is excess water content in the diluted bitumen product stream 418, the interface level of the free water knock out can be adjusted to reduce the water content in the bitumen-rich product stream 432. Where the water content of the diluted bitumen product stream 418 is below a threshold level, the interface level of the free water knock out can be adjusted until the water content reaches the threshold level, to minimise the bitumen content in the water-rich process stream 433.

In an implementation, composition estimates of the diluent content of the diluted bitumen product stream 418 can be passed to downstream upgrading operations 126 to optimise operation of a diluent recovery unit located in upgrading operations 126. In an implementation a steam input to the diluent recovery unit can be adjusted based upon the diluent content estimate.

In an implementation, the composition estimates of the diluent content of the diluted bitumen product stream 418 can be used to evaluate a quality of the diluted bitumen product stream 418 that may be directed for sale on the open market 123. The evaluation may be used by a controller to adjust one or more operational setpoints of upstream processing operations to keep the estimated diluent content within a target range. The evaluation may be used by a controller to adjust one or more operational setpoints of downstream processing operations to direct the diluted bitumen product stream 418 to a different downstream processing component depending upon the evaluation.

FIGS. 5a to 18b are a selection of experimental results from experiments demonstrating the efficacy of estimating a composition of bitumen-containing process stream using infrared light, for the intended purpose of process and quality control.

Figure 5A:
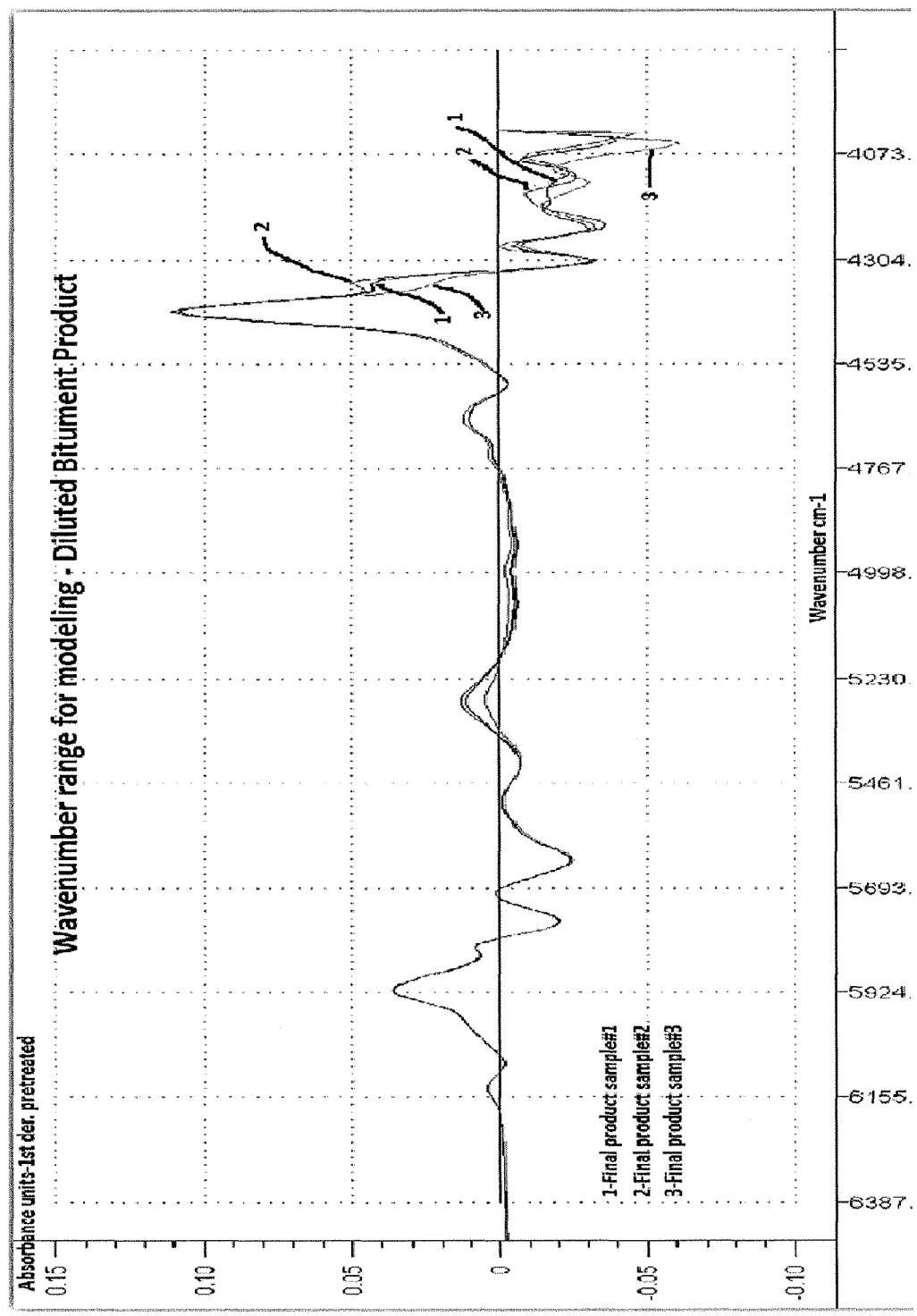
FIG. 5a contains exemplar plots of absorbance spectra from 3 diluted bitumen product samples taken at a same location in the process line.
Figure 5B:
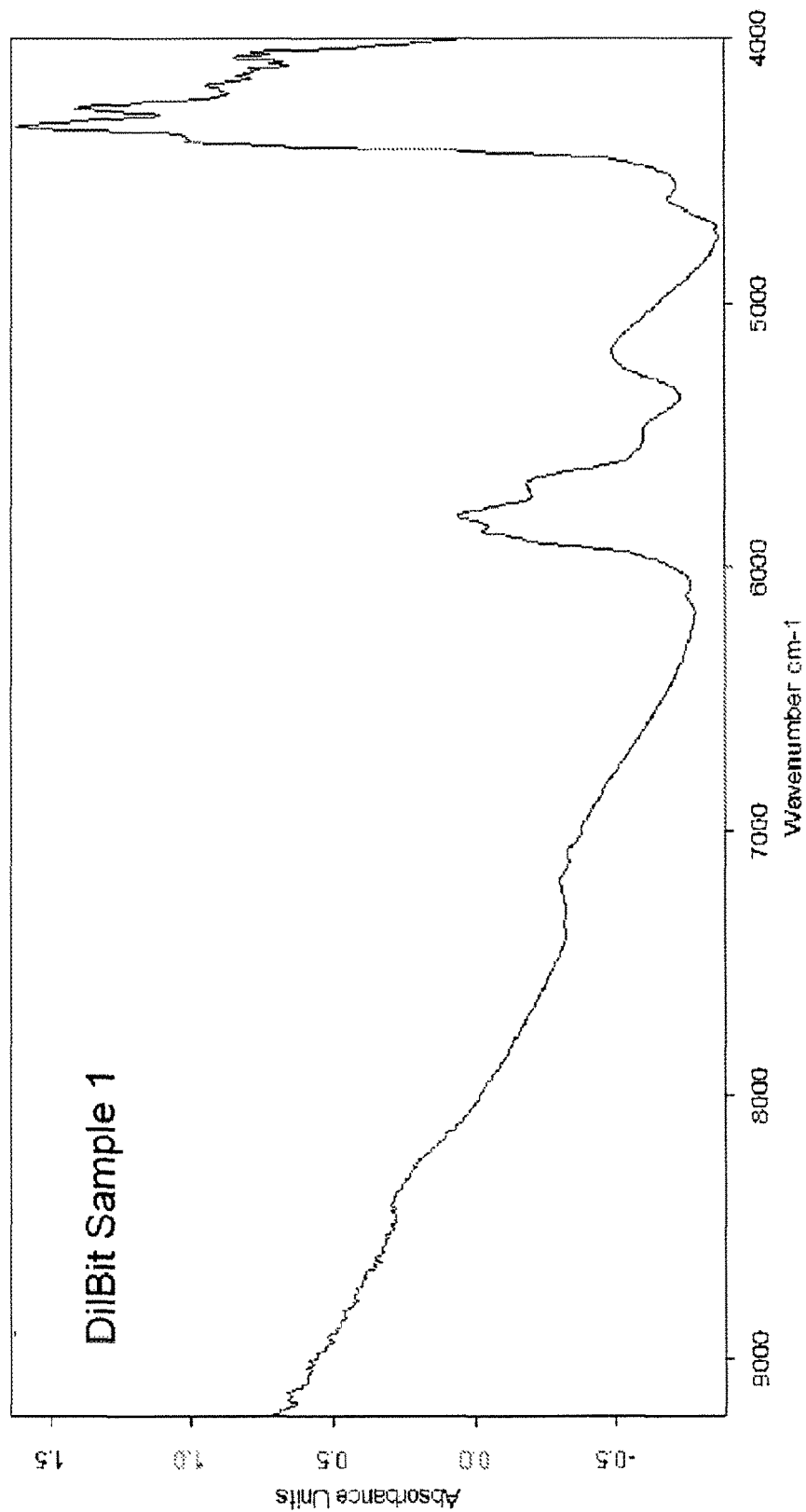
FIG. 5b contains an exemplar plot of a narrow range of an absorbance spectra for a diluted bitumen product sample.
Figure 5C:
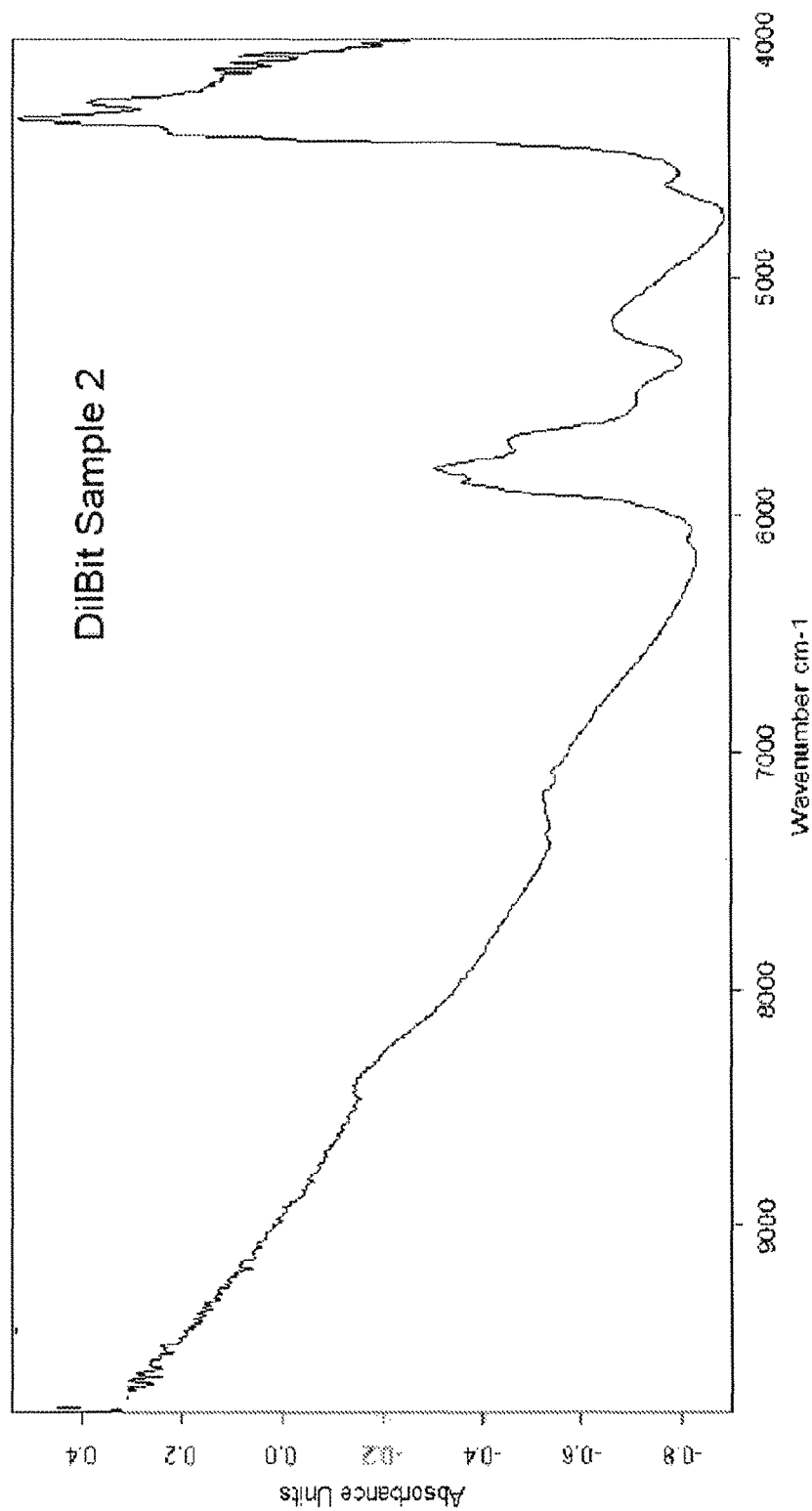
FIG. 5c contains an exemplar plot of a narrow range of an absorbance spectra for another diluted bitumen product sample.
Figure 6A:
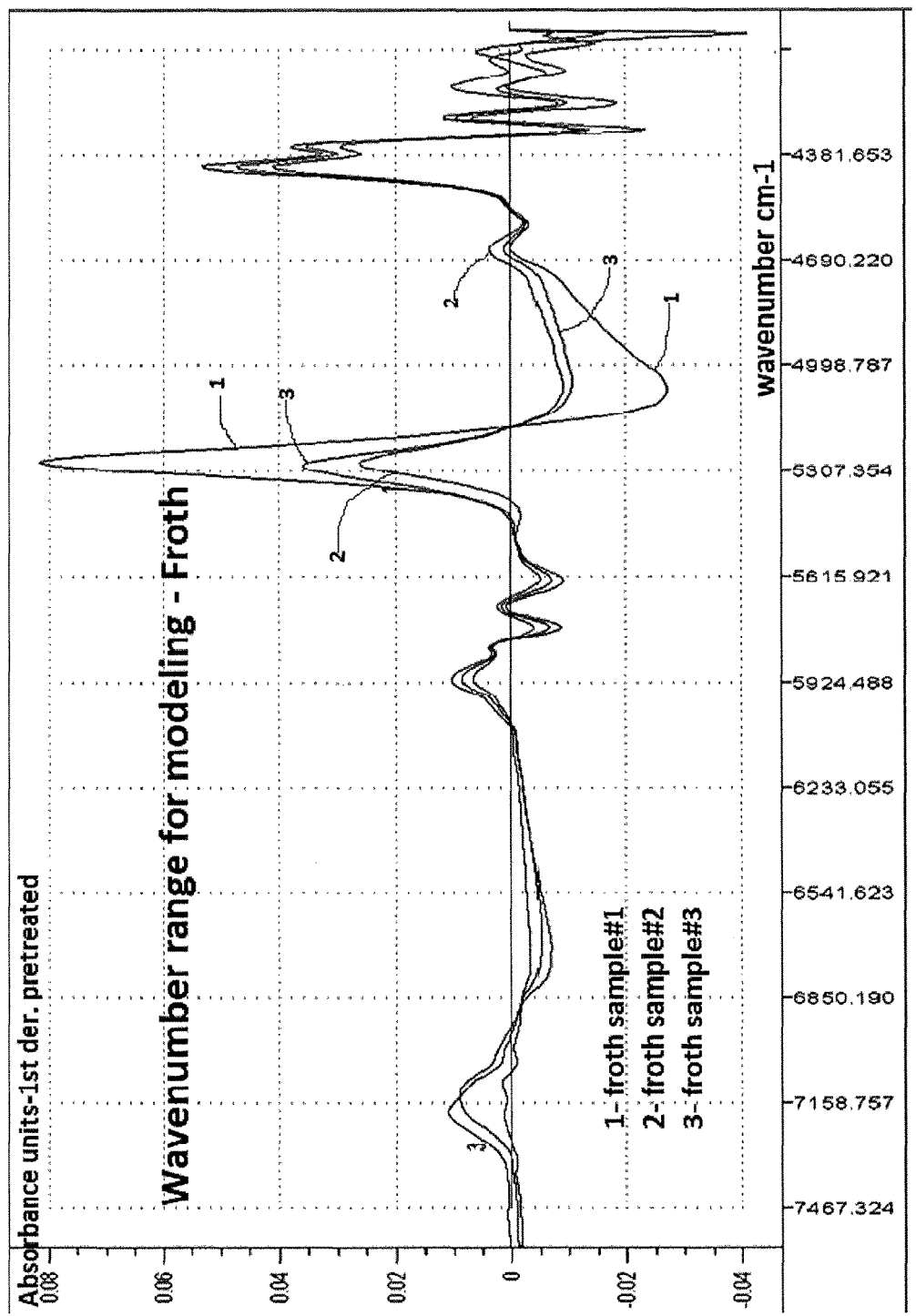
FIG. 6a contains exemplar plots of absorbance spectra from 3 bitumen froth samples taken at a same location in the process line.
Figure 6B:
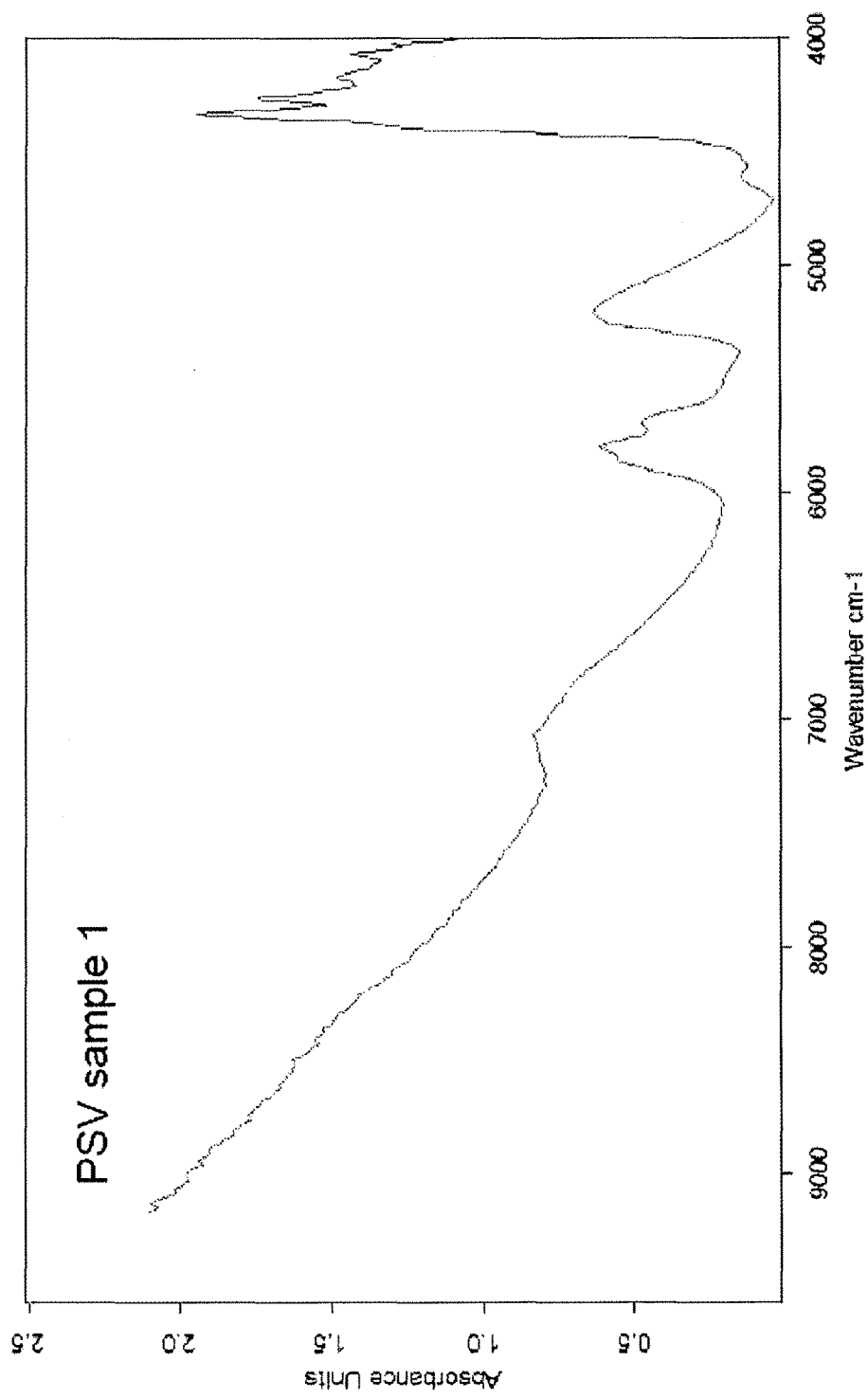
FIG. 6b contains an exemplar plot of a narrow range of an absorbance spectra for a bitumen froth sample taken at the primary separation vessel.
Figure 6C:
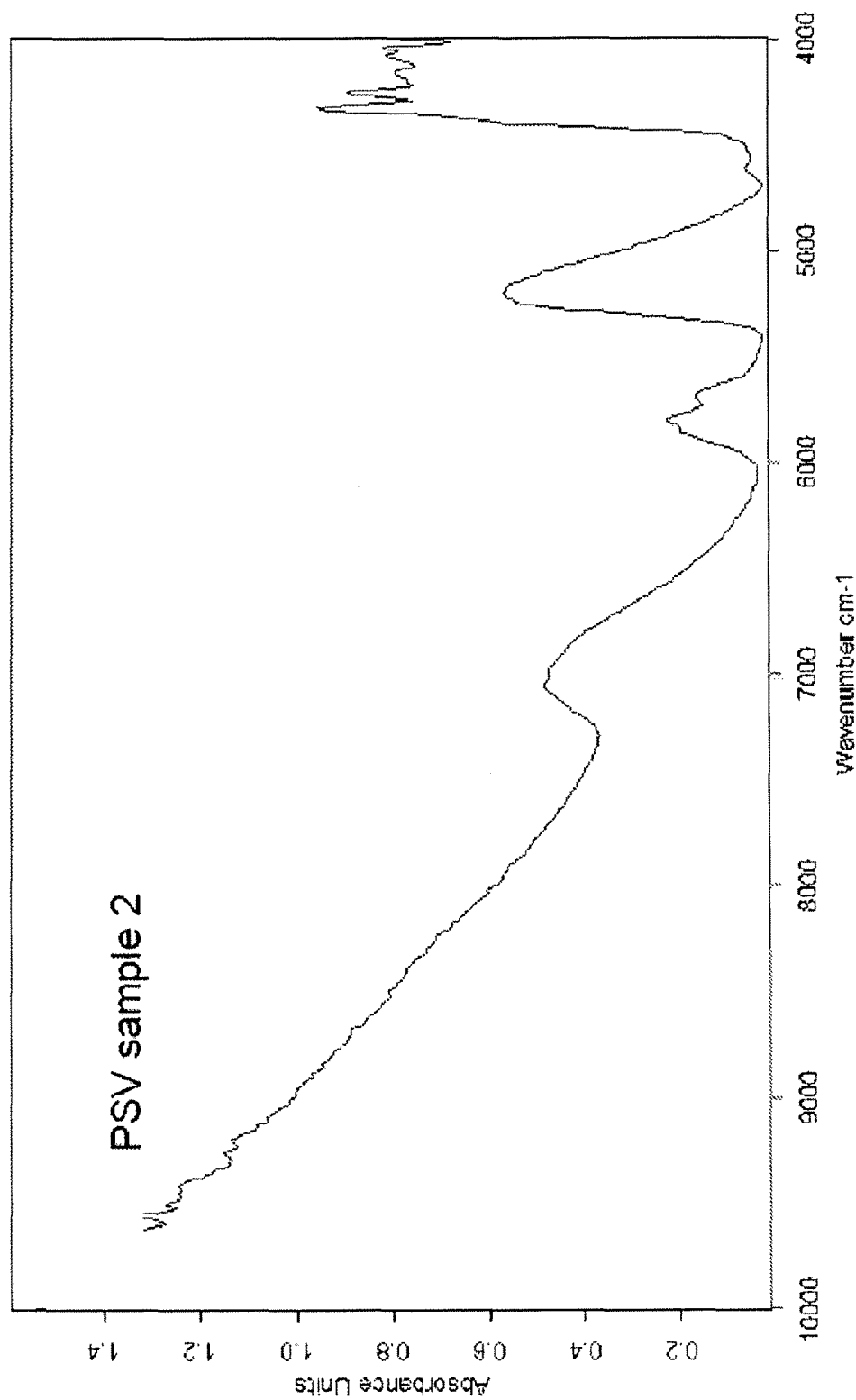
FIG. 6c contains an exemplar plot of a narrow range of an absorbance spectra for another bitumen froth sample taken at the primary separation vessel.

Referring to 5a, a spectra of three diluted bitumen product samples are plotted on a single plot for comparison. The three diluted bitumen product samples were all collected by the same measurement apparatus at the same location in extraction 108. FIGS. 5a and 5b illustrate individual spectra for two diluted bitumen product samples FIGS. 6a to 6c are spectra of samples collected from a bitumen froth stream by the same measurement apparatus at a single location.

Figure 7A:
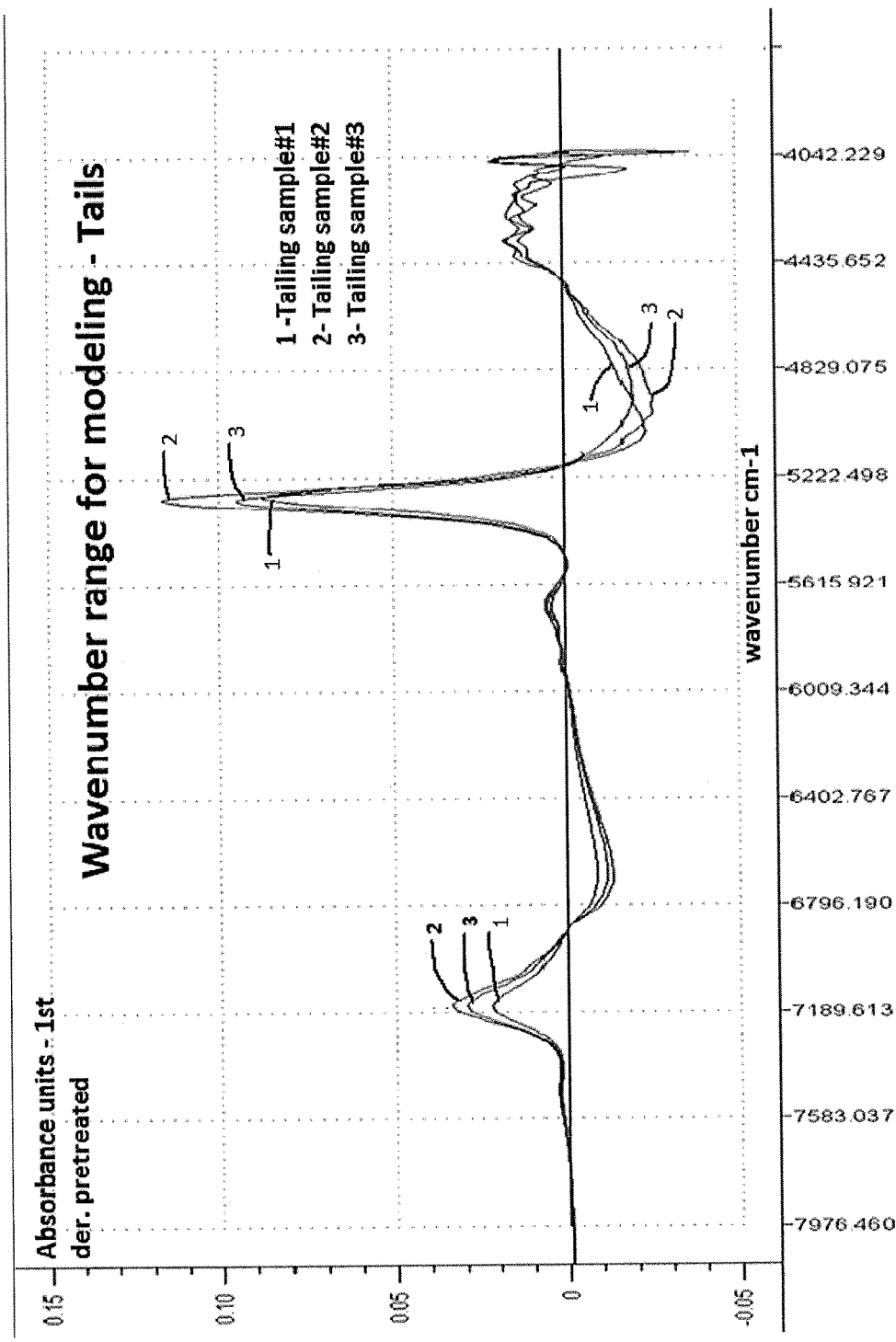
FIG. 7a contains exemplar plots of absorbance spectra from 3 tailings samples taken at a same location in the process line.
Figure 7B:
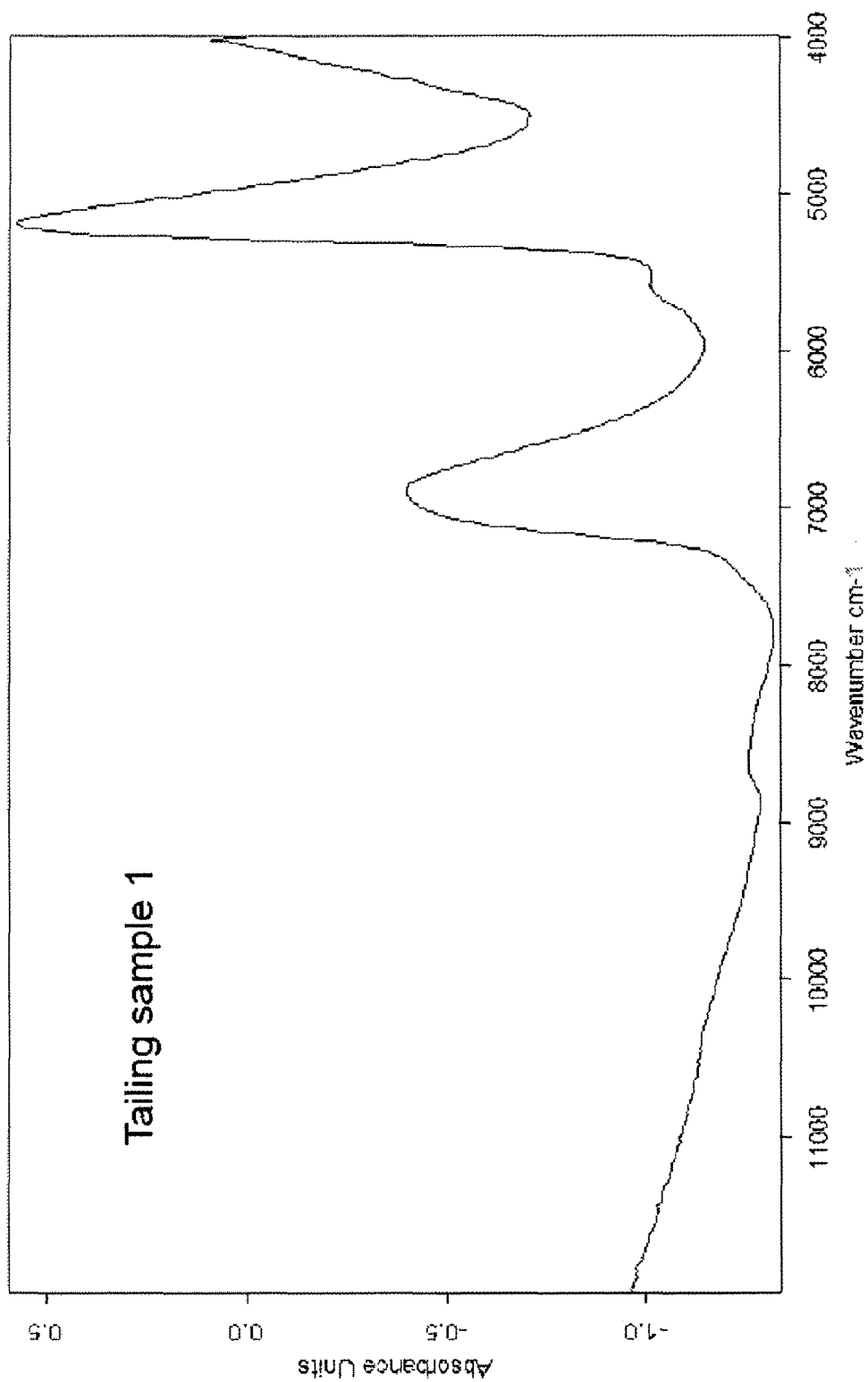
FIG. 7b contains an exemplar plot of a narrow range of an absorbance spectra for a tailings sample.
Figure 7C:
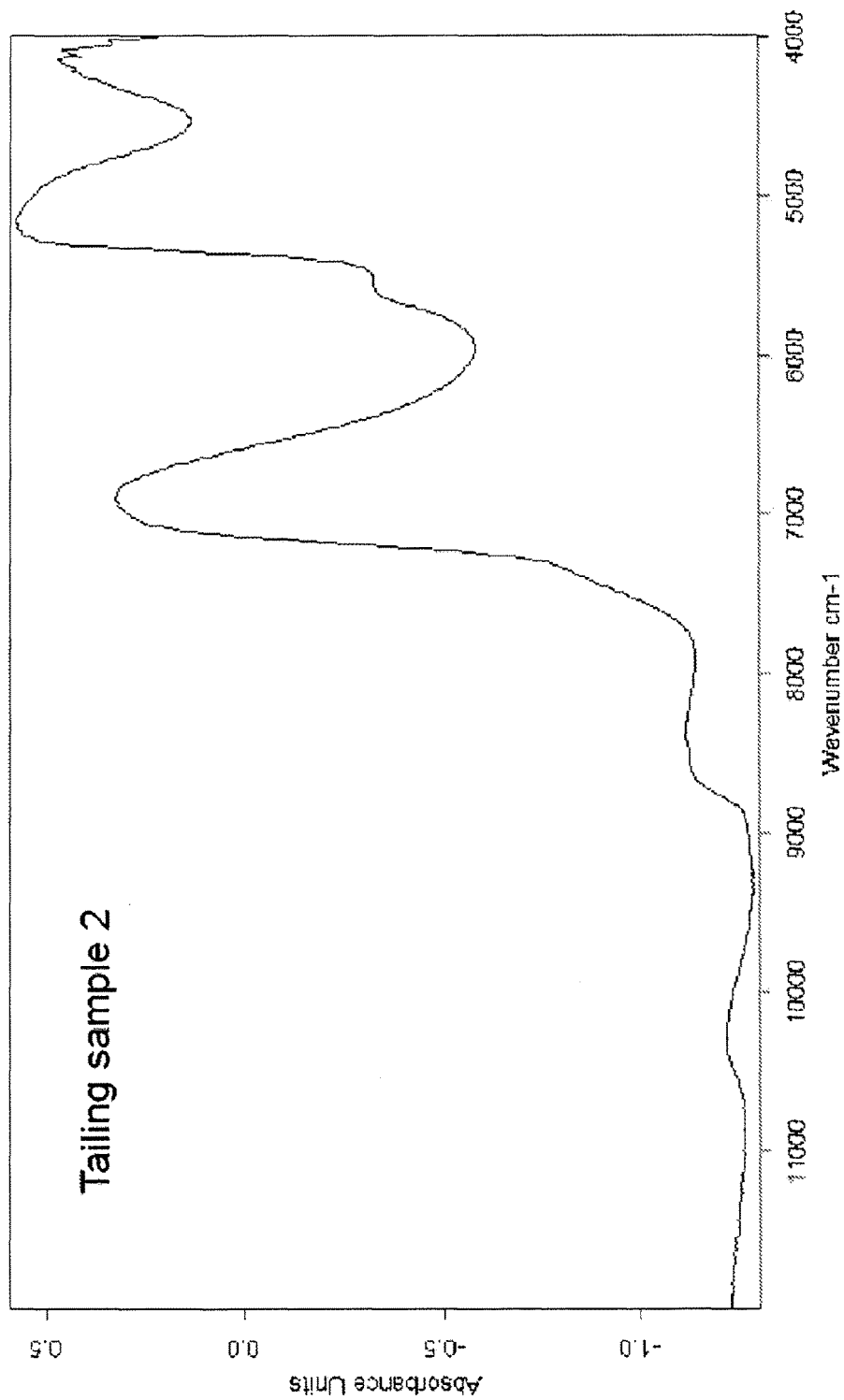
FIG. 7c contains an exemplar plot of a narrow range of an absorbance spectra for another tailings sample.

FIGS. 7a to 7c are spectra of samples collected from a tailings stream by the same measurement apparatus at a single location.

Figure 8:
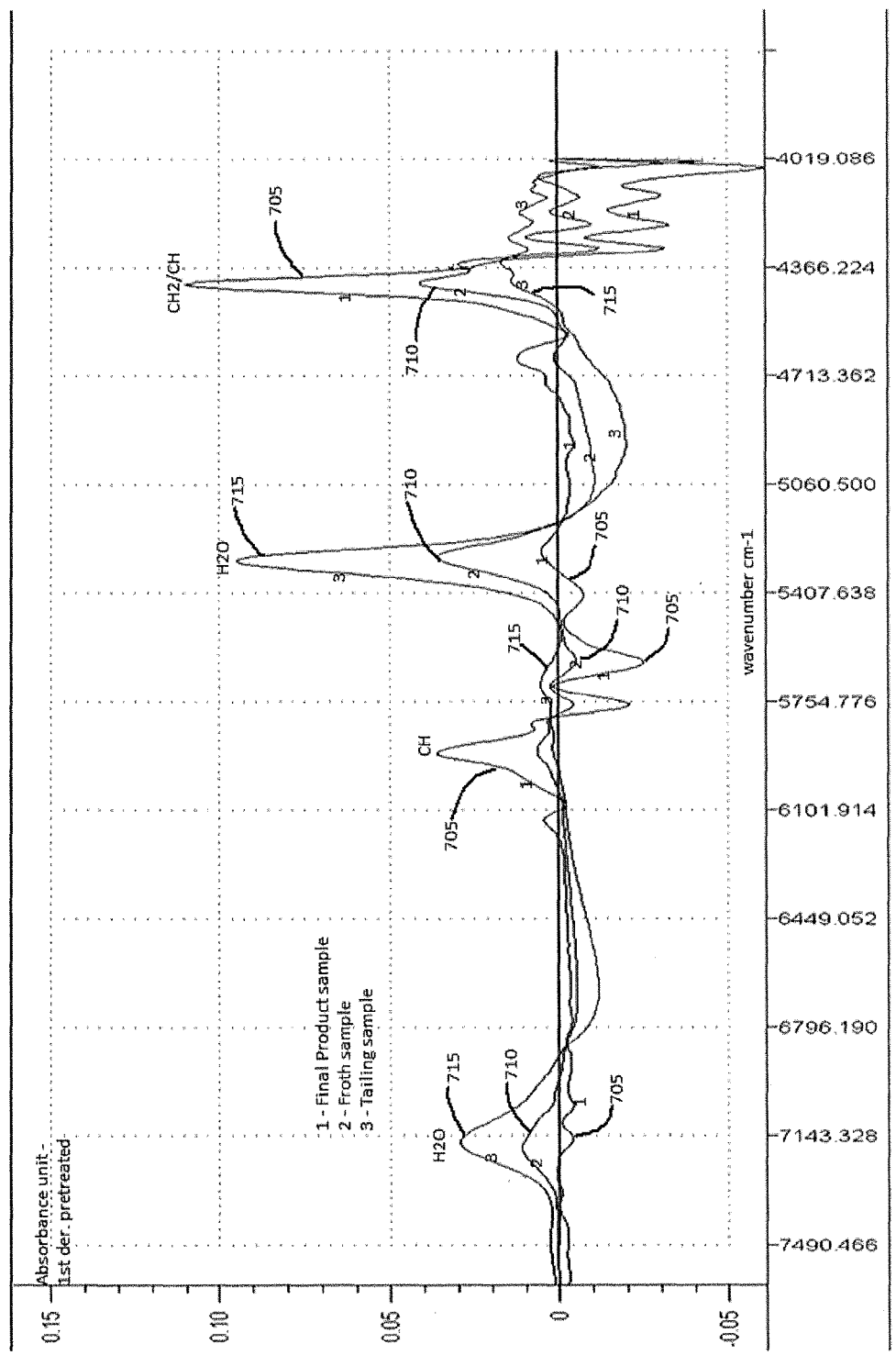
FIG. 8 is a composite plot of samples from each of a diluted bitumen stream, a bitumen froth stream, and a tailings stream.

FIG. 8 is an exemplar comparison plot of superimposed spectra obtained from capturing from infrared light reflected from each of a diluted bitumen product sample 705, a bitumen froth sample 710, and a tailings sample 715. The absorbance spectra are indicative of which wavelengths of infrared light were preferentially absorbed by components of the sample. The x-axis indicates a wavenumber of captured light, and the y-axis indicates a magnitude of the light absorbed at each wavelength. On the plot, features such as absorption peaks that are associated with specific components including $H_2O$, CH, and $CH_2$ are identified. Features in the spectra, such as these peaks, are identified by the multivariate modeling and used to evaluate spectra collected from future samples.

The results show the different characteristics of each type of bitumen-containing fluid: diluted bitumen product sample 705; bitumen froth sample 710; and, tailings sample 715, based upon which bands of light are preferentially absorbed by components of each sample. The magnitude of the absorbance can provide an estimate of an amount or content of each component, present in the sample. For, instance, the $H_2O$ peaks for the diluted bitumen product sample 705 are minimal compared to the $H_2O$ peaks for the bitumen froth sample 710, and tailings sample 715 which is indicative of minimal water content in the diluted bitumen product sample 705 as expected. Similarly, the diluted bitumen product sample 705 exhibits enhanced hydrocarbon peaks for CH and $CH_2$, as compared with the bitumen froth sample 710, and the tailing sample 715 exhibits the lowest hydrocarbon peaks of the three spectra.

Specific chemical components from each type of bitumen-containing fluid can further be identified by comparing an absorbance spectra from a sample with a calibrated model. The model can be calibrated, for instance, by directing infrared light towards a series of known samples, a training set of samples. The composition of each of the samples can be determined through other means, such as destructive laboratory testing, to provide a reference value for each sample. The absorbance spectrum for each sample can be evaluated using multivariate calibration (i.e. PLS, PCA, or NN's) to construct a model that relates the spectrum to the component content determined through the alternate means.

Figure 9A:
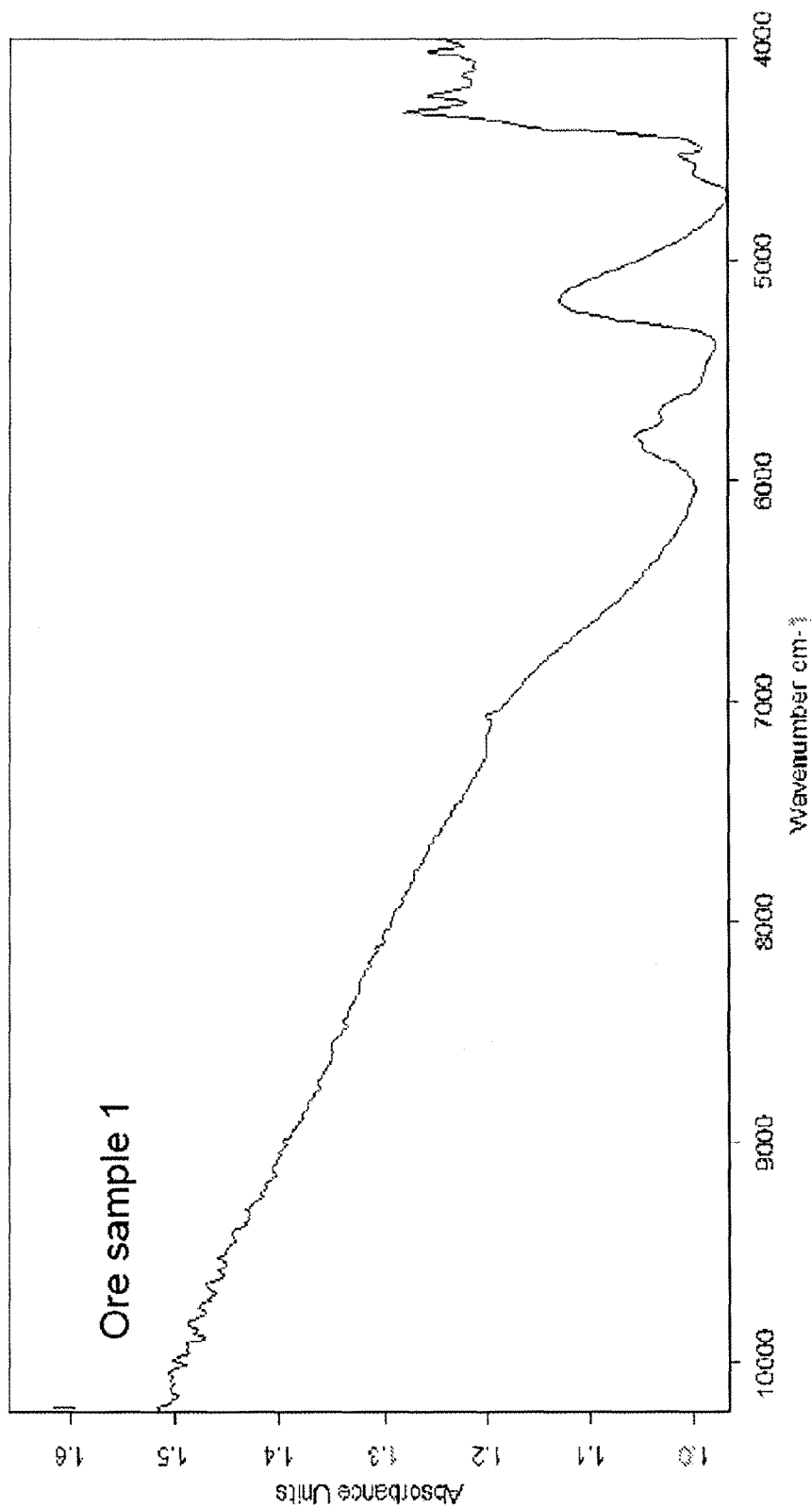
FIG. 9a is an exemplar plot of absorbance spectra from an oil sands ore sample.
Figure 9B:
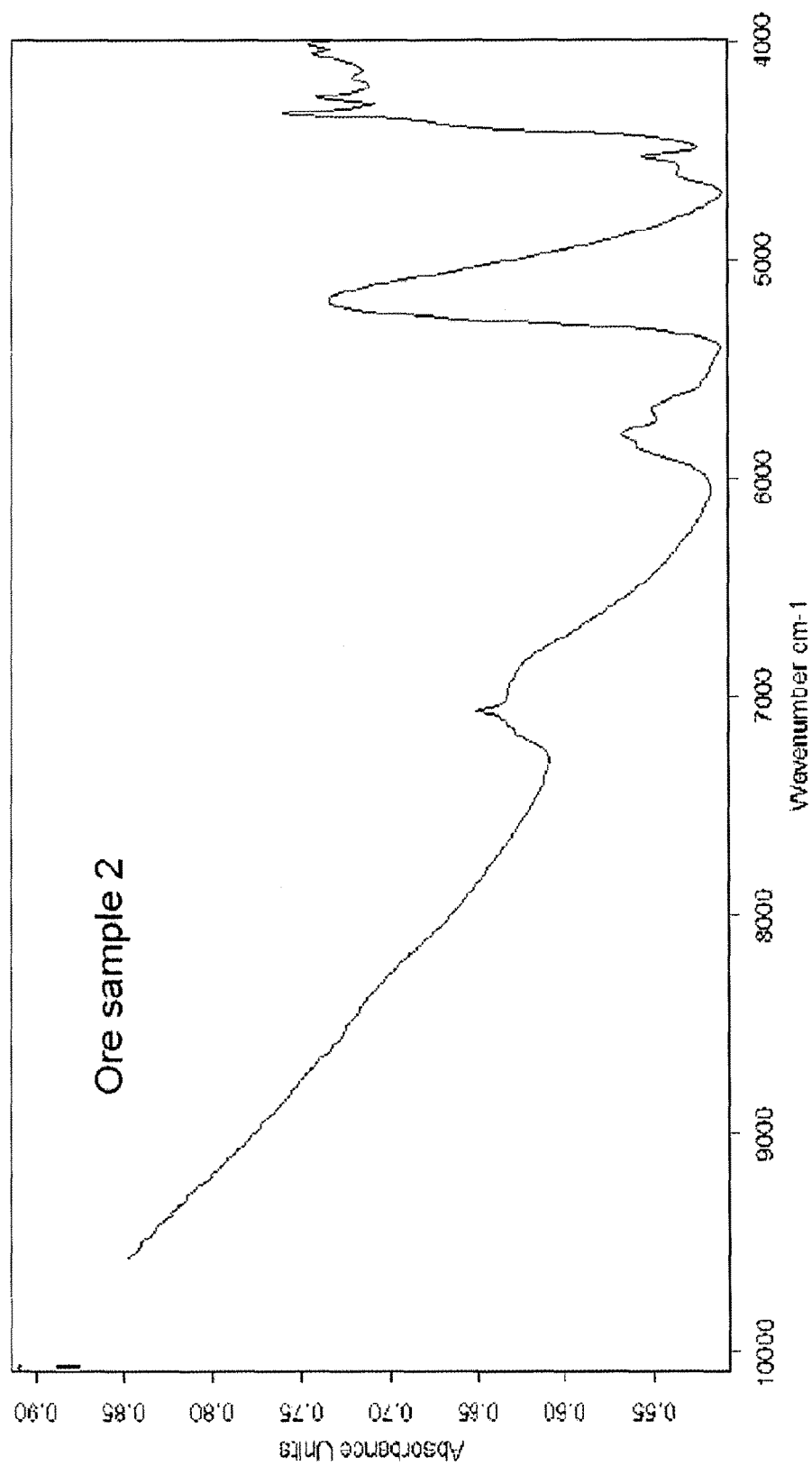
FIG. 9b is an exemplar plot of absorbance spectra from another oil sands ore sample.

Referring to FIGS. 9a and 9b, exemplar plots of absorbance spectra captured from two oil sands ore samples are provided. The ore absorbance spectra can typically be used to estimate a bitumen content of the ore.

Experimental results have been produced for estimating contents of a variety of components contained in a variety of bitumen-rich process streams including concentration estimates of the: bitumen component; water component; mineral component; chloride component; diluent component; size distribution of fines particles; density; viscosity; and, hydrocarbon component.

The applicant has provided some exemplar validation plots used to validate calibration models that have been referenced from a selection of the bitumen-containing process streams for estimating the various components. The applicant has further determined that models can be calibrated for both extraction-based bitumen-containing process streams, and for in-situ-based bitumen-containing process streams. As mentioned above, it is typically useful to calibrate the models for each process stream and measurement apparatus.

FIGS. 10a-17 illustrate models validated for extraction-based bitumen-containing process stream, and confirm the accuracy of the estimation method for a variety of composition estimates. FIGS. 18a-18c are exemplar validation plots for insitu-based bitumen-containing process streams.

Figure 10A:
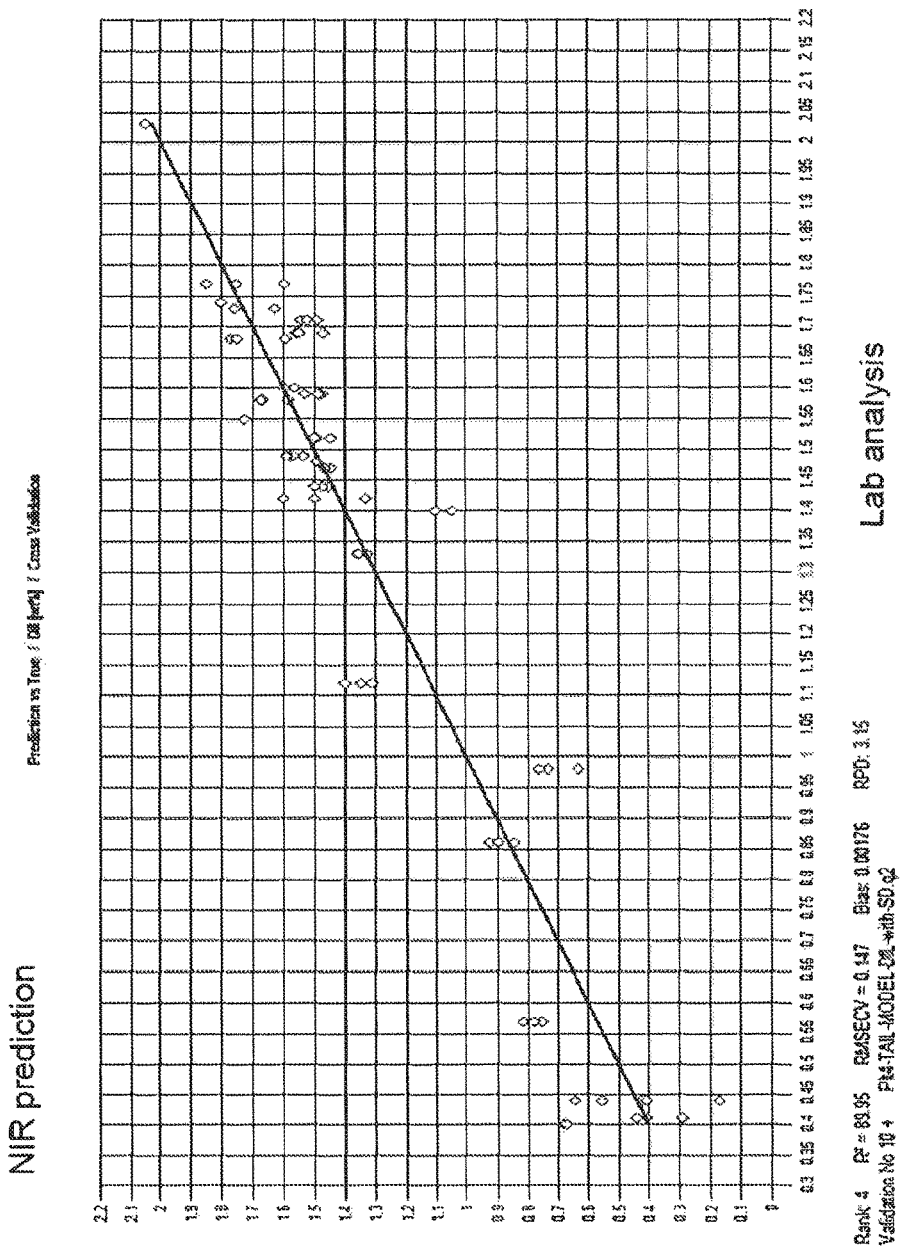
FIG. 10a is a validation comparison scatter plot comparing a model predicted diluent wt % estimation vs. a laboratory measurement for multiple samples.
Figure 10B:
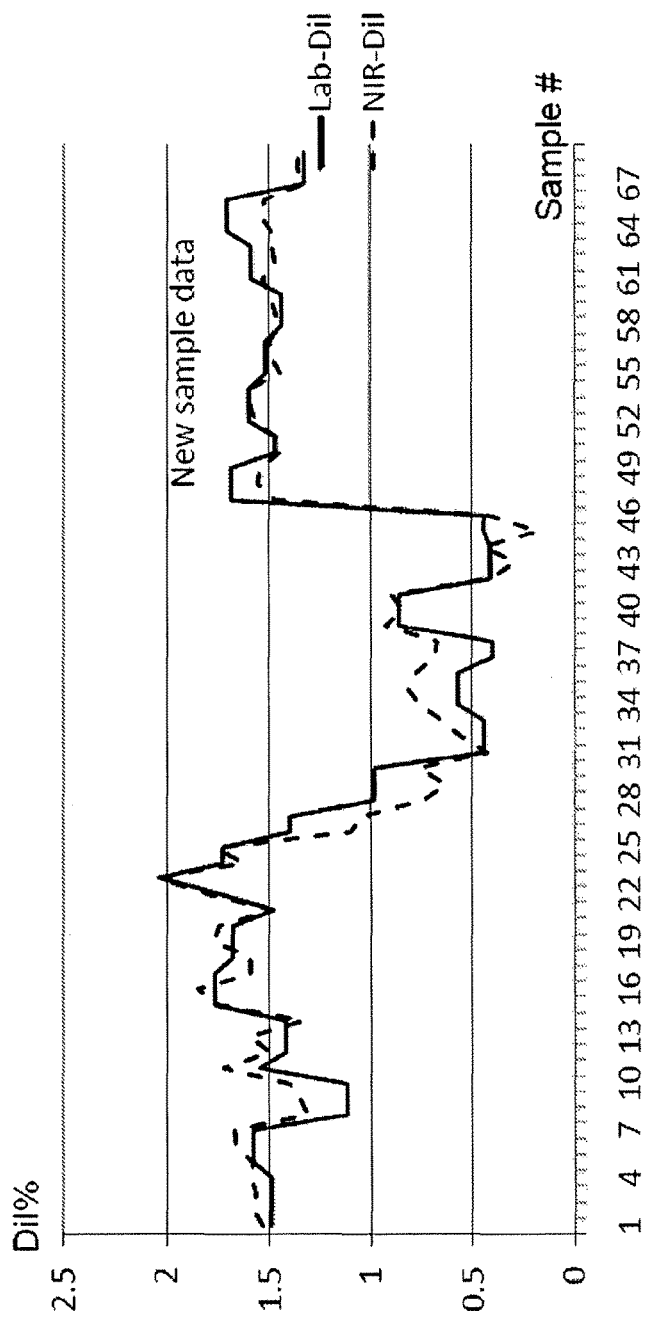
FIG. 10b is a validation comparison line plot comparing a model predicted diluent wt % estimation vs. a laboratory measurement for multiple samples.

FIG. 10a illustrates a validation comparison scatter plot comparing a NIR model predicted diluent wt % estimation vs. a laboratory measurement for multiple samples is provided. FIG. 10b is a validation comparison line plot comparing a NIR model predicted diluent wt % estimation vs. a laboratory measurement for multiple bitumen-containing fluid samples. As can be seen, the NIR model provides estimates that track fairly closely to the laboratory estimate. Furthermore, the NIR model provides estimates that track a changing diluent percentage between a laboratory collection cycle, such that the laboratory estimate lags the NIR model estimate at several locations on the plot.

Figure 11A:
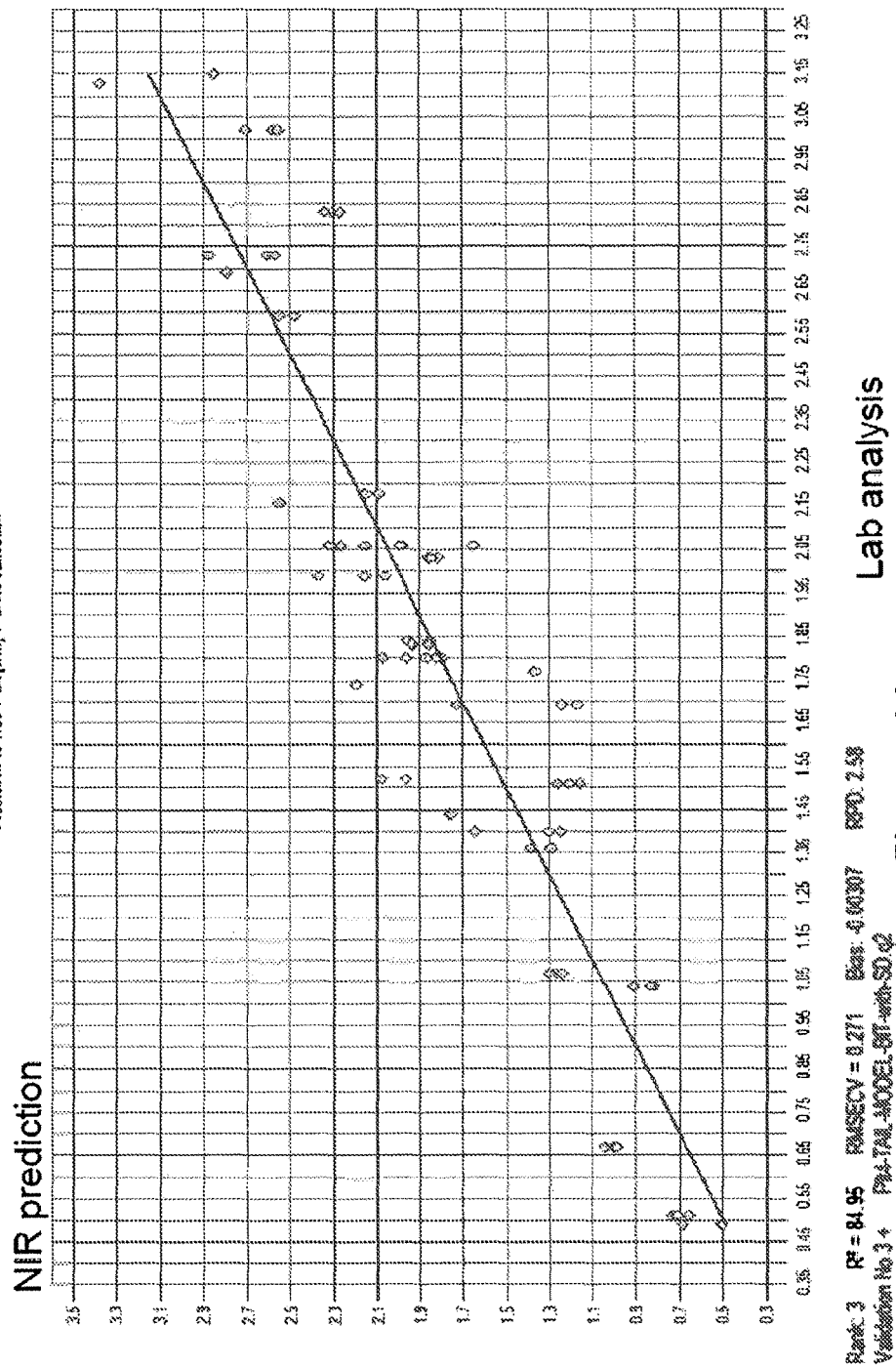
FIG. 11a is a validation comparison scatter plot comparing a model predicted bitumen wt % estimation vs. a laboratory measurement for multiple samples.
Figure 11B:
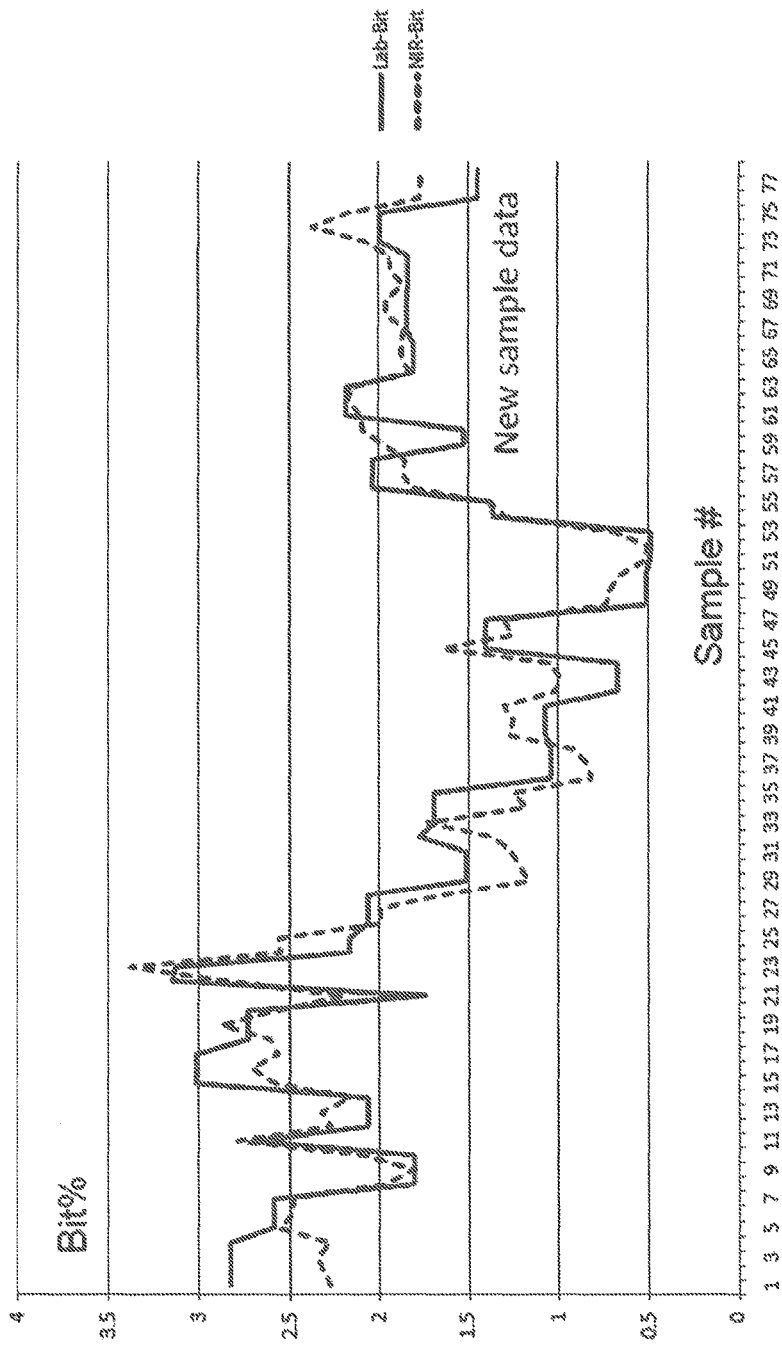
FIG. 11b is a validation comparison line plot comparing a model predicted bitumen wt % estimation vs. a laboratory measurement for multiple samples.

FIG. 11a illustrates a validation comparison scatter plot comparing a NIR model predicted bitumen wt % estimation vs. a laboratory measurement for multiple bitumen-containing fluid samples is provided. FIG. 11b is a validation comparison line plot comparing a NIR model predicted bitumen wt % estimation vs. a laboratory measurement for multiple samples.

Figure 12A:
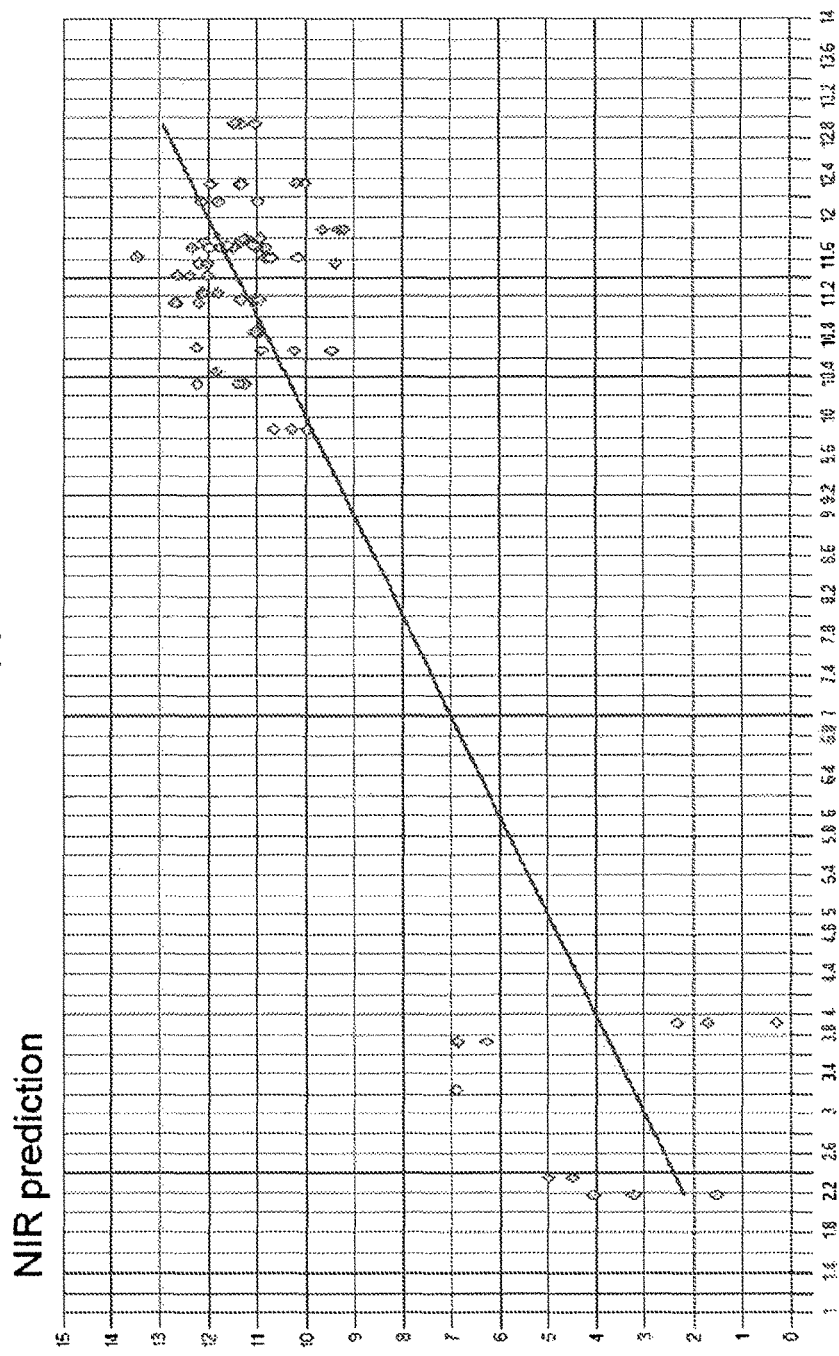
FIG. 12a is a validation comparison scatter plot comparing a model predicted mineral wt % estimation vs. a laboratory measurement for multiple samples.
Figure 12B:
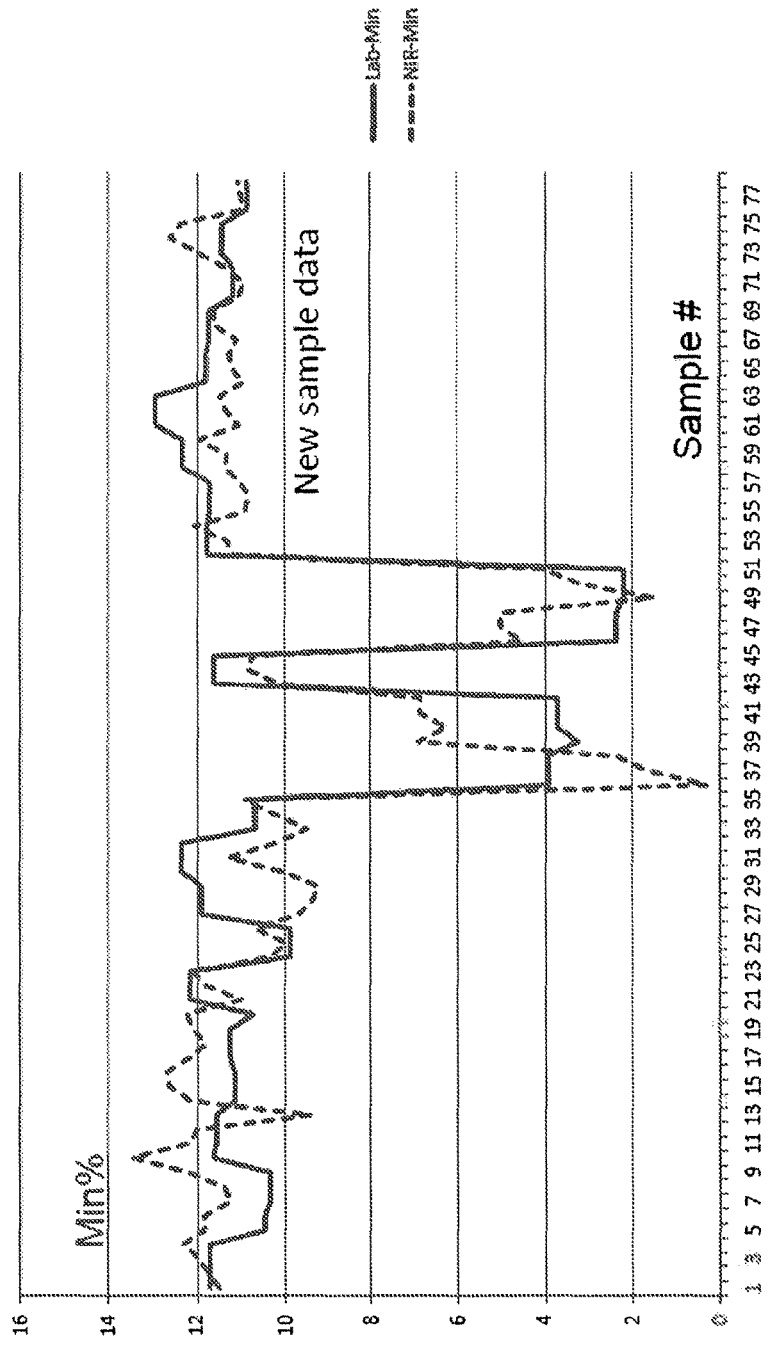
FIG. 12b is a validation comparison line plot comparing a model predicted mineral wt % estimation vs. a laboratory measurement for multiple samples.

FIG. 12a illustrates a validation comparison scatter plot comparing a NIR model predicted mineral wt % estimation vs. a laboratory measurement for multiple bitumen-containing fluid samples is provided. FIG. 12b is a validation comparison line plot comparing a NIR model predicted bitumen wt % estimation vs. a laboratory measurement for multiple samples. As illustrated, there are a number of estimates where there is a large variance between the NIR model predicted estimation and the laboratory measurement, likely due to the increased sampling period for the laboratory measurement.

Figure 13A:
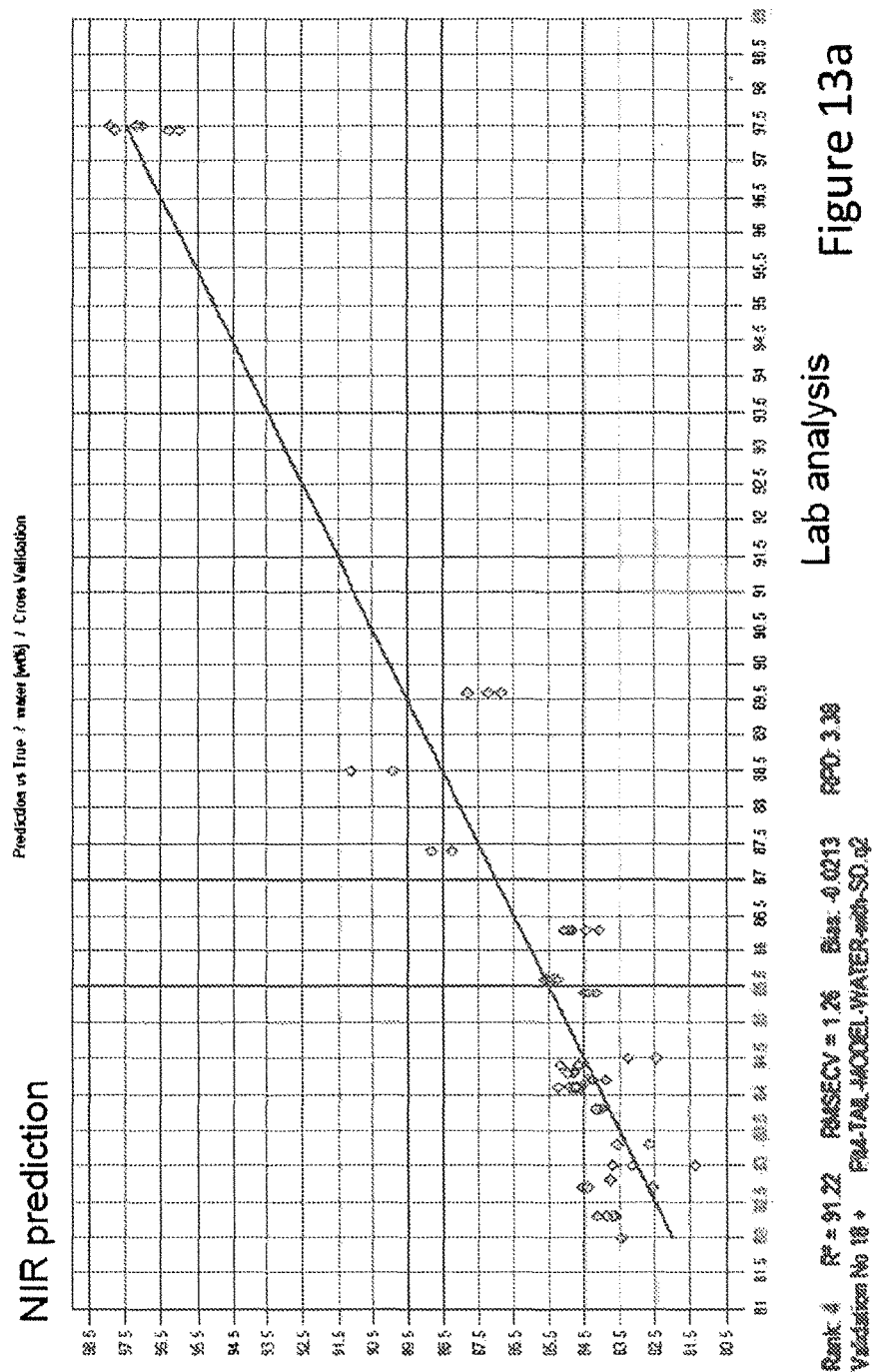
FIG. 13a is a validation comparison scatter plot comparing a model predicted water wt % estimation vs. a laboratory measurement for multiple samples.
Figure 13B:
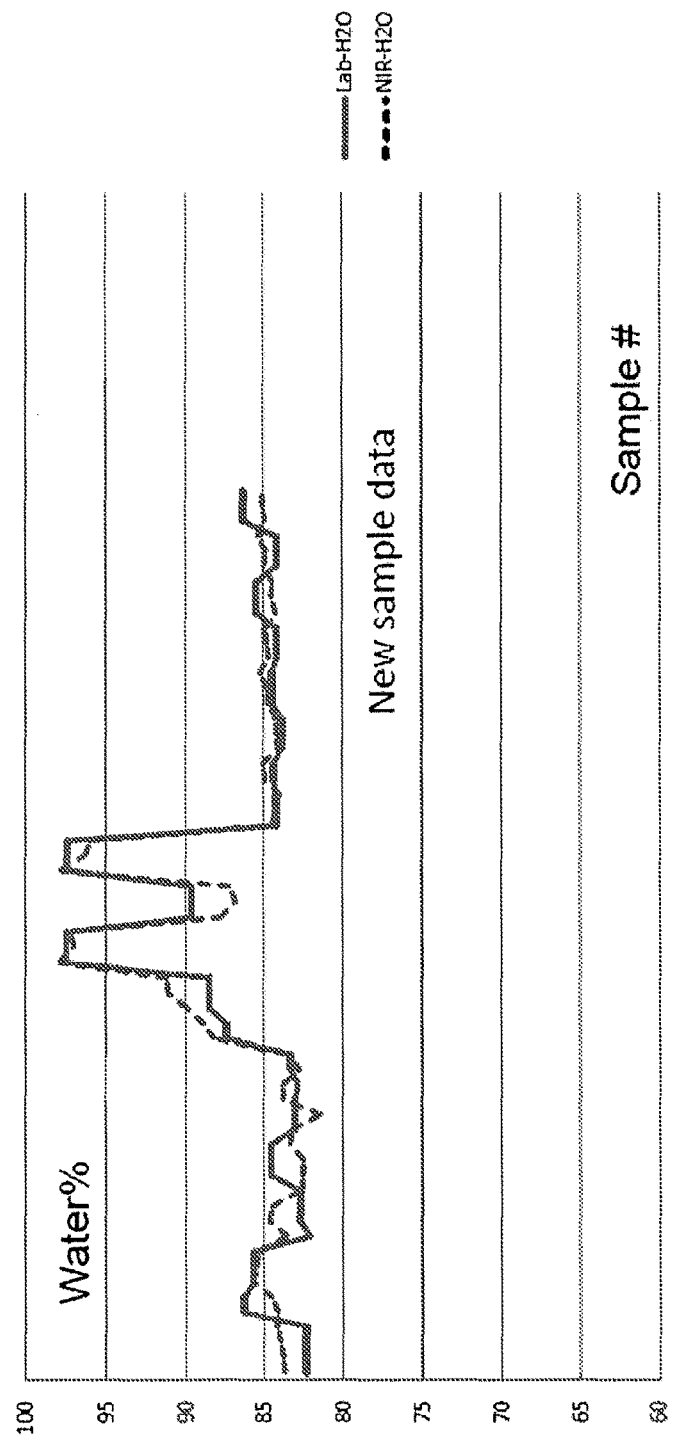
FIG. 13b is a validation comparison line plot comparing a model predicted water wt % estimation vs. a laboratory measurement for multiple samples.

FIG. 13a illustrates a validation comparison scatter plot comparing a NIR model predicted water wt % estimation vs. a laboratory measurement for multiple bitumen-containing fluid samples is provided. FIG. 13b is a validation comparison line plot comparing a NIR model predicted water wt % estimation vs. a laboratory measurement for multiple samples.

Figure 14A:
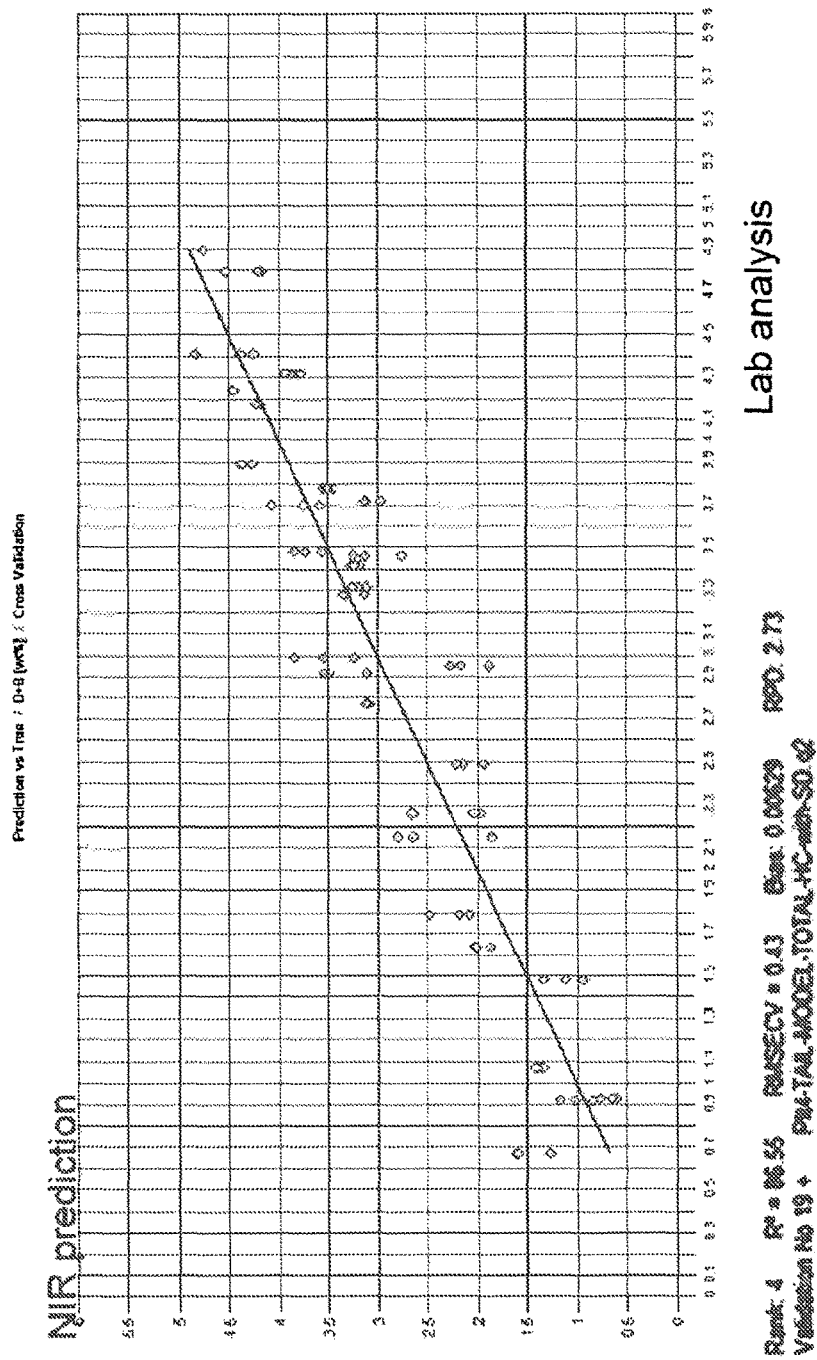
FIG. 14a is a validation comparison scatter plot comparing a model predicted total hydrocarbon (diluent+bitumen) wt % estimation vs. a laboratory measurement for multiple samples.
Figure 14B:
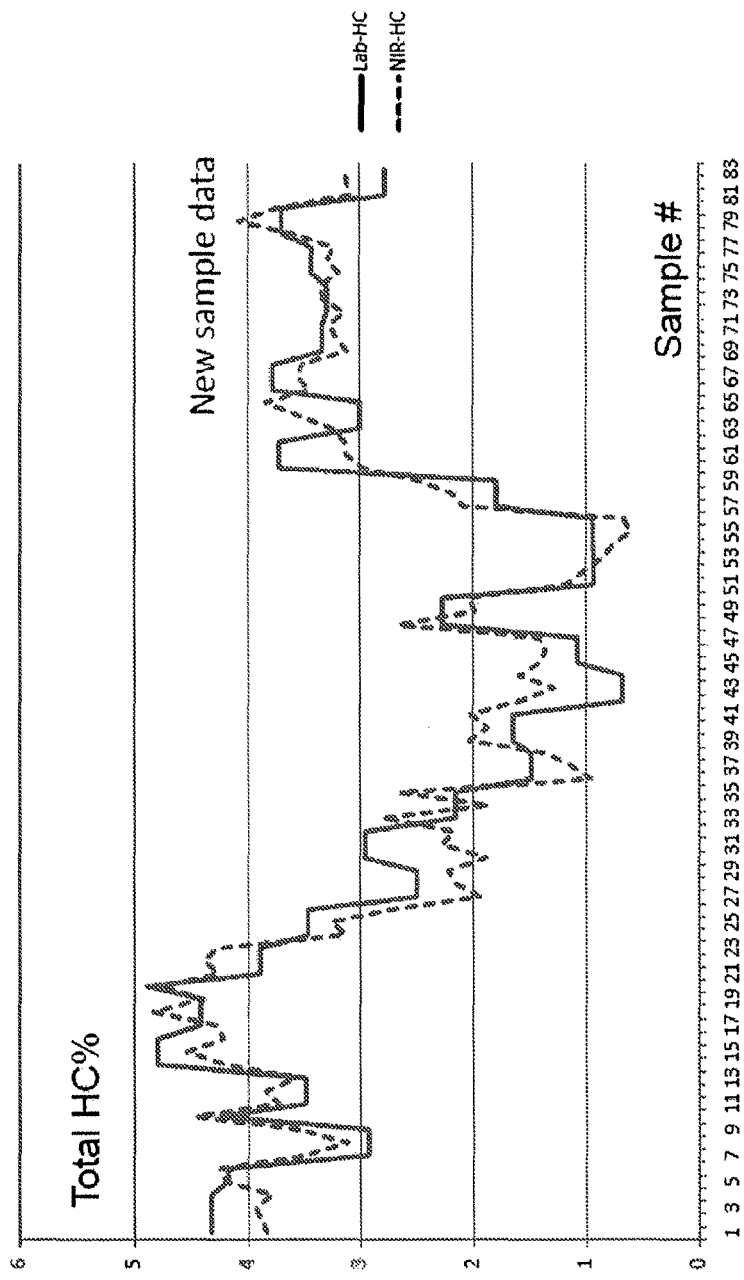
FIG. 14b is a validation comparison line plot comparing a model predicted total hydrocarbon (diluent+bitumen) wt % estimation vs. a laboratory measurement for multiple samples.

FIG. 14a illustrates a validation comparison scatter plot comparing a NIR model predicted total hydrocarbon wt % estimation vs. a laboratory measurement for multiple bitumen-containing fluid samples is provided. FIG. 14b is a validation comparison line plot comparing a NIR model predicted total hydrocarbon wt % estimation vs. a laboratory measurement for multiple samples.

Figure 15A:
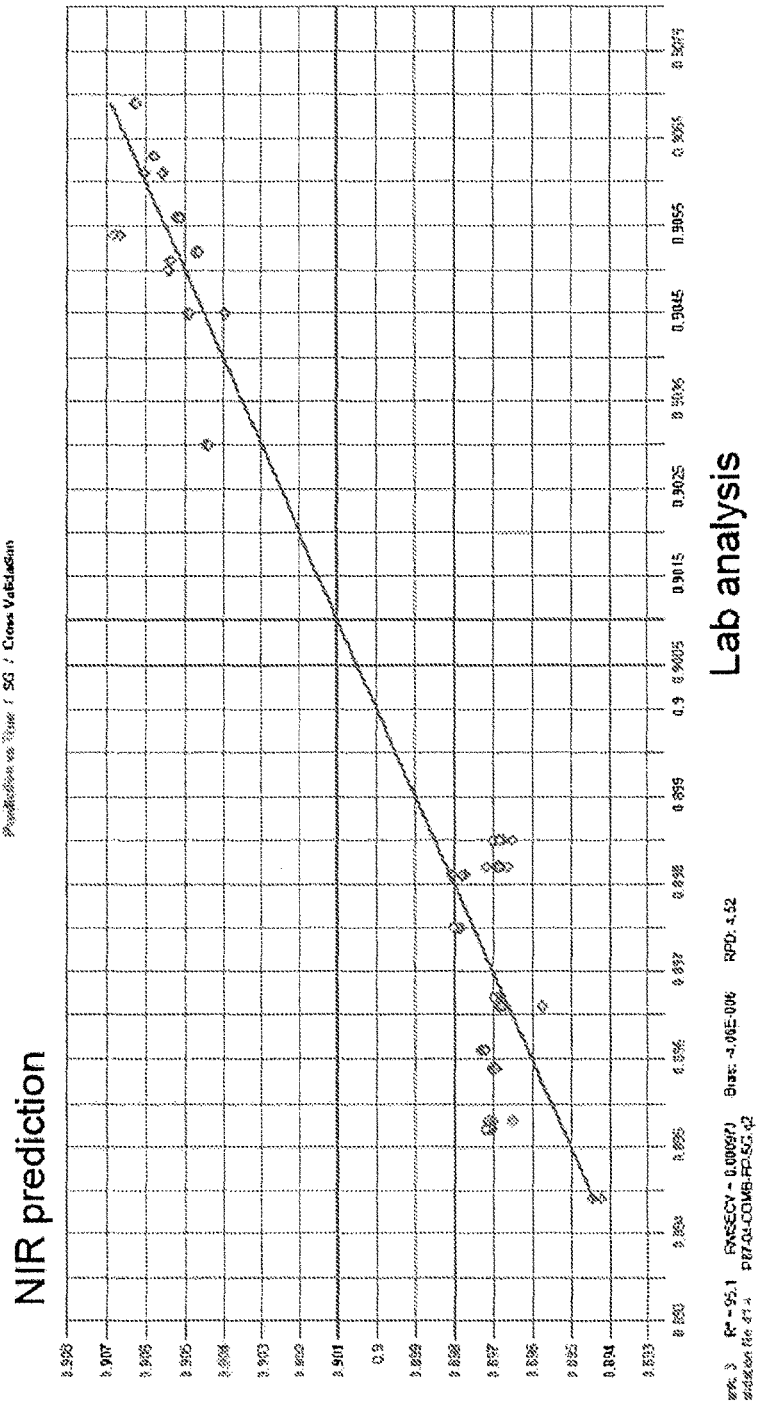
FIG. 15a is a validation comparison scatter plot comparing a model predicted density estimation vs. a laboratory measurement for multiple samples.
Figure 15B:
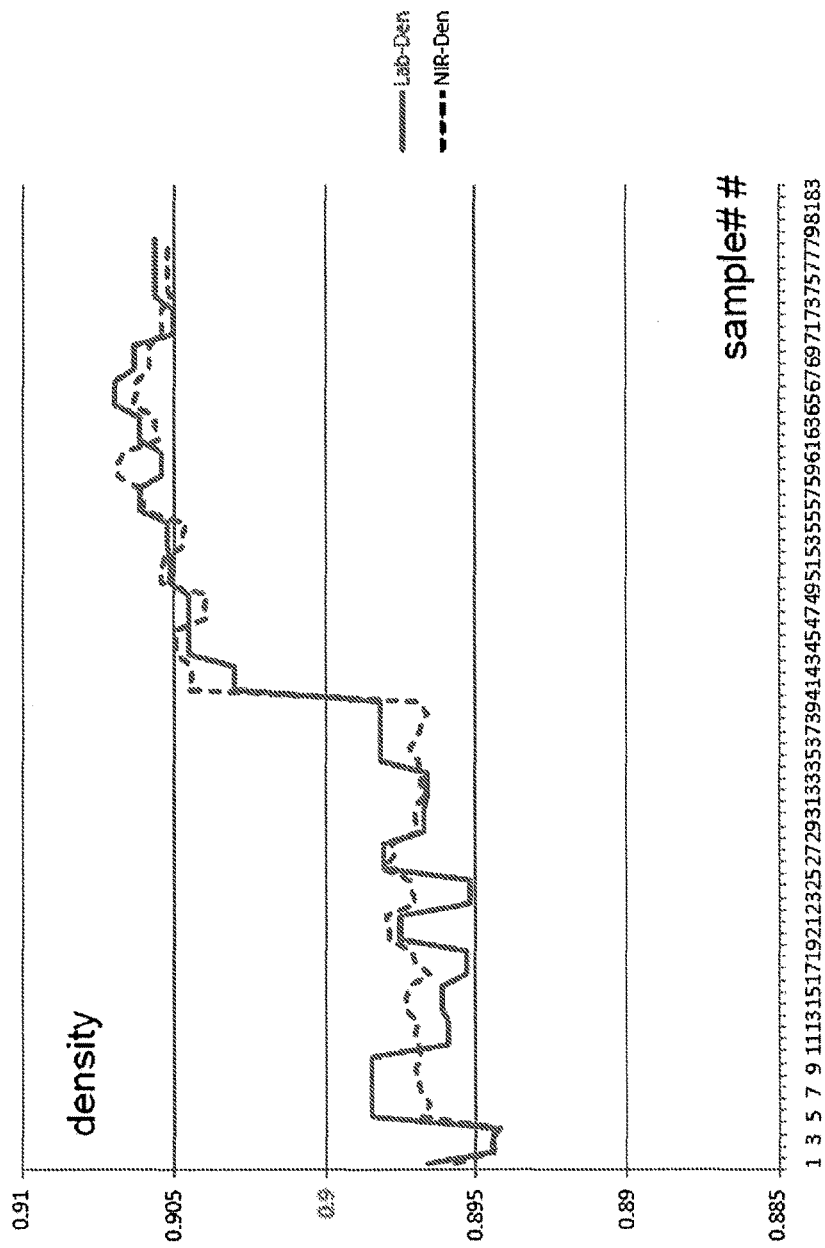
FIG. 15b is a validation comparison line plot comparing a model predicted total density wt % estimation vs. a laboratory measurement for multiple samples.

FIG. 15a illustrates a validation comparison scatter plot comparing a NIR model predicted density estimation vs. a laboratory measurement for multiple bitumen-containing fluid samples is provided. FIG. 15b is a validation comparison line plot comparing a NIR model predicted density estimation vs. a laboratory measurement for multiple samples.

Figure 16A:
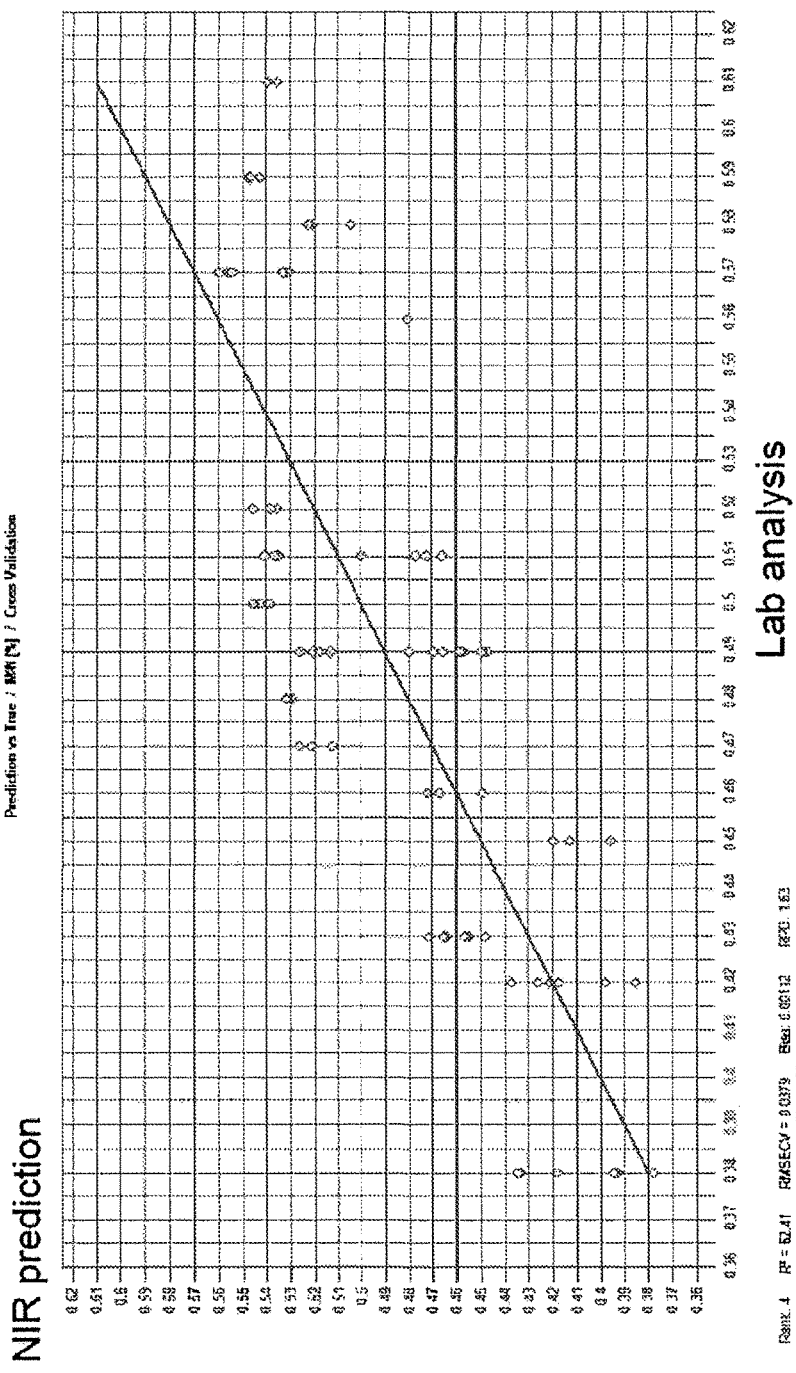
FIG. 16a is a validation comparison scatter plot comparing a model predicted mineral wt % estimation vs. a laboratory measurement for multiple samples.
Figure 16B:
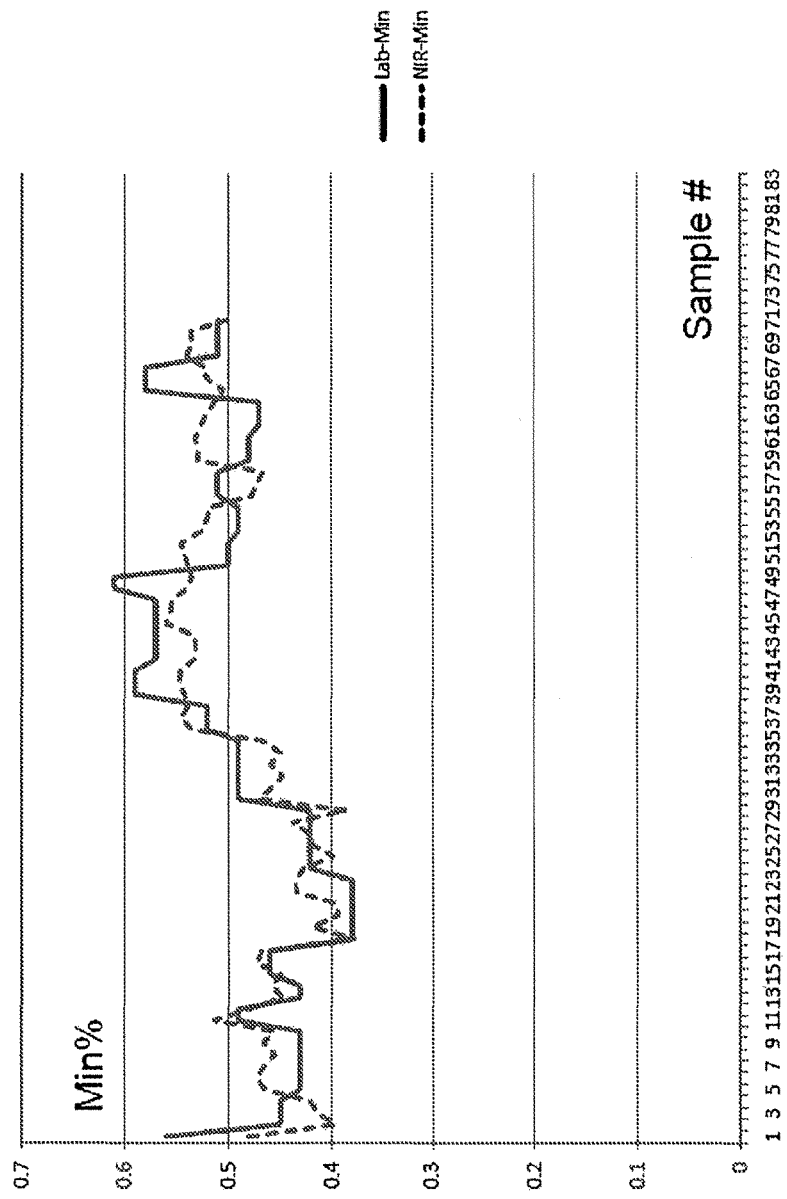
FIG. 16b is a validation comparison line plot comparing a model predicted mineral wt % estimation vs. a laboratory measurement for multiple samples.

FIG. 16a illustrates a validation comparison scatter plot comparing a NIR model predicted total mineral wt % estimation vs. a laboratory measurement for multiple bitumen-containing fluid samples is provided. FIG. 16b is a validation comparison line plot comparing a NIR model predicted mineral wt % estimation vs. a laboratory measurement for multiple samples.

Figure 17:
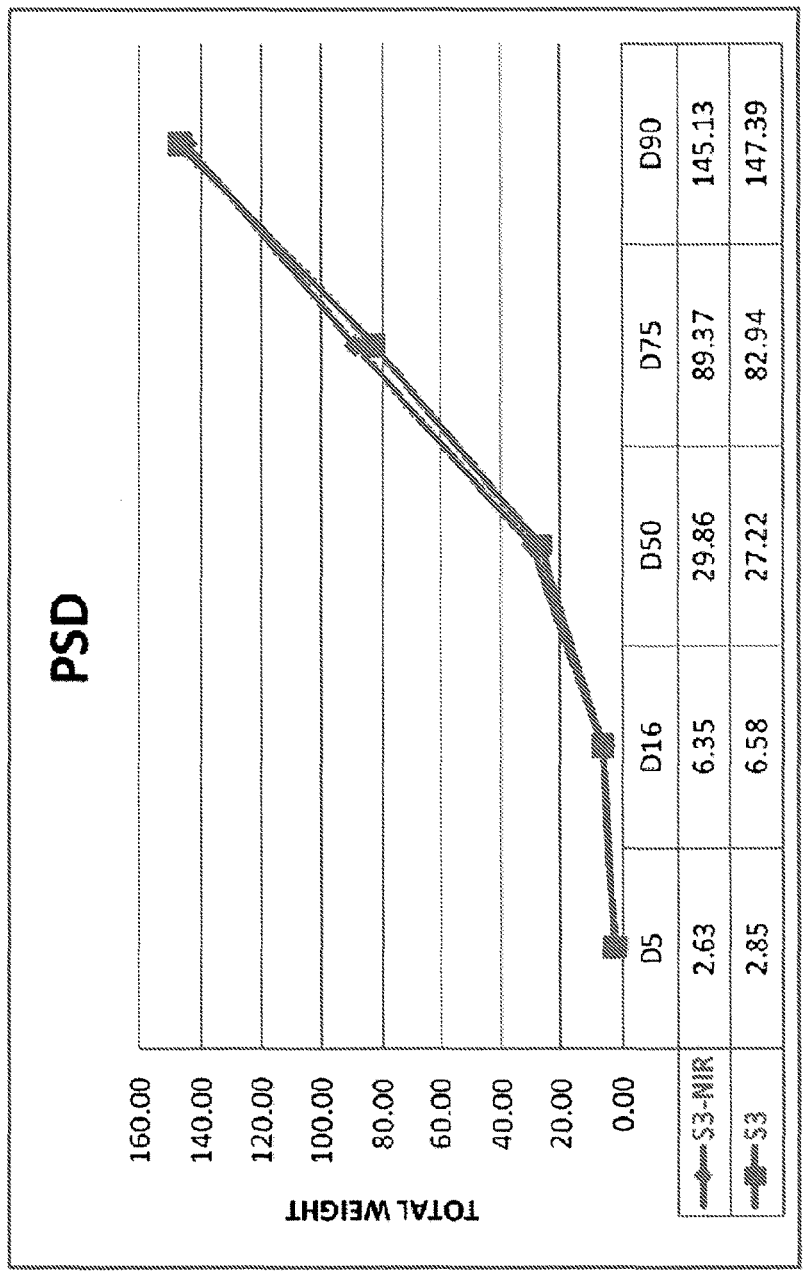
FIG. 17 is a validation comparison line plot comparing a model predicted particle size distribution vs. a laboratory measurement particle size distribution.
Figure 18A:
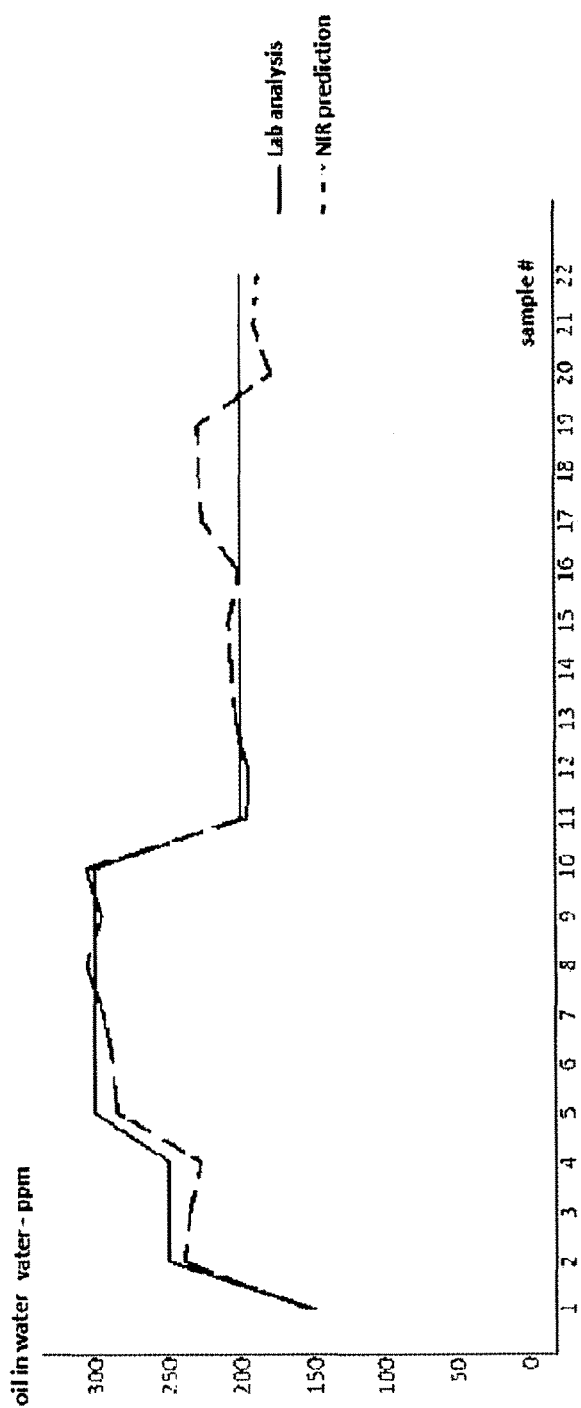
FIG. 18a is a validation comparison line plot comparing a model predicted oil content vs. a laboratory measurement for multiple samples taken from the water line output at a free water knockout.
Figure 18B:
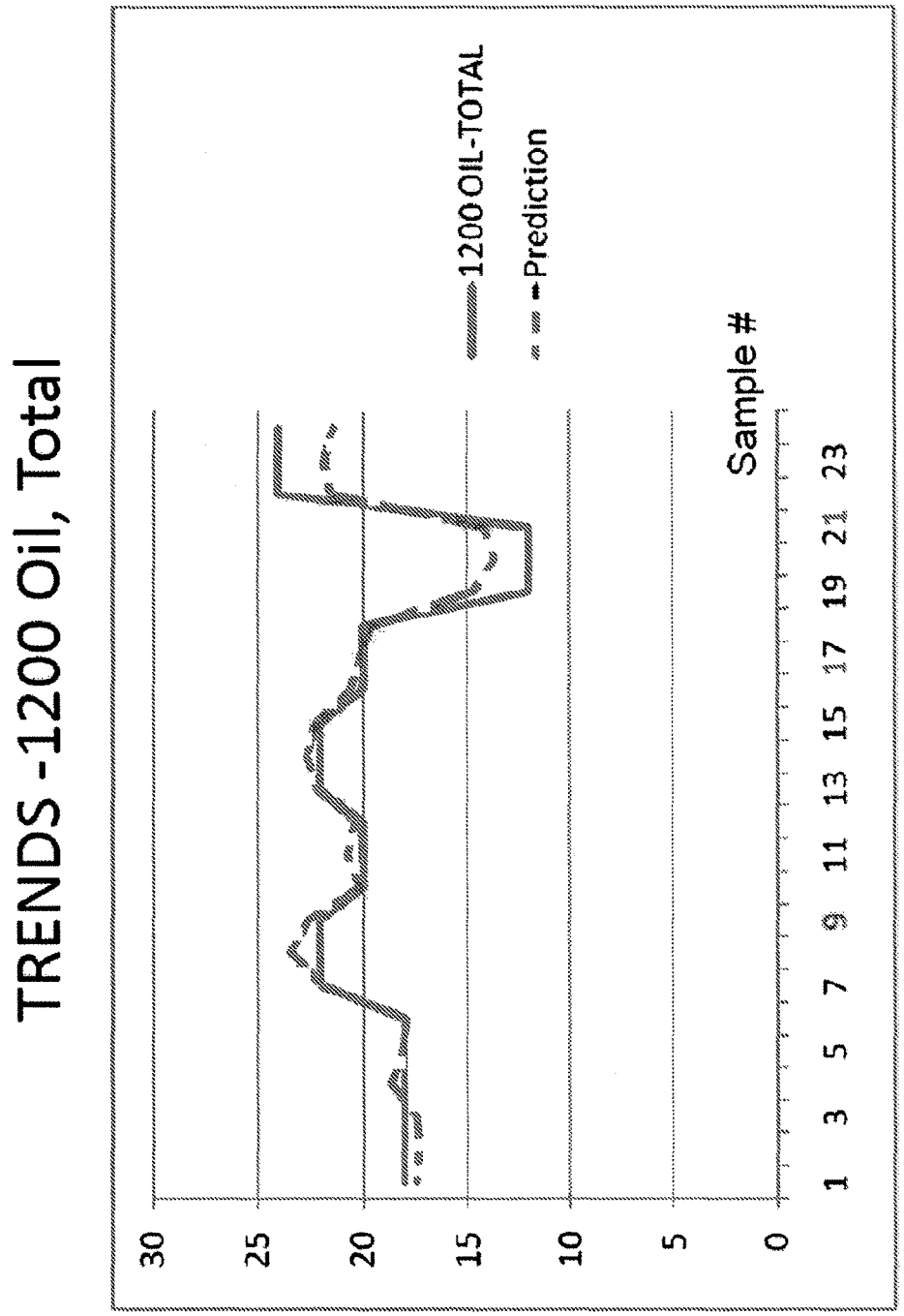
FIG. 18b is a validation comparison line plot comparing a model predicted oil emulsion percentage vs. a laboratory measurement taken from a produced water line output from an in-situ operation.
Figure 18C:
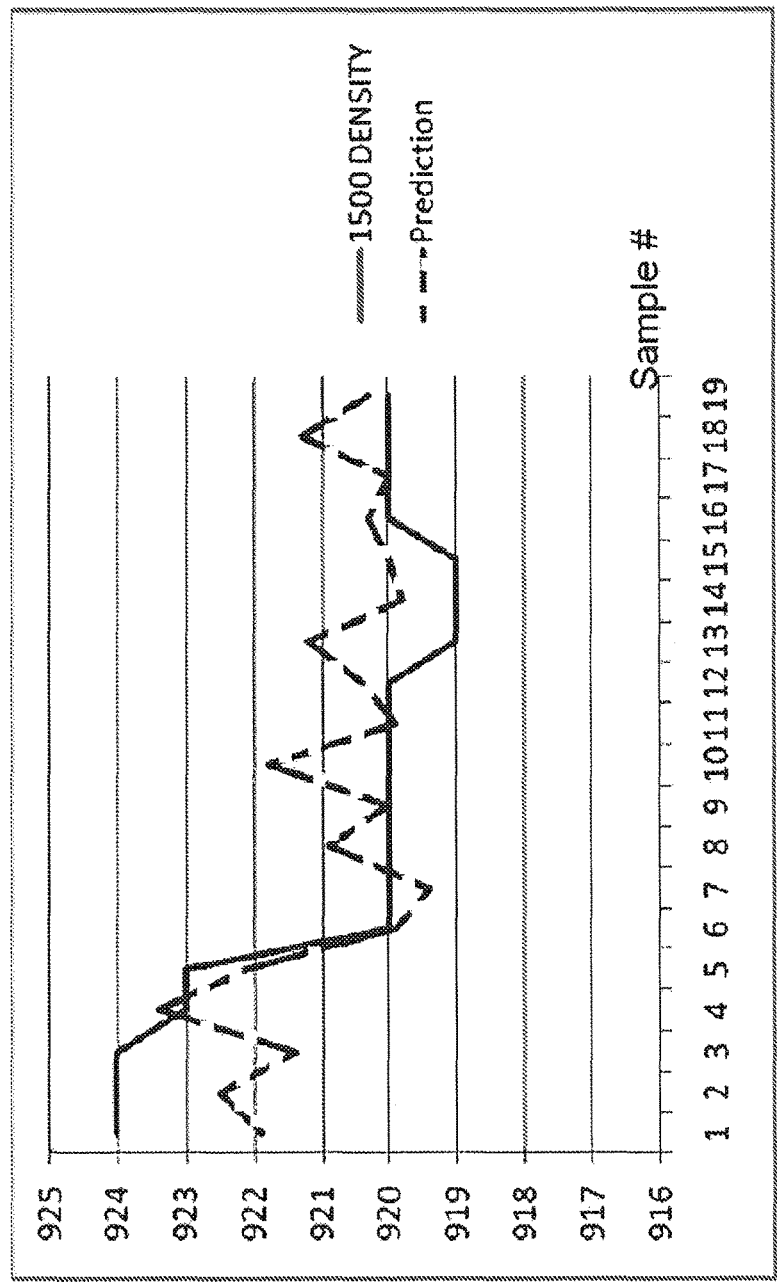
FIG. 18c is a validation comparison line plot comparing a model predicted oil emulsion percentage vs. a laboratory measurement taken from a produced water line output from an in-situ operation.

FIG. 17 illustrates a validation comparison line plot comparing a NIR model predicted particle size distribution vs. a laboratory measurement is provided. Particle size distributions are important for ensuring product streams meet minimum quality standards for downstream processes.

FIG. 18a illustrates a validation comparison line plot comparing a NIR model predicted oil content in water estimation vs. a laboratory measurement for multiple samples of a water-rich product stream produced by a free water knockout in an in-situ operation. FIG. 18b illustrates a validation comparison line plot comparing a NIR model predicted oil content estimation vs. a laboratory measurement for multiple samples of a diluted bitumen product stream produced at a gas boot of an in-situ operation. FIG. 18c illustrates a validation comparison line plot comparing a NIR model predicted density estimation vs. a laboratory measurement for multiple samples of a diluted bitumen product stream produced at a gas boot of an in-situ operation.

As described above with reference to FIGS. 1a and 1b, unlike the in-situ diluted bitumen product stream 122, the diluted bitumen product stream 110 produced from extraction 108 may not be marketable on the open market 123 due mainly to the higher levels, and overall variance, in the mineral fines content and the water content. Since the in-situ diluted bitumen product stream 122 generally has lower levels of mineral fines content and water content, generally the in-situ diluted bitumen product stream 122 can be marketed on the open market 123.

Common practice for processing the diluted bitumen product stream 110 is to direct the diluted bitumen product stream 110 to upgrading operations 112 to obtain a sweet synthetic crude which is marketable on the open market 123. Upgrading operations 112 are generally adapted to handle the higher water content of the diluted bitumen product stream 110. Where available, in-situ diluted bitumen product stream 122 may be combined with the diluted bitumen product stream 110 to ensure the mineral fines content and the water content is below the threshold level that upgrading operations 112 can tolerate.

In practice, the variance in the mineral fines content and the water content of the diluted bitumen product stream 110 may be high enough to damage or require additional maintenance in upgrading operations 112. Accordingly, standard practice is to add excess in-situ diluted bitumen product 122 to attempt to keep the mineral fines content and the water content below the tolerance levels of upgrading operations 112. Since upgrading operations 112 has a finite capacity, this practice creates a bottleneck at upgrading operations 112 based upon the proportion of diluted bitumen product stream 110 and in-situ diluted bitumen product stream 122 selected. This practice further limits the quantity of in-situ diluted bitumen product 122 available to sell on the open market 123.

Figure 19:
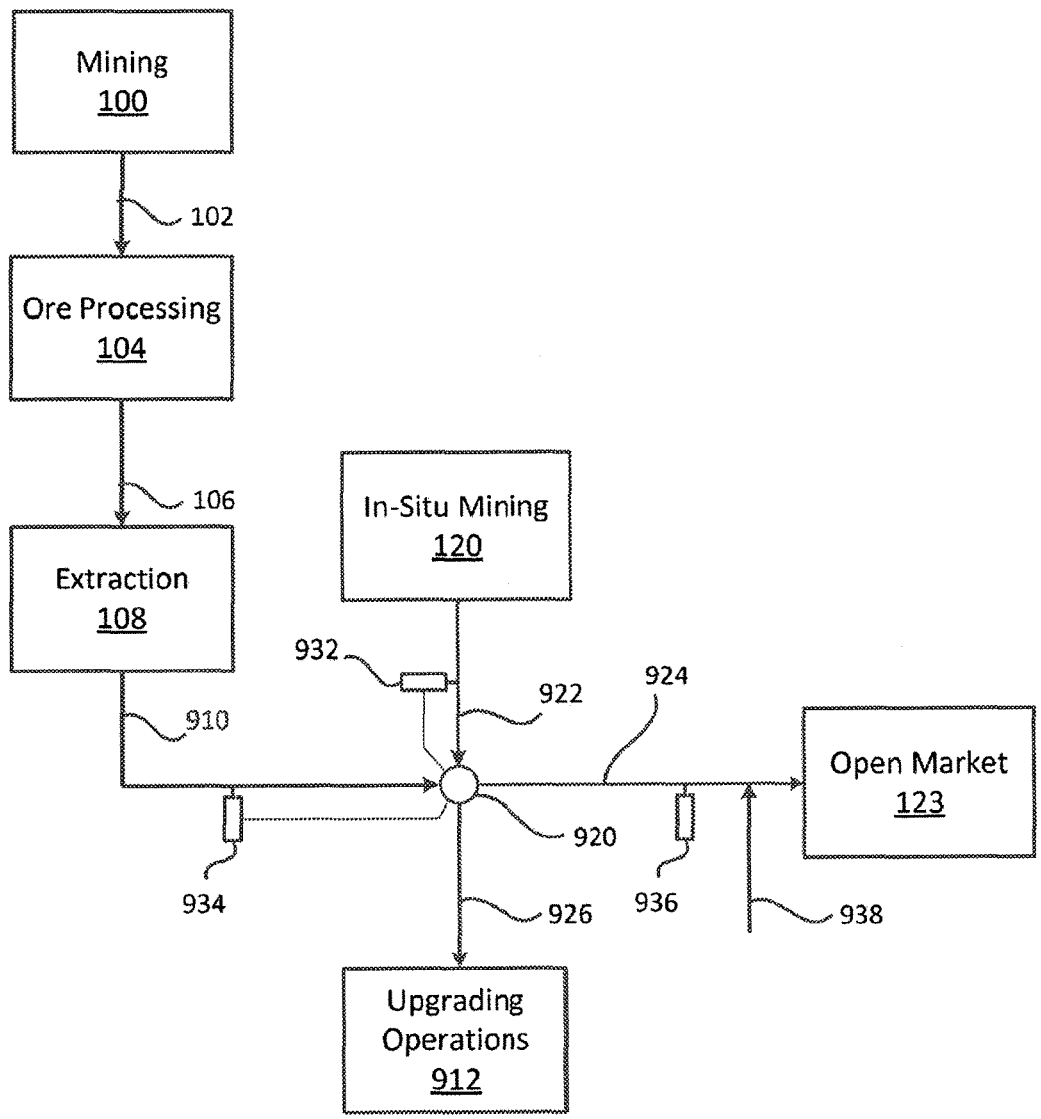
FIG. 19 shows an implementation of a blending operation.

Referring to FIG. 19, in an implementation a blending operation may be performed to minimise the quantity of in-situ diluted bitumen product 922 blended with the diluted bitumen product stream 910, and still keep the mineral fines content and the water content of a blended diluted bitumen product stream 926 below the tolerance levels of upgrading operations 912. In some implementations, depending upon the instant composition of the in-situ diluted bitumen product stream 922 and the diluted bitumen product stream 910, a marketable blended diluted bitumen product stream 924 may be produced for sale on the open market 123 that includes at least a portion of the diluted bitumen product stream 910.

While FIG. 19 shows a single extraction operation 108 and in-situ mining operation 120, in some implementations more than one of either operation may be included in the blending operation. In FIG. 19 an online diluted bitumen product measurement apparatus 934 and an online in-situ diluted bitumen product measurement apparatus 932 provide real-time, or near real-time, estimates of the composition of the diluted bitumen product stream 910 and the in-situ diluted bitumen product stream 922 respectively. The measurement sensors 932, 934 each comprise the measurement apparatus described above for analyzing bitumen-containing process streams.

The online measurement sensors 932, 934 are in operative communication with a blending manifold 920 that is operative to selectively adjust a flow rate of each of the diluted bitumen product stream 910 and the in-situ diluted bitumen product stream 922 to produce a blended diluted bitumen product stream 926 and a blended marketable diluted bitumen product stream 924. As described above, the blended marketable diluted bitumen product stream 924 can consist of only a portion of the in-situ diluted bitumen product stream 922, or alternatively can include a blend of a portion of the in-situ diluted bitumen product stream 922 and a portion of the diluted bitumen product stream 910, depending upon the particular compositions of the streams 910, 922.

The distribution manifold 920 may comprise, for instance, a controller operative to control product stream flow through a network of pipes, each pipe having a controllable flow valve operable by the controller. By adjusting the flow through the network of pipes, the controller may distribute a portion of each input product stream, the diluted bitumen product stream 910 and the in-situ diluted bitumen product stream 922, to either the a blended diluted bitumen product stream 926 and a blended marketable diluted bitumen product stream 924.

The distribution of the input product streams 910, 922 between the two available outlet paths may be determined by the blending manifold 920 based upon one or more composition estimates provided by each of the measurement sensors 932, 934. The blending manifold 920 can compute running averages of the composition estimates provided by each of the measurement sensors 932, 934, and blend the product streams 910, 922 together to produce one or more blended output streams 924, 926, such that a corresponding composition of at least one of the one or more blended output streams 924, 926 will meet a pre-determined metric, such as a maximum level for water content, chlorides, or mineral fines content. The blending manifold 920 can optimise the distribution by applying the different criteria imposed by the upgrading operations 912 and the open market 123.

In an implementation, the measurement sensors 932, 934 can estimate at measurement of water content, chloride content, and/or a mineral fines content of each of the input product streams 910, 922. In an implementation, the blending manifold 920 can receive the estimates from each of the measurement sensors 932, 934, and compute a running average estimate for each of the input product streams 910, 922. The blending manifold 920 can optimise the distribution of the input product streams 910, 922 between the blended output streams 924, 926 to ensure a quality of each of the blended output streams 924, 926. In an implementation, the blending manifold 920 can optimise the distribution by selecting a proportion of each of the input product streams 910, 922, such that the blended diluted bitumen product stream 926 will meet a quality threshold.

For instance, the quality threshold can be a maximum allowable content of a component of the blended diluted bitumen product stream 926, and the estimate, or running average estimate, of that component for the diluted bitumen product stream 910 can be above the allowable content, while the estimate, or running average estimate, for that component of the in-situ diluted bitumen product stream 922 is below the maximum allowable content. In this scenario, the blending manifold 920 can produce the blended diluted bitumen product stream 926 by blending, based upon the estimates or running average estimates, sufficient in-situ diluted bitumen product stream 922 with the diluted bitumen product stream 922 to produce the blended diluted bitumen product stream 926 that includes the component below the maximum allowable content.

In an implementation, where the component is a water content, the diluted bitumen product stream 910 has a water content above a tolerance threshold of the upgrading operations 912 and the in-situ diluted bitumen product stream 922 has a water content below the tolerance threshold, the blending manifold 920 may optimise the distribution by adding a sufficient proportion of the in-situ diluted bitumen product stream 922 to produce a blended diluted bitumen product stream 926 with a water content below the tolerance threshold. The blending manifold 920 can adjust the proportion in real-time, or near real-time, based upon composition estimates received from the measurement sensors 932, 934.

The implementation of FIG. 19 also includes a marketable blended diluted bitumen product stream measurement sensor 936 that may obtain composition estimates of the stream 924 including at least a diluent content. A controller (not shown in FIG. 19) can control the addition of diluent through a diluent supply 938 to ensure the marketable blended diluted bitumen product stream 924 contains a minimum diluent content for a current destination.

In an implementation, a viscosity estimate and a specific gravity estimate of a diluted bitumen product can be processed in real-time, or near real-time. The viscosity estimate and the specific gravity estimate may be used, for instance, in downstream upgrading operations 112, 126 as an input to a kinetic model for cokers to process the diluted bitumen product.

The viscosity estimate and the specific gravity estimate may be obtained as described above, with the additional requirement that the viscosity estimate requires two estimates of the sample: the infrared spectrum; and, a temperature estimate. The viscosity estimate can be calculated from a two variable model built by capturing spectra from a plurality of samples and, for each spectra taking a series of viscosity measurements at a range of temperatures. The two variable viscosity models then takes as input a temperature measurement and an infrared spectrum of the sample to generate a corresponding viscosity estimate.

Figure 20A:
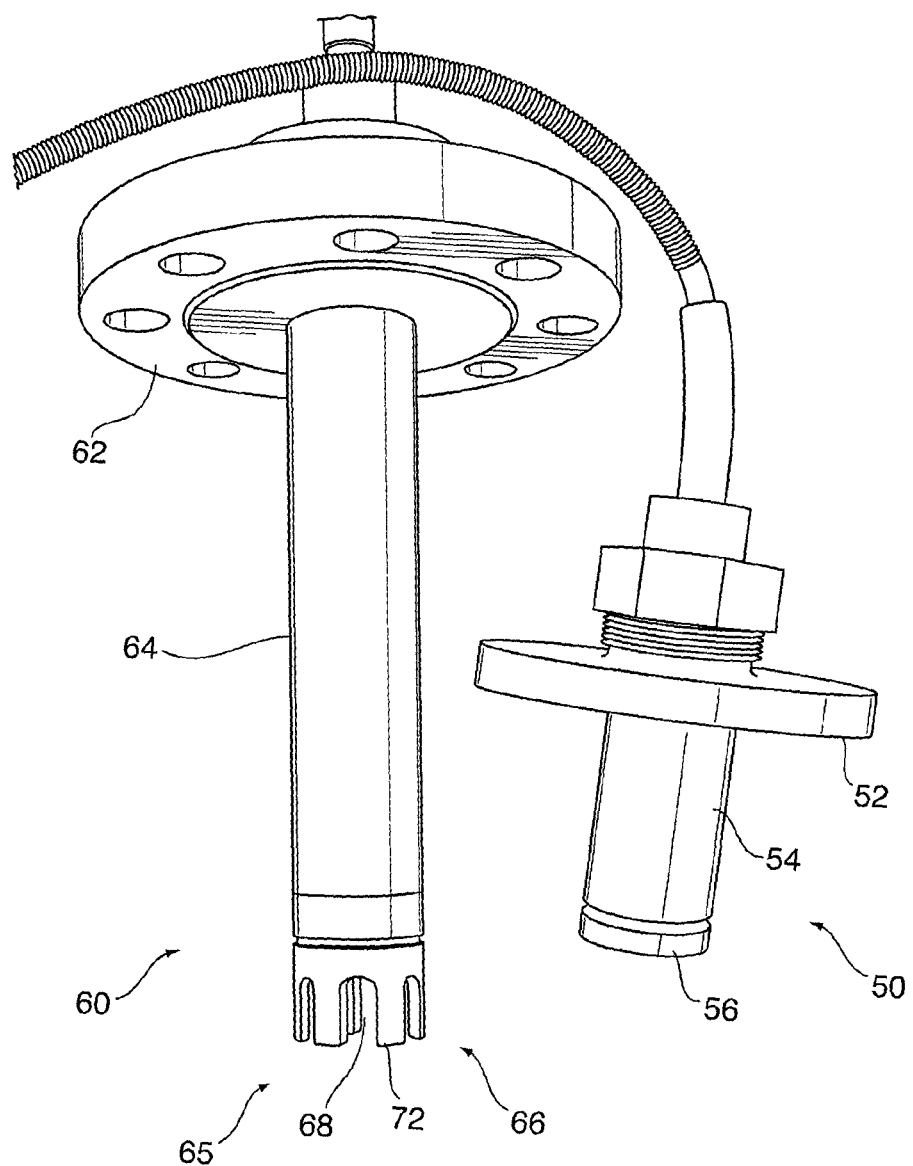
FIG. 20a shows side views of implementations of probes for use with the measurement apparatus.

Referring to FIG. 20a, a first probe embodiment 50 and a second probe embodiment 60 are illustrated. The first probe embodiment 50 and the second probe embodiment 60 are adapted for insertion through an opening in a wall of a conduit, and to secure the opening against the pressurized bitumen-containing process stream flowing through the conduit.

In FIG. 20a, the first probe embodiment 50 includes a steel flange portion 52 connected to a steel shaft portion 54. An infrared light permeable window, such as a sapphire window, is located at a distal end 56 of the shaft portion 54.

The second probe embodiment 60 similarly includes a steel flange portion 62 and a steel shaft portion 64. In addition, the second probe embodiment 60 includes a crown portion 66 at the distal end 65 of the second probe embodiment 60. The crown portion 66 includes apertures 68 to allow passage of a bitumen-containing process stream past the infrared light permeable window located at the distal end 65 of the second probe embodiment 60, and crenulations 72 projecting above the distal end 65 to protect the infrared permeable window from objects included in the bitumen-containing process stream such as rocks or other mineral components.

In an implementation the shaft portion 54 of the first probe embodiment 50, and the shaft portion 64 and the crown portion 66 of the second probe embodiment 60 may be coated with a surface metal coating to protect the portions of the probe exposed to bitumen-containing process stream. The surface metal coating provides increased strength to resist any solids component travelling through the conduit, improve scratch and abrasion resistance, and assist in preventing bitumen in the bitumen-containing process stream from adhering to the exposed portions of the probe. In an implementation, the surface coating may comprise, for instance, a Nickel/Molybdenum based CK45 steel metal alloy.

Figure 20B:
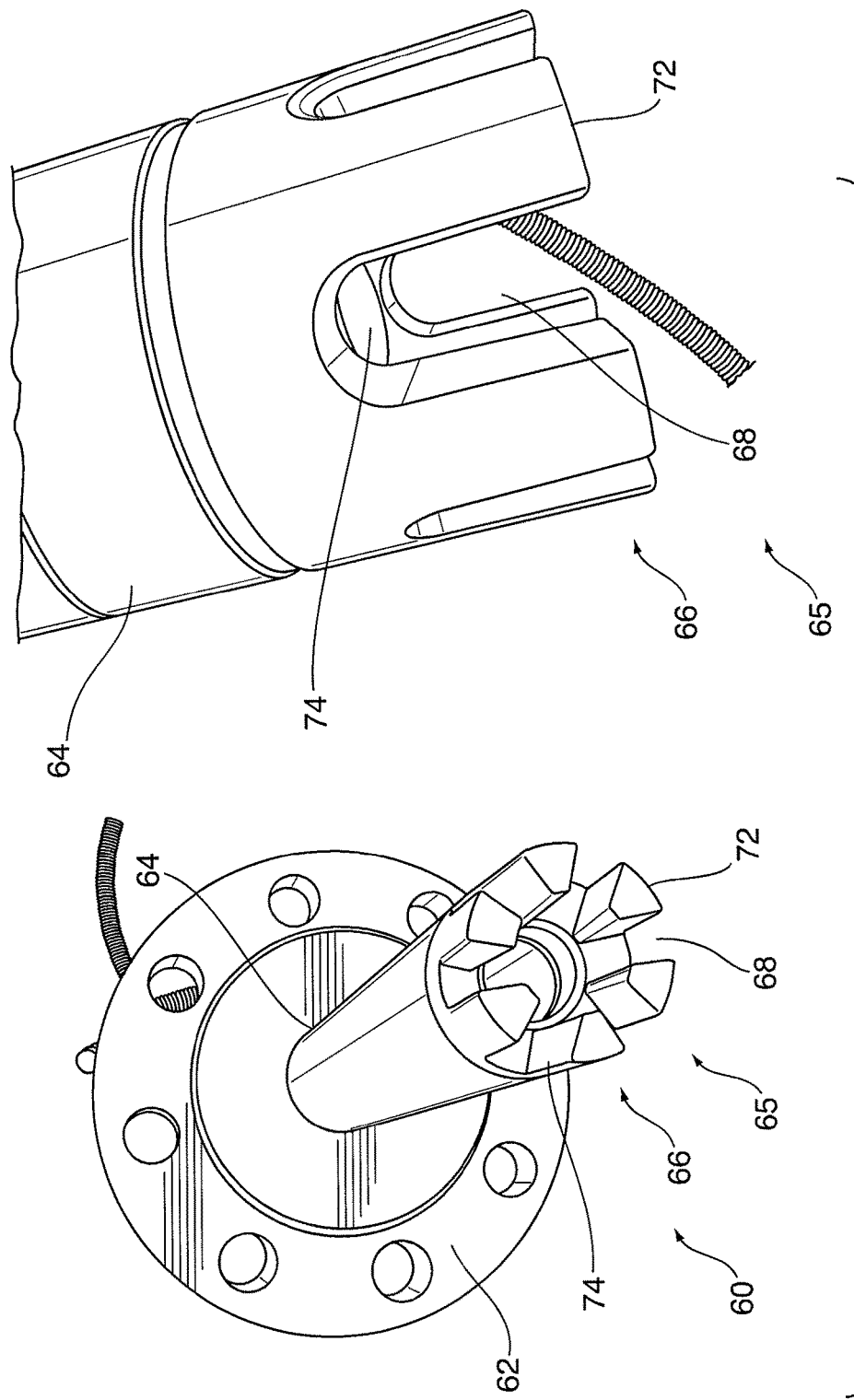

Referring to FIG. 20b, an isometric end view and a close up side view of the crown portion 66 of the second probe embodiment 60 are presented. The infrared permeable window 74 is visible in the views.

Figure 21:
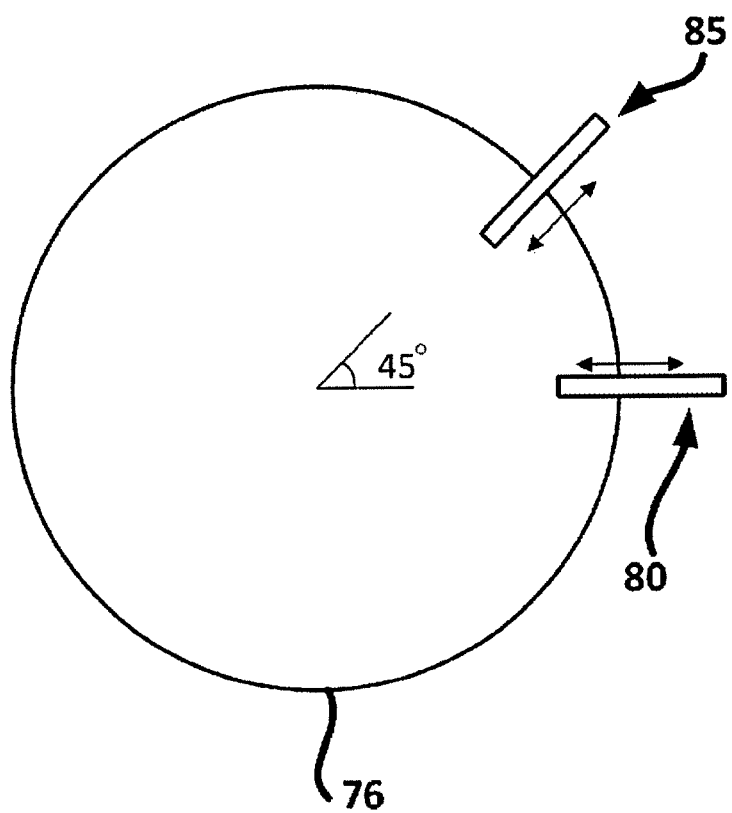
FIG. 21 shows a cross-view of a conduit including an implementation of the probes of FIGS. 20a and 20b.

FIG. 21 illustrates a cross section view of a conduit 76 showing two probes 80, 85 inserted through apertures at different locations in a wall of the conduit. The first probe 80 is inserted at a mid-portion of the conduit, level with the horizontal plane. The second probe 85 is situated to bisect an upper quadrant of the conduit. In the illustration, the probe is located at approximately 45 degrees to the horizontal, though other angles of inclination may be provided. The probes 80, 85 as illustrated include an adjustable probe insertion depth that may be used to incrementally increase an insertion depth until an accurate estimation is made from the probe 80, 85.

As bitumen-containing process streams may preferentially adhere a bitumen layer to the interior walls of the conduit, the probe insertion adjustment feature allows for insertion to an operational insertion depth that provides the minimum intrusion into the conduit, while still ensuring maintaining operability of the probe 80, 85.

Various embodiments of the present invention having been thus described in detail by way of example, it will be apparent to those skilled in the art that variations and modifications can be made without departing from the invention. The invention includes all such variations and modifications as fall within the scope of the appended claims.

We claim:

1. A method of controlling a process, comprising:
    directing a beam of infrared light toward a bitumen-containing process stream as it passes between stages in the process;
    capturing reflected light corresponding to the beam of infrared light after interaction with the bitumen-containing process stream;
    analyzing a reflectance of the captured light to obtain a spectrum;
    determining a composition estimate from the bitumen-containing process stream by evaluating the spectrum with reference to a calibrated model;
    based on the composition estimate, automatically adjusting a control setpoint of at least one upstream process component and/or downstream process component; and
    wherein the control setpoint comprises an amount of a first bitumen product stream associated with the bitumen-containing process stream for proportional combination with a second bitumen product stream with a known composition to produce a blended bitumen product stream having a physical characteristic that meets a pre-determined threshold.

2. The method of claim 1 wherein the beam of infrared light is directed toward the bitumen-containing process stream as it passes through a conduit connecting stages in the process.

3. The method of claim 2 wherein the beam of infrared light is directed through an infra-red permeable window through a wall of the conduit.

4. The method of claim 1 wherein the bitumen-containing process stream includes a diluent recycled from an oil sand slurry processing operation or an in-situ mining operation, and wherein the composition estimate comprises a diluent component concentration.

5. The method of claim 1 wherein the calibrated model was previously generated by:
    collecting a number of samples from the bitumen-containing process stream; for each of the number of collected samples:
    evaluating the collected sample with laboratory analysis to determine a reference composition of the collected sample;
    obtaining an absorbance spectrum for the collected sample by:
        directing a calibration beam of infrared light toward the collected sample;
        capturing light corresponding to the calibration beam of infrared light after interaction with the collected sample; and,
        analyzing the captured light to obtain a collected sample spectrum; and,
    applying one or more multivariate calibration techniques to construct the calibrated model that relates the collected sample spectra to the corresponding reference compositions.

6. The method of claim 5 wherein the one or more multivariate calibration techniques include at least one technique chosen from a partial least squares regression technique, a principal component analysis technique, statistics-based mathematical model, and an artificial neural network technique.

7. The method of claim 1 further comprising:
    diverting a portion of the bitumen-containing process stream; and, wherein the directing a beam of infrared light toward the bitumen-containing process stream as it passes between stages in a process comprises directing the beam of infrared light toward the diverted portion, and wherein the captured light corresponds to the beam of infrared light after interaction with the diverted portion.

8. The method of claim 7 further comprising collecting the diverted portion in a collector and evaluating the collected portion with laboratory analysis to obtain a collected sample composition estimate.

9. The method of claim 8 wherein the light is captured for a plurality of samples over a collection time for collecting the diverted portion in the collector, and wherein the method further comprises comparing the collected sample composition estimate with composition estimates of the plurality of samples to verify the composition estimates.

10. The method of claim 9 wherein if the composition estimates are not verified, the method further comprising re-calibrating the model by:
    collecting a number of samples from the diverted portion of the bitumen-containing process stream;
    for each of the number of collected samples:
        evaluating the collected sample with laboratory analysis to determine a reference composition of the collected sample;
        obtaining an absorbance spectrum for the collected sample by:
            directing a beam of infrared light toward the collected sample;
            capturing light corresponding to the beam of infrared light after interaction with the collected sample; and,
            analyzing the captured light to obtain a collected sample spectrum; and,
    applying one or more multivariate calibration techniques to construct the re-calibrated model that relates the collected sample spectra to the corresponding reference compositions.

11. The method of claim 1 wherein the adjustment comprises adding a fluid to the bitumen-containing process stream at the at least one of an upstream process component and a downstream process component when the composition estimate indicates a density higher than a threshold density level.

12. The method of claim 11 wherein the fluid comprises process water or diluent.

13. The method of claim 1 wherein the known composition of the second bitumen product stream is a different composition; the second bitumen product stream was produced from a different source operation from the first bitumen product stream; and the known composition of the second bitumen product stream was previously obtained by directing a separate beam of infrared light to the second bitumen product stream and estimating a separate composition for the second bitumen product stream.

14. The method of claim 13 wherein the blended bitumen product stream comprises a marketable blended bitumen product stream, having a physical characteristic that meets a pre-determined marketable threshold.

15. The method of claim 1 wherein the composition estimates are continuously determined, and wherein the proportionately blending is determined for a current set of composition estimates.

16. The method of claim 1 wherein the composition estimate comprises at least one estimate chosen from:
a bitumen component concentration;
a hydrocarbon component concentration;
a water component concentration;
a mineral component concentration;
a density of a component;
a viscosity of a component;
a size distribution of fine particles;
a chloride component concentration; and,
a diluent component concentration.

17. The method of claim 1, wherein the capturing, analyzing, estimating, directing, and adjusting is performed in either real-time or near real-time.

18. The method of claim 1 wherein the infrared wavelength comprises a range from about 800 nm to about 2500 nm.

19. The method of claim 1 wherein the bitumen-containing process stream comprises at least an oil sand water slurry stream; a bitumen froth stream; a bitumen froth product stream; a bitumen-containing wellhead product stream; a processed bitumen-containing wellhead product stream; a processed bitumen-containing wellhead product stream; a bitumen-containing in-situ product stream; a recycled process fluid stream; a recycled water stream; or, a tailings stream.

20. The method of claim 1 wherein the composition estimate comprises a mineral component concentration, a chloride component concentration, or a diluent component concentration and the adjustment comprises adding a fluid to the bitumen-containing process stream at the at least one of an upstream process component and a downstream process component when the composition estimate indicates a concentration higher than a threshold limit.

21. The method of claim 1 wherein the beam of infrared light is directed toward the bitumen-containing process stream as it exits a primary separation vessel (PSV) as a bitumen froth stream;
wherein the control setpoint comprises an interface level between the bitumen froth stream and a middlings layer within the PSV; and,
wherein the adjusting comprises maintaining the interface level to minimize loss of bitumen to a tailings stream.

22. The method of claim 1 wherein the control setpoint further comprises an amount of the first bitumen product stream associated with the bitumen-containing process stream for proportional combination with at least one more bitumen product stream with a known composition to produce the blended bitumen product stream having the physical characteristic that meets the pre-determined threshold; and wherein the blended bitumen product stream is produced by blending the first bitumen product stream, the second bitumen product stream, and the at least one more bitumen product stream.

23. A method of controlling a process, comprising:
directing a beam of infrared light toward a bitumen-containing process stream as it exits a free water knockout as one of a bitumen-rich stream or a water-rich stream;
capturing reflected light corresponding to the beam of infrared light after interaction with the bitumen-containing process stream;
analyzing a reflectance of the captured light to obtain a spectrum;
determining a composition estimate from the bitumen-containing process stream by evaluating the spectrum with reference to a calibrated model, wherein the composition estimate comprises a water content of the bitumen-rich stream or a hydrocarbon content of the water-rich stream respectively; and,
based on the composition estimate, automatically adjusting a control setpoint of at least one upstream process component and/or downstream process component, wherein the control setpoint comprises an interface level of the free water knockout; and,
the adjusting comprises raising or lowering the interface level to maintain the hydrocarbon content in the water-rich stream below a pre-determined hydrocarbon content threshold.

24. A method of controlling a process, comprising:
directing a beam of infrared light toward a bitumen-containing process stream as it exits a primary separation vessel (PSV) as one of a bitumen froth stream or a tailings stream;
capturing reflected light corresponding to the beam of infrared light after interaction with the bitumen-containing process stream;
analyzing a reflectance of the captured light to obtain a spectrum;
determining a composition estimate from the bitumen-containing process stream by evaluating the spectrum with reference to a calibrated model, wherein the composition estimate comprises a water content of the bitumen froth stream or a hydrocarbon content of the tailings stream respectively; and,
based on the composition estimate, automatically adjusting a control setpoint of at least one upstream process component and/or downstream process component, wherein the control setpoint comprises a PSV froth-middlings interface level; and
the adjusting comprises increasing or decreasing an amount of added hot process water or increasing or decreasing a pump speed on the tailings stream to maintain the water content of the bitumen froth stream below a pre-determined threshold.

25. A method of controlling a process, comprising:
directing a separate beam of infrared light to each of a plurality of bitumen-containing process streams entering and exiting a primary separation vessel (PSV);

capturing reflected light corresponding to the beam of infrared light after interaction with the bitumen-containing process stream;

analyzing a reflectance of the captured light to obtain a spectrum;

determining a composition estimate from the bitumen-containing process stream by evaluating the spectrum with reference to a calibrated model, wherein the composition estimate comprises a hydrocarbon content of each of the entering and exiting process streams respectively; and, based on the composition estimate, automatically adjusting a control setpoint of at least one upstream process component and/or downstream process component, wherein the control setpoint comprises a PSV froth-middlings interface level; and wherein the adjusting comprises increasing or decreasing the amount of added hot process water.

26. The method of claim 25 wherein the entering bitumen-containing process stream comprises an oil sand slurry stream, and the exiting bitumen-containing process streams comprise a bitumen froth stream and a tailings stream.

27. The method of claim 25 wherein the entering bitumen-containing process stream comprises an oil sand slurry stream beam, and the exiting bitumen-containing process streams comprise a middlings stream and a tailings stream, and wherein the hydrocarbon content of the PSV comprises the hydrocarbon content of a lower portion of the PSV.

28. An apparatus for controlling a process, the apparatus comprising an online reflectance spectrometer and a process controller, the online reflectance infrared spectrometer situated proximate a bitumen-containing process stream configured to direct a beam of infrared light toward the bitumen-containing process stream and capture reflected light corresponding to the beam of infrared light after interaction with the bitumen- containing process stream, the online reflectance spectrometer comprising a spectrometer controller configured to analyze a reflectance of the captured light to obtain a spectrum and determine a composition estimate from the bitumen-containing process stream by evaluating the spectrum with reference to a calibrated model; and the process controller operative to automatically adjust a control setpoint of at least one upstream process component and/or downstream process component based on the composition estimate; and, wherein the control setpoint comprises operation of a blending manifold configured to combine a first bitumen product stream associated with the bitumen-containing process stream proportionately with a second bitumen product stream with a known composition to produce a blended bitumen product stream.

29. The apparatus of claim 28 wherein the online infrared spectrometer is situated proximate a conduit connecting stages in the process, said conduit configured to contain the bitumen-containing process stream.

30. The apparatus of claim 29 wherein at least a portion of the conduit comprises an infrared permeable window between an exterior of the conduit and the interior of the conduit; and, wherein the online infrared spectrometer is situated proximate to, and directed at, the window, and configured to direct the beam of infrared light through the window to interact with the bitumen-containing process stream passing within the conduit and past the window.

31. The apparatus of claim 29 wherein the conduit comprises a Primary Separation Vessel (PSV) configured to receive an oil sand slurry stream and separate the stream into a bitumen froth stream, a middlings stream and a tailings stream.

32. The apparatus of claim 29 wherein the bitumen-containing process stream comprises a tailings stream, and wherein the conduit comprises a pipe for transporting the tailings stream to a tailings pond, wherein the controller is operable adjust the control setpoint by re- directing an outlet of the conduit in response to the composition estimate.

33. The apparatus of claim 32 wherein the controller is operable to re- direct the outlet between a tailings pond and a holding pond.

34. The apparatus of claim 32 wherein the response is to re-direct the outlet when the composition estimate yields a bitumen content or a diluent content above a threshold level.

35. The apparatus of claim 29 wherein the bitumen-containing process stream comprises a recycled water stream, and wherein the conduit comprises a pipe for returning the recycled water stream to upstream processing operations, wherein the controller is operable to adjust the control setpoint by re-directing an outlet of the conduit in response to the composition estimate.

36. The apparatus of claim 35 wherein the re-directing the outlet re-directs the bitumen-containing process stream for further recycling processing operations when the composition estimate yields a component content at or a above a threshold level.

37. The apparatus of claim 29 further comprising:
a diversion line for diverting a portion of the bitumen-containing process stream from the conduit; wherein the beam of infrared light is directed toward the diverted portion of the bitumen- containing process stream.

38. The apparatus of claim 37 wherein the beam of infrared light is directed toward the diverted portion as it exits the diversion line.

39. The apparatus of claim 37, further comprising a collector for collecting the diverted portion of the bitumen-containing process stream after it has exited the diversion line.

40. The apparatus of claim 28 wherein the bitumen-containing process stream includes a diluent recycled from an oil sand slurry processing operation or an in-situ mining operation.

41. The apparatus of claim 28 wherein the calibrated model was previously generated by:
collecting a number of samples from the bitumen-containing process stream;
for each of the number of collected samples:
evaluating the collected sample with laboratory analysis to determine a reference composition of that collected sample;
obtaining an absorbance spectrum for the collected sample by:
directing a calibration beam of infrared light toward the collected sample;
capturing light corresponding to the calibration beam of infrared light after interaction with the collected sample; and,
analyzing the captured light to obtain a collected sample spectrum; and,
applying one or more multivariate calibration techniques to construct the calibrated model that relates the collected sample spectra to the corresponding reference compositions.

42. The apparatus of claim 41 wherein the one or more multivariate calibration techniques include at least one technique chosen from a partial least squares regression technique, a principal component analysis technique, and an artificial neural network technique.

43. The apparatus of claim 28 wherein the apparatus further comprises a separate beam of infrared light for being directed toward the second bitumen product stream, wherein the known composition of the second bitumen product stream is a different composition and the second bitumen product stream is produced from a different source operation from the first bitumen product stream, and wherein the online infrared spectrometer is further operative to estimate a separate composition for the second bitumen product stream.

44. The apparatus of claim 43 wherein the blended bitumen product stream comprises a marketable blended bitumen product stream, having a physical characteristic that meets a pre-determined marketable threshold.

45. The apparatus of claim 28 wherein the composition estimates are continuously determined, and wherein the proportionately blending is determined for a current set of composition estimates.

46. The apparatus of claim 28 wherein the composition estimate comprises at least one estimate chosen from:
a bitumen component concentration;
a hydrocarbon component concentration;
a water component concentration;
a mineral component concentration;
a density of a component;
a viscosity of a component;
a size distribution of fine particles;
a chloride component concentration; and, a diluent component concentration.

47. The apparatus of claim 28, wherein the online infrared spectrometer and the controller are operative to perform the capturing, analyzing, estimating, and adjusting in either real-time or near real-time.

48. The apparatus of claim 28 wherein the infrared wavelength comprises a range from about 800 nm to about 2500 nm.

49. The apparatus of claim 28 wherein the bitumen-containing process stream comprises at least one stream chosen from: an oil sand water slurry stream; a bitumen froth stream; a bitumen froth product stream; a bitumen-containing wellhead product stream; a processed bitumen-containing wellhead product stream; a processed bitumen-containing wellhead product stream; a bitumen-containing in-situ product stream; a recycled process fluid stream; a recycled water stream; and, a tailings stream.

50. The apparatus of claim 28 wherein the beam of infrared light is directed toward the bitumen-containing process stream as it exits a primary separation vessel (PSV) as one of a bitumen froth stream or a tailings stream;
wherein the control setpoint comprises an interface level between the bitumen froth stream and a middlings layer within the PSV; and,
wherein the controller is further operative to adjust by maintaining the interface level to minimize loss of bitumen to a tailings stream.

51. The apparatus of claim 28 wherein the blending manifold is further configured to combine at least one more bitumen product stream with a known composition proportionately with the first and second bitumen product streams to produce the blended bitumen product stream having the physical characteristic that meets the pre-determined threshold.

52. An apparatus for controlling a process, the apparatus comprising an online reflectance spectrometer and a process controller,
the online reflectance infrared spectrometer situated proximate a bitumen-containing process stream and configured to direct a beam of infrared light toward the bitumen-containing process stream as it exits a free water knockout as one of a bitumen-rich stream or a water-rich stream and capture reflected light corresponding to the beam of infrared light after interaction with the bitumen-containing process stream,
the online reflectance spectrometer comprising a spectrometer controller configured to analyze a reflectance of the captured light to obtain a spectrum and determine a composition estimate from the bitumen-containing process stream by evaluating the spectrum with reference to a calibrated model, wherein the composition estimate comprises a water content of the bitumen-rich stream or a hydrocarbon content of the water-rich stream respectively; and,
the process controller operative to automatically adjust a control setpoint of at least one upstream process component and/or downstream process component based on the composition estimate, wherein the control setpoint comprises an interface level of the free water knockout adjustable to maintain the hydrocarbon content in the water-rich stream below a hydrocarbon content threshold respectively.

53. The apparatus of claim 52 wherein the bitumen-rich measurement sensor and the water-rich measurement sensor each comprise an infrared spectrometer situated to:
direct a beam of infrared light toward a sample of the respective bitumen-rich stream or the water-rich stream;
capture light corresponding to the infrared light that was directed toward that sample;
analyze the captured light to obtain a spectrum; and
estimate a composition of the respective bitumen-rich stream or the water-rich stream, by evaluating the spectrum with reference to a calibrated model.

54. An apparatus for controlling a process, the apparatus comprising an online reflectance spectrometer and a process controller,
the online reflectance infrared spectrometer situated proximate a bitumen-containing process stream and configured to direct a beam of infrared light toward the bitumen-containing process stream as it exits a primary separation vessel (PSV) as one of a bitumen froth stream or a tailings stream and capture reflected light corresponding to the beam of infrared light after interaction with the bitumen- containing process stream,
the online reflectance spectrometer comprising a spectrometer controller configured to analyze a reflectance of the captured light to obtain a spectrum and determine a composition estimate from the bitumen-containing process stream by evaluating the spectrum with reference to a calibrated model, wherein the composition estimate comprises a water content of the bitumen froth stream or a hydrocarbon content of the tailings stream respectively; and,
the process controller operative to automatically adjust a control setpoint of at least one upstream process component and/or downstream process component based on the composition estimate, wherein the control setpoint comprises a PSV froth-middlings interface level-adjustable by increasing or decreasing an amount of added hot process water or increasing or decreasing a pump speed on the tailings stream to maintain the water content of the bitumen froth stream below a predetermined threshold.

55. A method of controlling a process, comprising:

directing a separate beam of infrared light toward each of a plurality of bitumen product streams each having a different composition and produced from a different source operation;

capturing reflected light corresponding to the beam of infrared light after interaction with each of the plurality of bitumen product streams;

analyzing a reflectance of the captured light to obtain a spectrum;

determining a composition estimate from each of the plurality of bitumen product streams by evaluating the spectrum with reference to a calibrated model; and, based on the composition estimate, automatically adjusting a control setpoint of at least one upstream process component and/or downstream process component, wherein the control setpoint comprises proportionately combining each of the plurality of bitumen product streams to produce at least a blended bitumen product stream, such that a mineral fines content of the blended bitumen product stream is kept below a tolerance level.

56. An apparatus for controlling a process, the apparatus comprising an online reflectance spectrometer and a process controller, the online reflectance infrared spectrometer situated proximate each of a plurality of product stream and configured to direct a separate beam of infrared light toward each of a plurality of bitumen product streams each having a different composition and produced from a different source operation and capture reflected light corresponding to the beam of infrared light after interaction with the bitumen-containing process stream, the online reflectance spectrometer comprising a spectrometer controller configured to analyze a reflectance of the captured light to obtain a spectrum and determine a separate composition estimate for each of the plurality of bitumen product streams by evaluating the spectrum with reference to a calibrated model; and, the process controller operative to automatically adjust a control setpoint of at least one upstream process component and/or downstream process component based on the composition estimate; and wherein the control setpoint comprises operation of a blending manifold configured to proportionately combine each of the plurality of bitumen product streams to produce at least a blended bitumen product stream to keep a mineral fines content of the blended bitumen product stream at a tolerance level.

57. A method of controlling a process, comprising:

directing a separate beam of infrared light to each of a plurality of bitumen-containing process streams entering and exiting a primary separation vessel (PSV);

capturing reflected light corresponding to the beam of infrared light after interaction with the bitumen-containing process stream;

analyzing a reflectance of the captured light to obtain a spectrum;

determining a composition estimate from the bitumen-containing process stream by evaluating the spectrum with reference to a calibrated model, wherein the composition estimate comprises a hydrocarbon content of each of the entering and exiting process streams respectively; and, based on the composition estimate, automatically adjusting a control setpoint of at least one upstream process component and/or downstream process component, wherein the control setpoint comprises a material balance from the composition estimates and the adjusting comprises increasing or decreasing the amount of added hot process water.

58. A method of controlling a process, comprising:

directing a beam of infrared light toward a bitumen product stream as it passes between stages in the process;

capturing reflected light corresponding to the beam of infrared light after interaction with the bitumen product stream;

analyzing a reflectance of the captured light to obtain a spectrum;

determining a composition estimate from the bitumen product stream by evaluating the spectrum with reference to a calibrated model;

based on the composition estimate, automatically adjusting a control setpoint of at least one upstream process component and/or downstream process component; and wherein the bitumen product stream is not a bitumen froth and the adjusting comprises adding a hydrocarbon diluent to the bitumen product stream to meet a minimum diluent-content requirement.

\* \* \* \* \*